(12) United States Patent
Makihara et al.

(10) Patent No.: US 11,913,684 B2
(45) Date of Patent: Feb. 27, 2024

(54) FLOW PASSAGE SWITCHING VALVE AND FLUID CIRCULATION CIRCUIT

(71) Applicant: DENSO CORPORATION, Kariya (JP)

(72) Inventors: Masamichi Makihara, Kariya (JP); Yoshiki Katoh, Kariya (JP); Takahiro Maeda, Kariya (JP); Kuniyoshi Tanioka, Kariya (JP); Akira Higuchi, Kariya (JP); Takehito Mizunuma, Kariya (JP); Takuya Hamada, Kariya (JP)

(73) Assignee: DENSO CORPORATION, Kariya (JP)

( * ) Notice: Subject to any disclaimer, the term of this patent is extended or adjusted under 35 U.S.C. 154(b) by 322 days.

(21) Appl. No.: 17/501,402

(22) Filed: Oct. 14, 2021

(65) Prior Publication Data

US 2022/0034562 A1 Feb. 3, 2022

Related U.S. Application Data

(63) Continuation of application No. PCT/JP2020/016546, filed on Apr. 15, 2020.

(30) Foreign Application Priority Data

Apr. 16, 2019 (JP) .................................. 2019-077832

(51) Int. Cl.
| F16K 11/06 | (2006.01) |
| F16K 11/02 | (2006.01) |
| F16K 31/53 | (2006.01) |
| F25B 25/00 | (2006.01) |
| F25B 41/20 | (2021.01) |

(52) U.S. Cl.
CPC ............ *F25B 25/005* (2013.01); *F16K 11/02* (2013.01); *F16K 11/06* (2013.01); *F16K 31/535* (2013.01); *F25B 41/20* (2021.01)

(58) Field of Classification Search
CPC ........ F25B 25/005; F25B 41/20; F16K 11/02; F16K 11/06; F16K 11/0743; F16K 31/535
See application file for complete search history.

(56) References Cited

U.S. PATENT DOCUMENTS

| 3,499,467 A | * | 3/1970 | Lang, Jr. ............. | F16K 11/0836 137/625.19 |
| 3,927,693 A | * | 12/1975 | Johnston ............ | F16K 11/0853 137/625.47 |
| 6,539,899 B1 | * | 4/2003 | Piccirilli ................. | F01P 7/167 123/41.1 |

(Continued)

FOREIGN PATENT DOCUMENTS

| JP | 2016-199203 | 12/2016 |
| JP | 2016-205475 | 12/2016 |
| JP | 2018185033 A | 11/2018 |

*Primary Examiner* — Umashankar Venkatesan
(74) *Attorney, Agent, or Firm* — Nixon & Vanderhye P.C.

(57) ABSTRACT

A fluid circulation circuit includes a flow passage switching valve. The flow passage switching valve includes a body and a switcher. The body includes a first inlet, a second inlet, and outlets including a first outlet. The switcher is capable of switching a passage configuration to a state in which a fluid that has flowed in from the first inlet flows out of either one of the outlets and a state in which the fluid that has flowed in from the second inlet flows out of either one of the outlets.

28 Claims, 22 Drawing Sheets

(56) References Cited

U.S. PATENT DOCUMENTS

| | | | | |
|---|---|---|---|---|
| 6,688,333 | B2* | 2/2004 | McLane | B60H 1/00485 |
| | | | | 123/41.1 |
| 10,344,877 | B2* | 7/2019 | Roche | B60H 1/00485 |
| 10,641,401 | B1* | 5/2020 | Lopez | F16K 11/074 |
| 11,168,797 | B2* | 11/2021 | Dragojlov | F16K 31/535 |
| 2011/0048562 | A1 | 3/2011 | Kannoo | |
| 2014/0374081 | A1 | 12/2014 | Kakehashi et al. | |
| 2015/0000327 | A1 | 1/2015 | Kakehashi et al. | |
| 2015/0354716 | A1* | 12/2015 | Morein | F16K 11/0853 |
| | | | | 137/625.47 |
| 2018/0142936 | A1 | 5/2018 | Kakehashi et al. | |
| 2018/0328635 | A1* | 11/2018 | Tashiro | F25B 47/02 |
| 2021/0080016 | A1* | 3/2021 | Wong | F16K 11/085 |

* cited by examiner

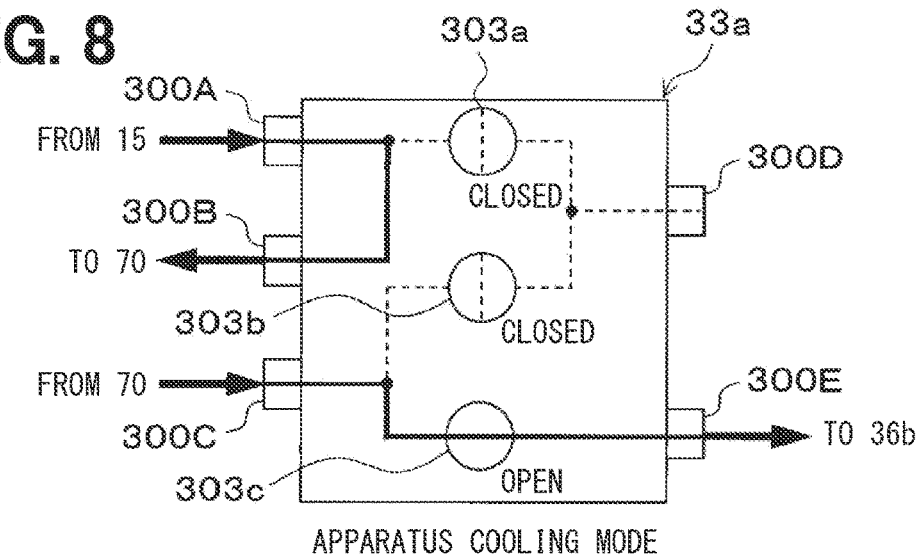
FIG. 8 APPARATUS COOLING MODE
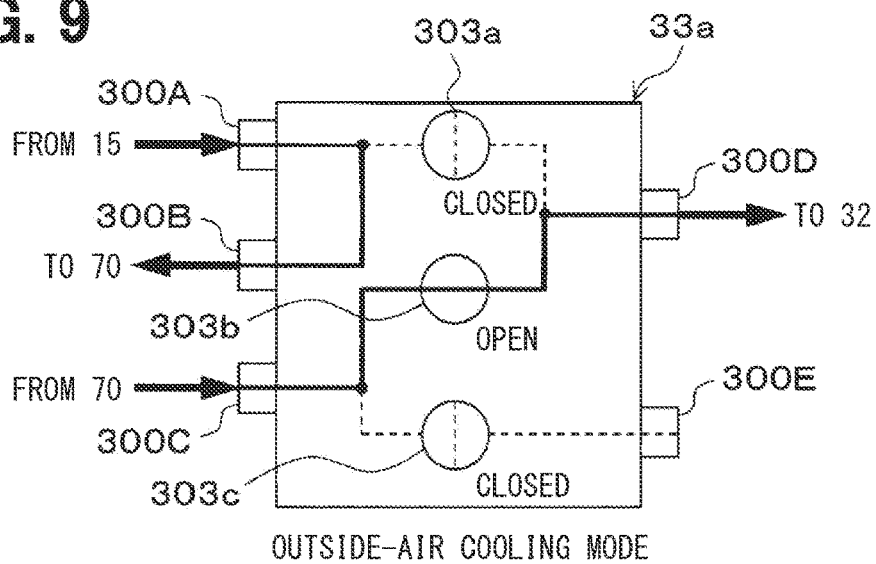
FIG. 9 OUTSIDE-AIR COOLING MODE
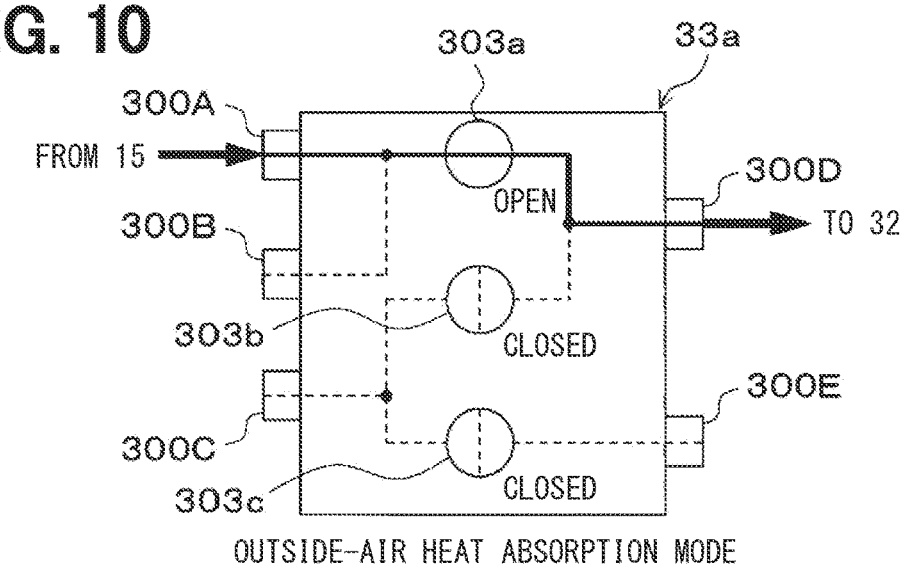
FIG. 10 OUTSIDE-AIR HEAT ABSORPTION MODE

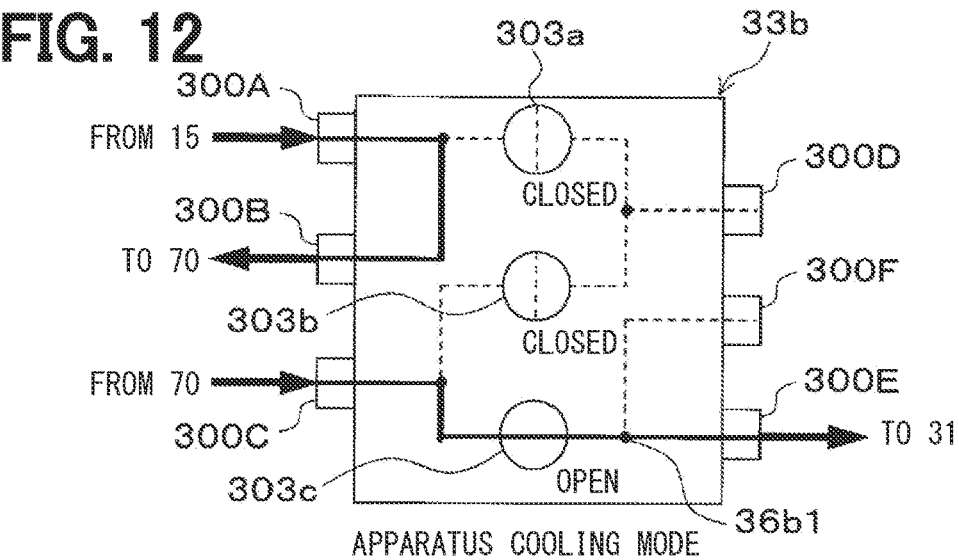
FIG. 12 APPARATUS COOLING MODE
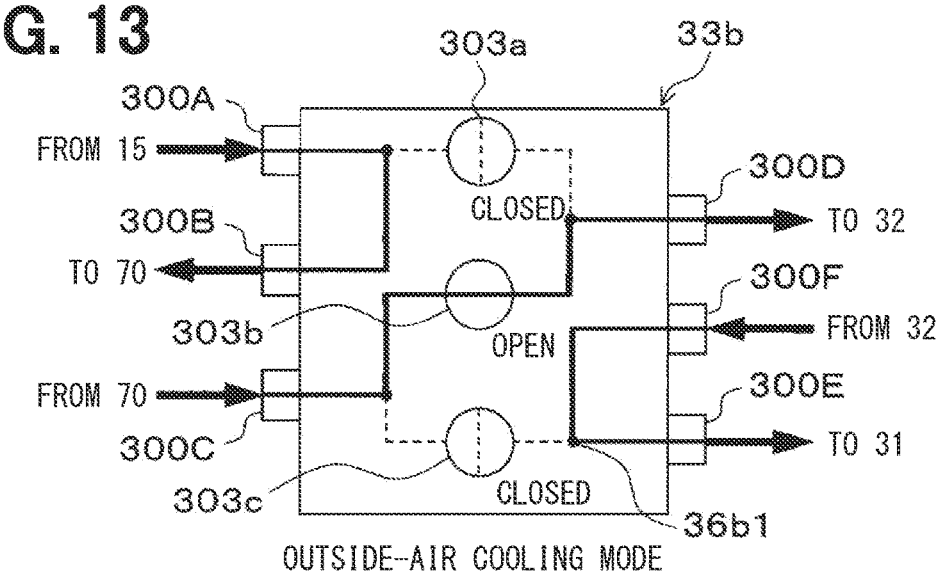
FIG. 13 OUTSIDE-AIR COOLING MODE
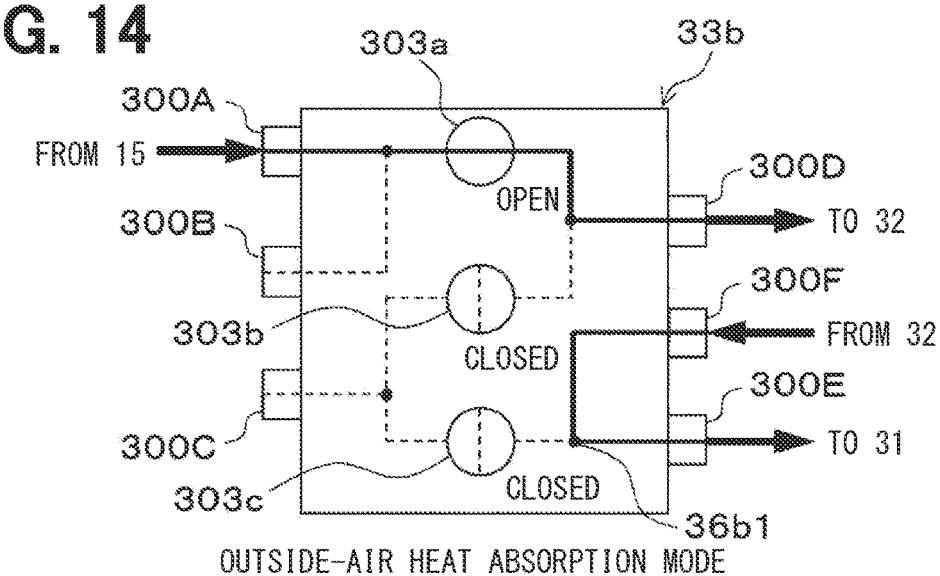
FIG. 14 OUTSIDE-AIR HEAT ABSORPTION MODE

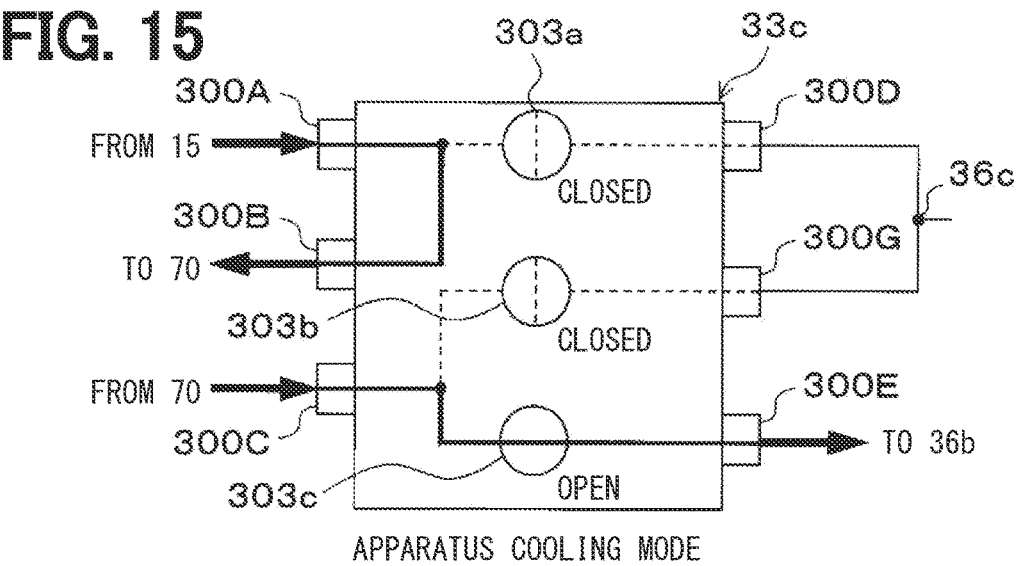
FIG. 15 APPARATUS COOLING MODE
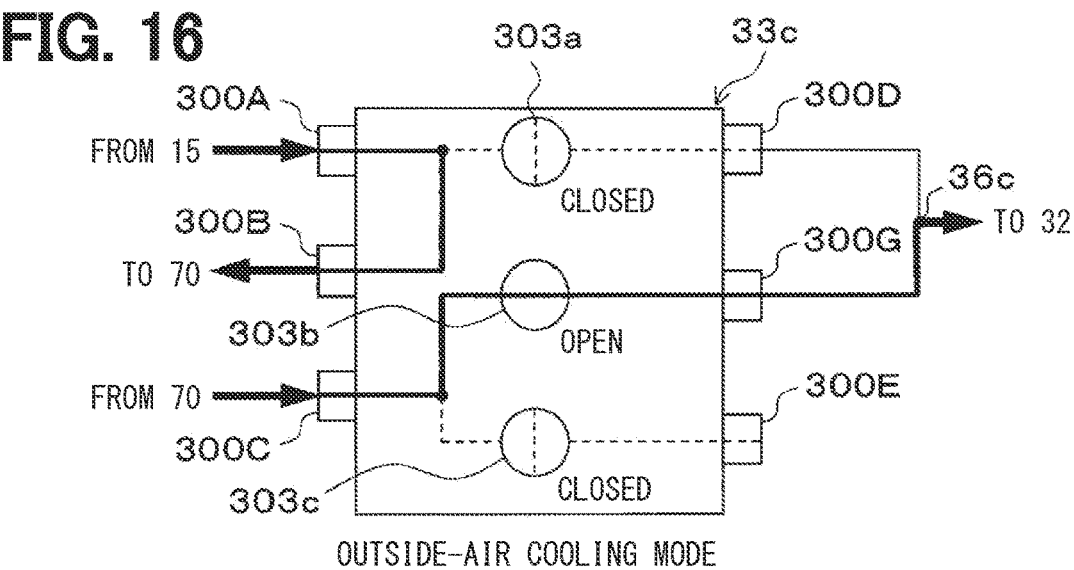
FIG. 16 OUTSIDE-AIR COOLING MODE
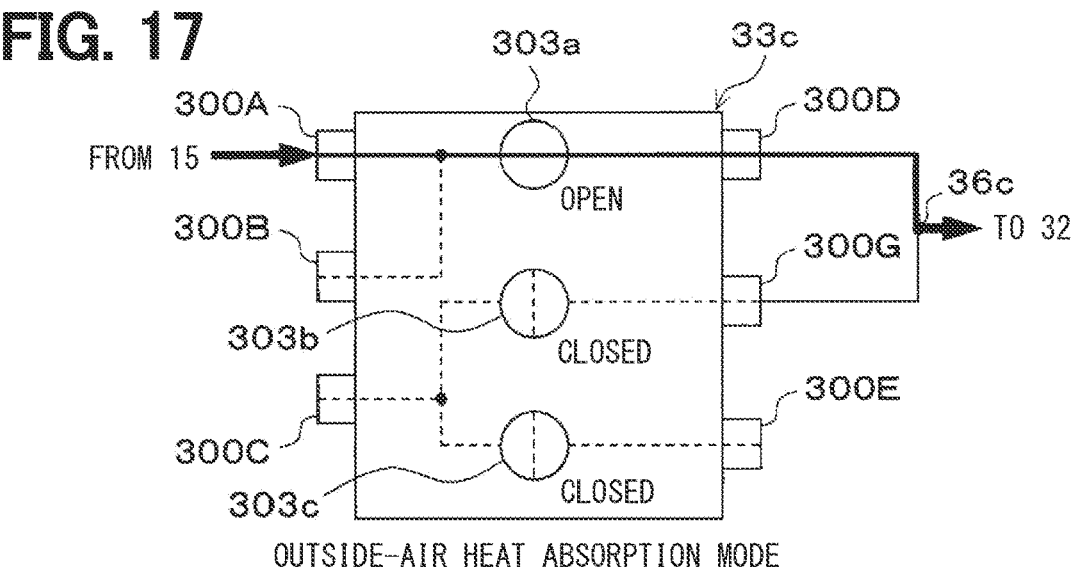
FIG. 17 OUTSIDE-AIR HEAT ABSORPTION MODE

XXI-XXI

XXII–XXII

XXIII–XXIII

XXIII–XXIII

XXIII–XXIII

FLOW PASSAGE SWITCHING VALVE AND FLUID CIRCULATION CIRCUIT

CROSS REFERENCE TO RELATED APPLICATIONS

The present application is a continuation application of International Patent Application No. PCT/JP2020/016546 filed on Apr. 15, 2020, which designated the U.S. and claims the benefit of priority from Japanese Patent Application No. 2019-77832 filed on Apr. 16, 2019. The entire disclosures of all of the above applications are incorporated herein by reference.

TECHNICAL FIELD

The present disclosure relates to a flow passage switching valve and a fluid circulation circuit including the flow passage switching valve.

BACKGROUND

A heat management system includes a fluid circulation circuit for a cooling water circulating therethrough. The fluid circulation circuit includes apparatuses and switching valves. The switching valves switch a circuit configuration to change which apparatuses the cooling water circulates.

SUMMARY

According to an embodiment of the present disclosure, a flow passage switching valve is used for a fluid circulation circuit that is for a fluid circulating. The flow passage switching valve includes a body forming therein a fluid passage for the fluid flowing therethrough, and a switcher that switches a passage configuration of the fluid passage. The body includes a first inlet for the fluid flowing into the body, a second inlet for the fluid flowing into the body, and outlets for the fluid having flowed into the body and flowing out of the body. The outlets include a first outlet for the fluid having flowed in from the first inlet and flowing out of the body. The passage configuration is switchable to a state in which the fluid having flowed in from the first inlet flows out of either one of the outlets. The passage configuration is switchable to a state in which the fluid having flowed in from the second inlet flows out of either one of the outlets.

BRIEF DESCRIPTION OF DRAWINGS

The details of one or more embodiments are set forth in the accompanying drawings and the description below. Other features and advantages will be apparent from the description and drawings, and from the claims.

FIG. 8 is an explanation view illustrating a passage configuration in an apparatus cooling mode in a flow passage switching valve according to a second embodiment.

FIG. 9 is an explanation view illustrating a passage configuration in an outside-air cooling mode in the flow passage switching valve according to the second embodiment.

FIG. 10 is an explanation view illustrating a passage configuration in an outside-air heat absorption mode in the flow passage switching valve according to the second embodiment.

FIG. 12 is an explanation view illustrating a passage configuration in an apparatus cooling mode in a flow passage switching valve according to the third embodiment.

FIG. 13 is an explanation view illustrating a passage configuration in an outside-air cooling mode in the flow passage switching valve according to the third embodiment.

FIG. 14 is an explanation view illustrating a passage configuration in an outside-air heat absorption mode in the flow passage switching valve according to the third embodiment.

FIG. 15 is an explanation view illustrating a passage configuration in an apparatus cooling mode in a flow passage switching valve according to a fourth embodiment.

FIG. 16 is an explanation view illustrating a passage configuration in an outside-air cooling mode in the flow passage switching valve according to the fourth embodiment.

FIG. 17 is an explanation view illustrating a passage configuration in an outside-air heat absorption mode in the flow passage switching valve according to the fourth embodiment.

DETAILED DESCRIPTION

Figure 1:
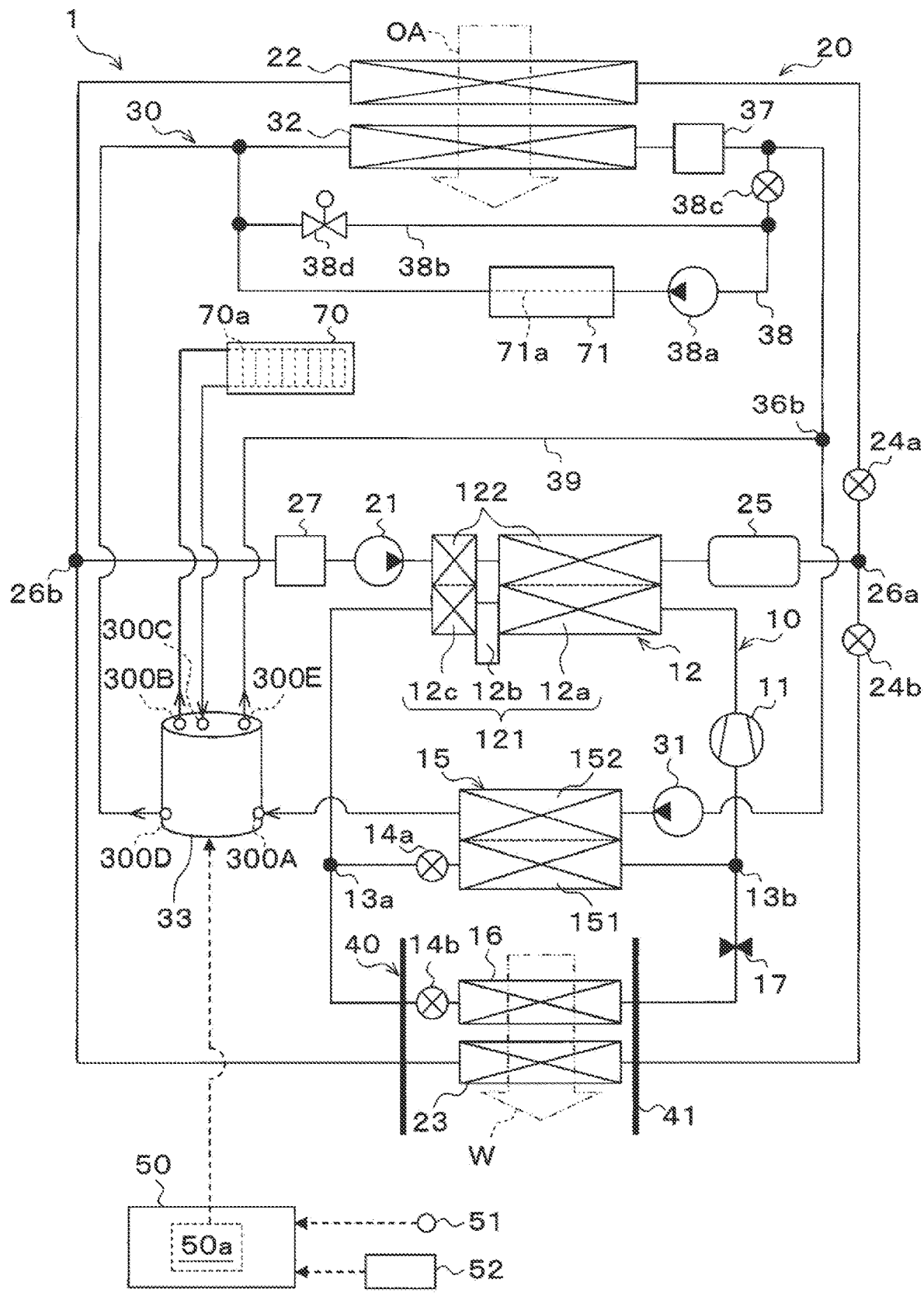
FIG. 1 is a view of the entire structure of a temperature adjustment device according to a first embodiment.
Figure 2:
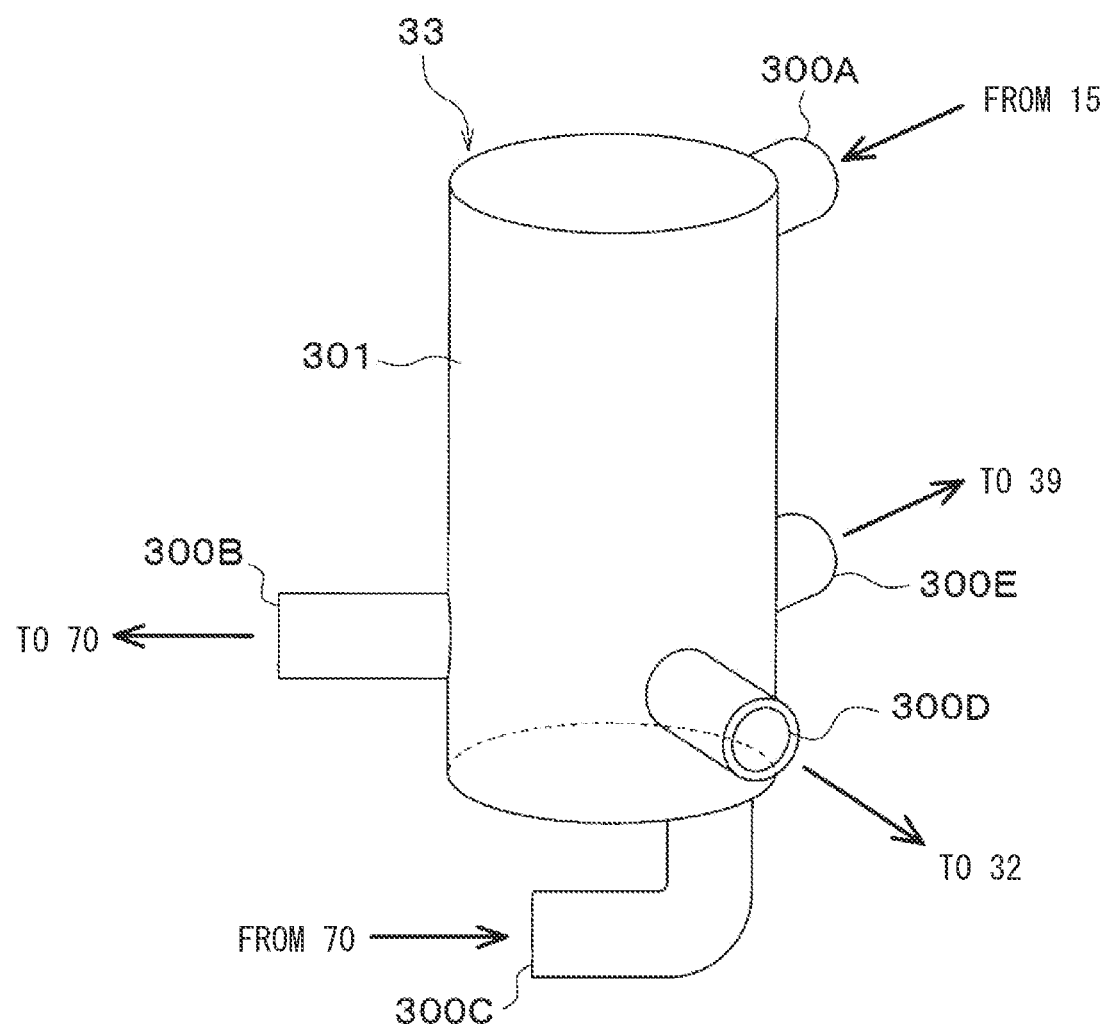
FIG. 2 is a perspective view of the external appearance of a flow passage switching valve according to the first embodiment.

A comparative example will be described. A heat management system of the comparative example includes a fluid circulation circuit for a cooling water circulating therethrough. In the fluid circulation circuit, there are placed a plurality of apparatuses, such as a cooling-water heater, a cooling-water cooler, a cooler core, a heater core, a distribution-side switching valve, a gathering-side switching valve, and the like.

In the fluid circulation circuit of the comparative example, the cooling-water heater and the cooling-water cooler are heat exchangers for performing heat exchange between the cooling water and a refrigerant in a refrigeration cycle. The cooler core and the heater core are heat exchangers for performing heat exchange between the cooling water and blowing air to be blown into a space to be air-conditioned. The distribution-side switching valve and the gathering-side switching valve are flow passage switching valves for switching the circuit configuration of the fluid circulation circuit.

In the fluid circulation circuit in the comparative example, the flow passage switching valves switch the circuit configuration to change which apparatuses the cooling water is circulated. Thus, the heat management system of the comparative example is adapted to effectively utilize heat of outside air or heat of exhaust air discharged from an inside of the room to an outside of the room, for temperature adjustments for blowing air, for example.

In general, flow passage switching valves of this type are constituted by a combination of a plurality of opening/closing valves, a plurality of three-way valves and the like, according to the fluid circulation circuits to which they are applied, in many cases.

However, for such flow passage switching valves constituted by a combination of a plurality of opening/closing valves, a plurality of three-way valves and the like, there is a need for securing sealing characteristics at the connection portions between the respective opening/closing valves and between the respective three-way valves, in order to ensure switchover of the circuit configuration. Therefore, with such flow passage switching valves constituted by a combination of a plurality of opening/closing valves, a plurality of three-way valves and the like, there is a need for complicated works for connecting the respective opening/closing valves and the respective three-way valves and, furthermore, there is a tendency to increase the sizes thereof.

Further, with the fluid circulation circuit including such flow passage switching valves constituted by a combination of a plurality of opening/closing valves, a plurality of three-way valves and the like, there is a difficulty in improving the productivity thereof and, also, there is a tendency to increase the size of the fluid circulation circuit itself.

In contrast to the comparative example, the present disclosure will be described below.

A flow passage switching valve according to a first aspect of the present disclosure is used for a fluid circulation circuit that is for a fluid circulating. The flow passage switching valve includes a body forming therein a fluid passage for the fluid flowing therethrough, and a switcher configured to switch a passage configuration of the fluid passage.

The body includes a first inlet for the fluid flowing into the body, a second inlet for the fluid flowing into the body, and outlets for the fluid having flowed into the body and flowing out of the body.

The outlets include a first outlet for the fluid having flowed in from the first inlet and flowing out of the body.

The switcher is configured such that the passage configuration is switchable to a state in which the fluid having flowed in from the first inlet flows out of either one of the outlets. The switcher is configured such that the passage configuration is switchable to a state in which the fluid having flowed in from the second inlet flows out of either one of the outlets.

The fluid circulation circuit is configured such that a first pressure of the fluid flowing into the first inlet is higher than a second pressure of the fluid flowing into the second inlet.

According to this, there is no need for assembling the flow passage switching valve by a combination of a plurality of opening/closing valves, a plurality of three-way valves and the like, which inhibits the size thereof from being increased.

In the fluid circulation circuit, the first pressure of the fluid flowing into the first inlet is higher than the second pressure of the fluid flowing into the second inlet. This can enhance the sealing characteristic of the switcher, using the pressure difference between the first pressure and the second pressure.

Namely, according to the flow passage switching valve in the first aspect, when it is applied to the fluid circulation circuit, it is possible to properly switch the circuit configuration of the fluid circulation circuit, without involving an increase of the size thereof.

A flow passage switching valve according to a second aspect of the present disclosure is used for a fluid circulation circuit that is for a fluid circulating. The flow passage switching valve includes a body forming therein a fluid passage for the fluid flowing therethrough, and a switcher configured to switch a passage configuration of the fluid passage.

The body includes a first inlet for the fluid flowing into the body, a second inlet for the fluid flowing into the body, and outlets for the fluid having flowed into the body and flowing out of the body.

The outlets include a first outlet for the fluid having flowed in from the first inlet and flowing out of the body.

The switcher is configured such that the passage configuration is switchable to a state in which the fluid that has flowed in from the first inlet flows out of either one of the outlets. The switcher is configured such that the passage configuration is switchable to a state in which the fluid that has flowed in from the second inlet flows out of either one of the outlets.

Further, the fluid circulation circuit is configured such that a first temperature of the fluid flowing out of the first outlet is lower than a second temperature of the fluid flowing into the second inlet.

According to this, there is no need for assembling the flow passage switching valve by a combination of a plurality of opening/closing valves, a plurality of three-way valves and the like, which inhibits the size thereof from being increased.

In the fluid circulation circuit, the first temperature of the fluid flowed out through the first outlet is lower than the second temperature of the fluid flowing into the second inlet. This enables reducing the viscosity of the fluid flowing into the second inlet, by raising the temperature of the fluid flowing into the second inlet.

This can reduce the pressure loss caused in the fluid flowing through the fluid passage which reaches any one of the outlets from the second inlet.

Namely, according to the flow passage switching valve in the second aspect, when it is applied to the fluid circulation circuit, it is possible to properly switch the circuit configuration of the fluid circulation circuit, without involving an increase of the size thereof.

In the flow passage switching valve in the aforementioned aspects, the second inlet may be an inlet for the fluid having flowed out of the body from the first outlet and flowing into the body again. The outlets may include a second outlet for either one of two fluids: the fluid having flowed into the body from the first inlet and flowing out of the body; and the fluid having flowed into the body from the second inlet and flowing out of the body. The outlets may include a third outlet for the fluid having flowed into the body from the second inlet and flowing out of the body.

Further, the switcher may be configured such that the passage configuration is switchable to a state in which the fluid that has flowed in from the first inlet flows out of either one of two outlets: the first outlet and the second outlet. The switcher may be configured such that the passage configuration is switchable to a state in which the fluid that has flowed in from the second inlet flows out of either one of two outlets: the second outlet and the third outlet.

This enables selecting the first outlet or the second outlet, as the outlet port for the fluid flowed in through the first inlet. Further, this enables selecting the second outlet or the third outlet, as the outlet port for the fluid flowed in through the second inlet.

Further, since the fluid that has flowed out from the first outlet flows in from the second inlet again, it is possible to select the third outlet, as the outlet port for the fluid that has flowed in from the first inlet. This can realize switchover of the passage configuration with higher versatility.

A flow passage switching valve according to a third aspect of the present disclosure is used for a fluid circulation circuit that is for a fluid circulating. The flow passage switching valve includes a body forming therein a fluid passage for the fluid flowing therethrough, and a switcher configured to switch a passage configuration of the fluid passage.

The body includes a first inlet for the fluid flowing into the body, a second inlet for the fluid flowing into the body, and outlets for the fluid having flowed into the body and flowing out of the body.

The outlets include a first outlet for the fluid having flowed in from the first inlet and flowing out of the body, a second outlet for the fluid having flowed into the body and flowing out of the body, and a third outlet for the fluid having flowed into the body and flowing out of the body.

The second inlet is an inlet for the fluid having flowed out of the body from the first outlet and flowing into the body again.

The switcher is configured such that the passage configuration is switchable to a state in which the fluid that has flowed in from the first inlet flows out of either one of two outlets: the first outlet and the second outlet. The switcher is configured such that the passage configuration is switchable to a state in which the fluid that has flowed in from the second inlet flows out of either one of two outlets: the second outlet and the third outlet.

A length of a passage leading from the first inlet to the second outlet is smaller than a total length of a length of a passage leading from the first inlet to the first outlet and a length of a passage leading from the second inlet to the second outlet.

Further, the fluid circulation circuit is configured such that a first lowest temperature of the fluid flowing through the fluid passage leading from the first inlet to the second outlet is lower than a second lowest temperature of the fluid in a flow passage leading from the first outlet to the second inlet.

According to this, there is no need for assembling the flow passage switching valve by a combination of a plurality of opening/closing valves, a plurality of three-way valves and the like, which inhibits the size thereof from being increased.

The first lowest temperature is lower than the second lowest temperature. This may lower the temperature of the fluid flowing through the passage leading from the first inlet to the second outlet, which tends to raise the viscosity of the fluid. This may result in an increase of the pressure loss induced in the fluid flowing through the passage leading from the first inlet to the second outlet.

For coping therewith, the length of the passage from the first inlet to the second outlet is set to be smaller than the total length. This can suppress the increase of the pressure loss induced in the fluid flowing through the fluid passage from the first inlet to the second outlet.

Namely, with the flow passage switching valve in the third aspect, when it is applied to the fluid circulation circuit, it is possible to properly switch the circuit configuration of the fluid circulation circuit, without involving an increase of the size thereof.

A flow passage switching valve according to a fourth aspect of the present disclosure is used for a fluid circulation circuit that is for a fluid circulating. The flow passage switching valve includes a body, a switcher, a driver, a gear mechanism and a gear biasing member.

The body forms therein a fluid passage for the fluid flowing therethrough. The switcher switches a passage configuration of the fluid passage. The driver outputs driving force for moving the switcher. The gear mechanism couples the driver and the switcher to each other such that the driving force is transmitted therebetween.

The body includes a first inlet for the fluid flowing into the body, a second inlet the fluid flowing into the body, and outlets for the fluid having flowed into the body and flowing out of the body.

The outlets include a first outlet for the fluid having flowed in from the first inlet and flowing out of the body.

The switcher is configured such that the passage configuration is switchable to a state in which the fluid that has flowed in from the first inlet flows out of either one of the outlets. The switcher is configured such that the passage configuration is switchable to a state in which the fluid that has flowed in from the second inlet flows out of either one of the outlets.

Further, the gear biasing member generates a load in a direction where tooth surfaces of gears of the gear mechanism come into contact with each other.

According to this, there is no need for constituting the flow passage switching valve by a combination of a plurality of opening/closing valves, a plurality of three-way valves and the like, which inhibits the size thereof from being increased. Since the flow passage switching valve includes the gear biasing member, it is possible to suppress rattling and the like of the gear mechanism due to backlash between the plurality of gears. This can improve the positional accuracy in displacing the switcher.

Namely, according to the flow passage switching valve in the fourth aspect, when it is applied to the fluid circulation circuit, it is possible to properly switch the circuit configuration of the fluid circulation circuit, without involving an increase of the size thereof.

A flow passage switching valve according to a fifth aspect of the present disclosure is used for a fluid circulation circuit that is for a fluid circulating. The flow passage switching valve includes a body forming therein a fluid passage for the fluid flowing therethrough, and a switcher configured to switch a passage configuration of the fluid passage.

The body includes a first inlet for the fluid flowing into the body, a second inlet for the fluid flowing into the body, and outlets for the fluid having flowed into the body and flowing out of the body.

The outlets include a first outlet for the fluid having flowed in from the first inlet and flows out of the body.

The switcher is configured such that the passage configuration is switchable to a state in which the fluid that has flowed in from the first inlet flows out of either one of the outlets. The switcher is configured such that the passage configuration is switchable to a state in which the fluid that has flowed in from the second inlet flows out of either one of the outlets. The switcher has a sealing surface coming into surface-to-surface contact with the body.

The flow passage switching valve further includes a switcher biasing member configured to exert a load on the switcher in a direction where the sealing surface is pressed against the body.

According to this, there is no need for assembling the flow passage switching valve by a combination of a plurality of opening/closing valves, a plurality of three-way valves and the like, which inhibits the size thereof from being increased. Further, since the flow passage switching valve includes the switcher biasing member, it is possible to press the sealing surface against the body. This can suppress leakage of the fluid through the gap between the switcher and the body, when the switcher is displaced for switching the passage configuration of the fluid passage.

Namely, according to the flow passage switching valve in the fifth aspect, when it is applied to the fluid circulation circuit, it is possible to properly switch the circuit configuration of the fluid circulation circuit, without involving an increase of the size thereof.

A fluid circulation circuit according to the first aspect of the present disclosure is for a fluid circulating, and includes apparatuses for the fluid flowing therethrough, and a flow passage switching valve switches a circuit configuration of a circuit that is for the fluid circulating.

The flow passage switching valve includes a body forming therein a fluid passage for the fluid flowing therethrough, and a switcher configured to switch a passage configuration of the fluid passage.

The body includes a first inlet for the fluid flowing into the body, a second inlet for the fluid flowing into the body, and outlets for the fluid having flowed into the boy and flowing out of the body.

The outlets include a first outlet for the fluid having flowed in from the first inlet and flows out of the body.

The switcher is configured such that the passage configuration is switchable to a state in which the fluid that has flowed in from the first inlet flows out of either one of the outlets. The switcher is configured such that the passage configuration is switchable to a state in which the fluid that has flowed in from the second inlet flows out of either one of the outlets.

Further, a first pressure of the fluid flowing into the first inlet is set to be higher than a second pressure of the fluid flowing into the second inlet.

According thereto, the fluid circulation circuit includes the flow passage switching valve in the first aspect. Namely, the fluid circulation circuit includes the flow passage switching valve capable of properly switching the circuit configuration of the fluid circulation circuit, without having an increased size. This enables provision of the fluid circulation circuit with higher productivity.

A fluid circulation circuit according to the second aspect of the present disclosure is for a fluid circulating, and includes apparatuses for the fluid flowing therethrough, and a flow passage switching valve configured to switch a circuit configuration of a circuit that is for the fluid circulating.

The flow passage switching valve includes a body forming therein a fluid passage for the fluid flowing therethrough, and a switcher configured to switch a passage configuration of the fluid passage.

The body includes a first inlet for the fluid flowing into the body, a second inlet for the fluid flowing into the body, and outlets for the fluid having flowed into the body and flowing out of the body.

The outlets include a first outlet for the fluid having flowed in from the first inlet and flowing out of the body.

The switcher is configured such that the passage configuration is switchable to a state in which the fluid that has flowed in from the first inlet flows out of either one of the outlets. The switcher is configured such that the passage configuration is switchable to a state in which the fluid that has flowed in from the second inlet flows out of either one of the outlets.

Further, a first temperature of the fluid flowing out through the first outlet is set to be lower than a second temperature of the fluid flowing into the second inlet.

According thereto, the fluid circulation circuit includes the flow passage switching valve in the second aspect. Namely, the fluid circulation circuit includes the flow passage switching valve capable of properly switching the circuit configuration of the fluid circulation circuit, without having an increased size. This enables provision of the fluid circulation circuit with higher productivity.

A fluid circulation circuit according to the third aspect of the present disclosure is for a fluid circulating and includes apparatuses through which the fluid flows, and a flow passage switching valve configured to switch a circuit configuration of a circuit that is for the fluid circulating.

The flow passage switching valve includes a body forming therein a fluid passage for the fluid flowing therethrough, and a switcher configured to switch a passage configuration of the fluid passage.

The body includes a first inlet for the fluid flowing into the body, a second inlet for the fluid flowing into the body, and outlets for the fluid having flowed into the body and flowing out of the body.

The outlets include a first outlet for the fluid having flowed into the body from the first inlet and flowing out of the body, a second outlet for the fluid having flowed into the body and flowing out of the body, and a third outlet for the fluid having flowed into the body and flowing out of the body.

The second inlet is an inlet for the fluid having flowed out of the body from the first outlet and flows into the body again.

The switcher is configured such that the passage configuration is switchable to a state in which the fluid that has flowed in from the first inlet flows out of either one of two outlets: the first outlet and the second outlet. The switcher is configured such that the passage configuration is switchable to a state in which the fluid that has flowed in from the second inlet flows out of either one of two outlets: the second outlet and the third outlet.

A length of a passage leading from the first inlet to the second outlet is smaller than a total length of a length of a passage leading from the first inlet to the first outlet and a length of a passage leading from the second inlet to the second outlet. A first lowest temperature of the fluid flowing through the fluid passage in the flow passage switching valve leading from the first inlet to the second outlet is set to be lower than a second lowest temperature of the fluid in a flow passage leading from the first outlet to the second inlet.

According thereto, the fluid circulation circuit includes the flow passage switching valve in the third aspect. Namely, the fluid circulation circuit includes the flow passage switching valve capable of properly switching the circuit configuration of the fluid circulation circuit, without having an increased size. This enables provision of the fluid circulation circuit with higher productivity.

Hereinafter, multiple embodiments for implementing the present disclosure will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

With reference to FIGS. 1 to 7, a first embodiment of the present disclosure will be described. In the present embodiment, a low-temperature side heat-medium circuit 30 including a flow passage switching valve 33 is applied to a temperature adjustment device 1 for a vehicle.

The temperature adjustment device 1 is incorporated in an electric vehicle which acquires driving force for traveling from an electric motor. In the electric vehicle, the temperature adjustment device 1 adjusts the temperature of blowing air blown into the vehicle compartment, which is a space to be air-conditioned, and, further, the temperature adjustment device 1 adjusts the temperatures of a plurality of in-vehicle apparatuses including a battery 70. Accordingly, the temperature adjustment device 1 can be called a vehicle air-conditioning device having an in-vehicle apparatus temperature adjustment function. Blowing air is a fluid to be temperature-adjusted by the temperature adjustment device 1.

As illustrated in a view of the entire structure in FIG. 1, the temperature adjustment device 1 includes a refrigeration cycle device 10, a high-temperature side heat-medium circuit 20, a low-temperature side heat-medium circuit 30, a room-interior air conditioning unit 40, a control device 50, and the like.

At first, the refrigeration cycle device 10 will be described. The refrigeration cycle device 10 forms a vapor-compression type refrigeration cycle. The refrigeration cycle device 10 includes a compressor 11, a water-refrigerant heat exchanger 12, a first expansion valve 14a, a second expansion valve 14b, a chiller 15, a room-interior evaporator 16, an evaporating-pressure adjustment valve 17, and the like. The refrigeration cycle device 10 is capable of switching the circuit configuration of a refrigerant circuit, depending on respective running modes, which will be described later.

In the refrigeration cycle device 10, an HFO-based refrigerant (more specifically, R1234yf) is employed, as a refrigerant. The refrigeration cycle device 10 forms a subcritical refrigeration cycle adapted such that the refrigerant pressure in the high-pressure side does not exceed a critical pressure of the refrigerant. A refrigerating machine oil (more specifically, a PAG oil) for lubricating the compressor 11 in the refrigeration cycle device 10 is mixed in the refrigerant. A portion of the refrigerating machine oil is circulated through the refrigeration cycle device 10, together with the refrigerant.

The compressor 11 inhales the refrigerant and, then, compresses and discharges the refrigerant, in the refrigeration cycle device 10. The compressor 11 is placed in a driving-device room in front of the vehicle compartment. The driving-device room forms a space for placing, therein, at least a portion of a driving device (for example, an electric motor) for outputting driving force for traveling.

The compressor 11 is an electric compressor adapted to rotate and drive a fixed-capacity type compressing mechanism having a fixed discharge capacity, through an electric motor. The compressor 11 is controlled in rotating speed (namely, refrigerant discharging ability), through control signals outputted from the control device 50, which will be described later.

A refrigerant passage 121 in the water-refrigerant heat exchanger 12 is connected, at its inlet port, to the discharge port of the compressor 11. The water-refrigerant heat exchanger 12 is a heat exchanger for performing heat exchange between the high-pressure refrigerant discharged from the compressor 11 and a high-temperature side heat medium circulating through the high-temperature side heat-medium circuit 20. The water-refrigerant heat exchanger 12 is a heat exchanging portion for heating, which is adapted to heat the high-temperature side heat medium.

In the refrigeration cycle device 10, a so-called subcool-type heat exchanger is employed as the water-refrigerant heat exchanger 12. Therefore, the refrigerant passage 121 in the water-refrigerant heat exchanger 12 is provided with a condensing portion 12a, a receiver portion 12b, and a subcooling portion 12c.

The condensing portion 12a is a heat exchanging portion for condensing, which is adapted to perform heat exchange between the high-pressure side heat medium and the high-pressure refrigerant discharged from the compressor 11, thereby condensing the high-pressure refrigerant. The receiver portion 12b is a liquid receiving portion for separating the gaseous portion and the liquid portion of the refrigerant flowed out from the condensing portion 12a from each other and for accumulating the separated liquid refrigerant. The subcooling portion 12c is a heat exchanging portion for sub-cooling, which is adapted to perform heat exchange between the high-pressure side heat medium and the liquid refrigerant flowed out from the receiver portion 12b for sub-cooling the liquid refrigerant.

A refrigerant diverging portion 13a is connected, at its flow-inlet port, to the outlet port of the refrigerant passage 121 in the water-refrigerant heat exchanger 12. The refrigerant diverging portion 13a causes the flow of the refrigerant flowed out from the water-refrigerant heat exchanger 12 to diverge. The refrigerant diverging portion 13a is a three-way joint having three flow-inlet/outlet ports which communicate with each other. In the refrigerant diverging portion 13a, one of the three flow-inlet/outlet ports is used as a flow inlet port, and the other two of them are used as flow outlet ports.

A refrigerant passage 151 in the chiller 15 is connected, at its inlet port, to one flow-outlet port of the refrigerant diverging portion 13a, with the first expansion valve 14a interposed therebetween. The room-interior evaporator 16 is connected, at its refrigerant inlet port, to the other flow outlet port of the refrigerant diverging portion 13a, with the second expansion valve 14b interposed therebetween.

The first expansion valve 14a is a pressure reduction portion for reducing the pressure of the refrigerant flowed out from one flow outlet port of the refrigerant diverging portion 13a. The first expansion valve 14a is an electric-type variable throttle mechanism including a valve element for changing the throttle opening, and an electric actuator (more specifically, a stepping motor) for displacing the valve element. The first expansion valve 14a is controlled in operation by control pulses outputted from the control device 50.

The second expansion valve 14b is a pressure reduction portion for reducing the pressure of the refrigerant flowed out from the other flow outlet port of the refrigerant diverging portion 13a. The second expansion valve 14b basically has the same structure as that of the first expansion valve 14a.

The first expansion valve 14a and the second expansion valve 14b have a full-open function for simply functioning as a refrigerant passage, while hardly exerting the refrigerant pressure reduction effect and the flow-rate adjustment effect, when the valve opening is full. Furthermore, the first expansion valve 14a and the second expansion valve 14b have a full-close function for closing the refrigerant passage, when the valve opening is fully closed.

The first expansion valve 14a and the second expansion valve 14b are capable of switching the refrigerant circuit in the respective running mode, through the full-open function and the full-close function. Accordingly, the first expansion valve 14a and the second expansion valve 14b also function as a refrigerant-circuit switcher for switching the circuit configuration in the refrigeration cycle device 10.

The refrigerant passage 151 in the chiller 15 is connected, at its inlet port, to the outlet port of the first expansion valve 14a. The chiller 15 is a heat exchanger for performing heat exchange between the low-pressure refrigerant having been reduced in pressure by the first expansion valve 14a and the low-temperature side heat medium circulating through the low-temperature side heat-medium circuit 30. The chiller 15 includes the refrigerant passage 151 for flowing the low-pressure refrigerant therethrough, and a heat-medium passage 152 as a cooling fluid passage for flowing the low-temperature side heat medium therethrough. The chiller 15 is an evaporating portion for evaporating the low-pressure refrigerant for causing it to exert a heat absorption effect, thereby cooling the low-temperature side heat medium.

Accordingly, the chiller 15 in the low-temperature side heat-medium circuit 30 is a cooling apparatus for cooling the low-temperature side heat medium. A refrigerant merging portion 13b is connected, at its one flow-inlet port, to the outlet port of the refrigerant passage 151 in the chiller 15.

The room-interior evaporator 16 is connected, at its refrigerant inlet port, to the outlet port of the second expansion valve 14b. The room-interior evaporator 16 is a heat exchanger for performing heat exchange between the low-pressure refrigerant having been reduced in pressure by the second expansion valve 14b and blowing air W to be blown into the vehicle compartment. The room-interior evaporator 16 is a heat exchanging portion for cooling, which is adapted to evaporate the low-pressure refrigerant for causing it to exert a heat absorption effect, thereby cooling blowing air W. The room-interior evaporator 16 is placed within a casing 41 of the room-interior air conditioning unit 40, which will be described later.

An evaporating-pressure adjustment valve 17 is connected, at its inlet port, to the refrigerant outlet port of the room-interior evaporator 16. The evaporating-pressure adjustment valve 17 is an evaporating-pressure adjustment portion for maintaining the refrigerant evaporating pressure in the room-interior evaporator 16 at a predetermined reference pressure or more.

The evaporating-pressure adjustment valve 17 is a mechanical type variable throttle mechanism adapted to increase the valve opening, along with the rise of the refrigerant pressure at the refrigerant outlet port of the room-interior evaporator 16. Thus, the evaporating-pressure adjustment valve 17 according to the present embodiment maintains the refrigerant evaporating temperature in the room-interior evaporator 16 at a temperature equal to or higher than a frost-deposition suppressing temperature (1° C., in the present embodiment) which can suppress frost deposition in the room-interior evaporator 16. The refrigerant merging portion 13b is connected, at its other flow-inlet port, to the outlet port of the evaporating-pressure adjustment valve 17.

The refrigerant merging portion 13b merges the flow of the refrigerant flowed out from the refrigerant passage 151 in the chiller 15 and the flow of the refrigerant flowed out from the evaporating-pressure adjustment valve 17. The refrigerant merging portion 13b is a three-way joint which is similar to the refrigerant diverging portion 13a. In the refrigerant merging portion 13b, two of the three flow-inlet/outlet ports are used as flow-inlet ports, and the other one of them is used as a flow-outlet port. The compressor 11 is connected, at its suction inlet port, to the flow-outlet port of the refrigerant merging portion 13b.

Next, the high-temperature side heat-medium circuit 20 will be described. The high-temperature side heat-medium circuit 20 is a circuit for circulating the high-temperature side heat medium therethrough. In the high-temperature side heat-medium circuit 20, an ethylene glycol aqueous solution is employed as the high-temperature side heat medium. In the high-temperature side heat-medium circuit 20, there are placed a high-temperature side pump 21, a heat-medium passage 122 in the water-refrigerant heat exchanger 12, a high-temperature side radiator 22, a heater core 23, a first high-temperature side flow-rate adjustment valve 24a, a second high-temperature side flow-rate adjustment valve 24b, and the like.

The heat-medium passage 122 in the water-refrigerant heat exchanger 12 is connected, at its inlet port, to the discharge port of the high-temperature side pump 21. The high-temperature side pump 21 pumps the high-temperature side heat medium to the heat-medium passage 122 in the water-refrigerant heat exchanger 12. The high-temperature side pump 21 is an electric pump, which is controlled in rotating speed (namely, forcibly-transferring ability) by a control voltage outputted from the control device 50.

An electric heater 25 is placed on an outlet-port side of the heat-medium passage 122 in the water-refrigerant heat exchanger 12. The electric heater 25 is a heating device for heating the high-temperature side heat medium flowed out from the heat-medium passage 122 in the water-refrigerant heat exchanger 12. In the high-temperature side heat-medium circuit 20, a PTC heater having a PTC element (namely, a positive thermistor) is employed as the electric heater 25. The electric heater 25 is controlled, in amount of heat generation therefrom, by a control voltage outputted from the control device 50.

A high-temperature side diverging portion 26a is connected, at its flow inlet port, to the downstream side of the electric heater 25. The high-temperature side diverging portion 26a causes the flow of the high-temperature side heat medium downstream of the electric heater 25 to diverge. The high-temperature side diverging portion 26a is a three-way joint which is similar to the refrigerant diverging portion 13a and the like.

The high-temperature side radiator 22 is connected, at its heat-medium inlet port, to one flow-outlet port of the high-temperature side diverging portion 26a, with the first high-temperature side flow-rate adjustment valve 24a interposed therebetween. The heater core 23 is connected, at its heat-medium inlet port, to the other flow-outlet port of the high-temperature side diverging portion 26a, with the second high-temperature side flow-rate adjustment valve 24b interposed therebetween.

The first high-temperature side flow-rate adjustment valve 24a is a flow-rate adjustment portion for adjusting the flow rate of the high-temperature side heat medium flowing into the high-temperature side radiator 22. The first high-temperature side flow-rate adjustment valve 24a is an electric flow-rate adjustment valve including a valve element for changing the flow passage cross-sectional area of the heat-medium passage and, further, including an electric actuator (more specifically, a stepping motor) for displacing the valve element. The first high-temperature side flow-rate adjustment valve 24a is controlled in operation by control pulses outputted from the control device 50.

The second high-temperature side flow-rate adjustment valve 24b is a flow-rate adjustment portion for adjusting the flow rate of the high-temperature side heat medium flowing into the heater core 23. The second high-temperature side flow-rate adjustment valve 24b basically has the same structure as that of the first high-temperature side flow-rate adjustment valve 24a. The first high-temperature side flow-rate adjustment valve 24a and the second high-temperature side flow-rate adjustment valve 24b are a high-temperature side flow-rate ratio adjustment portion for adjusting the high-temperature side flow-rate ratio, which is the ratio of the flow rate of the high-temperature side heat medium flowing into the heater core 23 to the flow rate of the high-temperature side heat medium flowing into the high-temperature side radiator 22.

Further, the first high-temperature side flow-rate adjustment valve 24a and the second high-temperature side flow-rate adjustment valve 24b have a full-open function and a full-close function, similarly to the first expansion valve 14a and the second expansion valve 14b. Accordingly, the first high-temperature side flow-rate adjustment valve 24a and the second high-temperature side flow-rate adjustment valve 24b also function as a high-temperature side heat-medium circuit switcher for switching the circuit configuration of the high-temperature side heat-medium circuit 20.

The high-temperature side radiator 22 is a heat exchanging portion for performing heat exchange between the high-temperature side heat medium heated by the water-refrigerant heat exchanger 12 and the like and outside air OA blown from an outside-air fan, which is not illustrated.

The high-temperature side radiator 22 is placed in the front side in the driving-device room. Therefore, during running of the vehicle, traveling wind (namely, outside air OA) flowed into the driving-device room through the grill can be directed to the high-temperature side radiator 22. The high-temperature side merging portion 26b is connected, at its one flow-inlet port, to the heat-medium outlet port of the high-temperature side radiator 22.

The heater core 23 is a heat exchanging portion for heating blowing air W, and is adapted to perform heat exchange between blowing air W to be blown into the room and the high-temperature side heat medium heated by the water-refrigerant heat exchanger 12 and the like. The heater core 23 is placed within the casing 41 of the room-interior air conditioning unit 40. The heater core 23 heats blowing air W, using heat absorbed by the refrigerant in the chiller 15, as a heat source. The high-temperature side merging portion 26b is connected, at its other flow-inlet port, to the heat-medium outlet port of the heater core 23.

The high-temperature side merging portion 26b merges the flow of the refrigerant flowed out from the high-temperature side radiator 22 and the flow of the refrigerant flowed out from the heater core 23. The high-temperature side merging portion 26b is a three-way joint which is similar to the refrigerant merging portion 13b and the like. The high-temperature side pump 21 is connected, at its suction inlet port, to the flow outlet port of the high-temperature side merging portion 26b, with a high-temperature side reserve tank 27 interposed therebetween.

The high-temperature side reserve tank 27 is a high-temperature side heat-medium storage portion for storing a surplus portion of the high-temperature side heat medium in the high-temperature side heat-medium circuit 20. The high-temperature side heat-medium circuit 20 is adapted to suppress reduction of the amount of the high-temperature side heat medium in the liquid state which is circulated through the high-temperature side heat-medium circuit 20, since the high-temperature side reserve tank 27 is placed therein. The high-temperature side reserve tank 27 has a heat-medium supply port for supplying the high-temperature side heat medium, in the event of shortage of the amount of the high-temperature side heat medium, within the high-temperature side heat-medium circuit 20.

Next, the low-temperature side heat-medium circuit 30 will be described. The low-temperature side heat-medium circuit 30 is a fluid circulation circuit for circulating a low-temperature side heat medium, which is a fluid. In the low-temperature side heat-medium circuit 30, a heat medium of the same type as that of the high-temperature side heat medium is employed, as the low-temperature side heat medium. In the low-temperature side heat-medium circuit 30, there are placed a low-temperature side pump 31, a heat-medium passage 152 in the chiller 15, a low-temperature side radiator 32, a flow passage switching valve 33, a cooling-water passage 70a in the battery 70, a cooling-water passage 71a in an in-vehicle apparatus 71, and the like.

The heat-medium passage 152 in the chiller 15 is connected, at its inlet port into which the low-temperature side heat medium flows, to the discharge port of the low-temperature side pump 31. The low-temperature side pump 31 is a pump for pumping the low-temperature side heat medium to the heat-medium passage 152 in the chiller 15. The low-temperature side pump 31 basically has the same structure as that of the high-temperature side pump 21.

The flow passage switching valve 33 is connected, at its first inlet 300A, to the outlet port of the heat-medium passage 152 in the chiller 15. The flow passage switching valve 33 is a low-temperature side heat-medium circuit switcher for switching the circuit configuration of the low-temperature side heat-medium circuit 30. The flow passage switching valve 33 is provided with a plurality of inlets and a plurality of outlets. The cooling-water passage 70a in the battery 70, the low-temperature side radiator 32 and the like are connected to these inlets and these outlets. The flow passage switching valve 33 will be described later in detail, in terms of its structure.

The battery 70 supplies electric power to electric in-vehicle apparatuses, such as electric motors. The battery 70 is a battery pack constituted by a plurality of battery cells which are electrically connected to each other in series or in parallel. The battery cells are dischargeable and chargeable secondary batteries (in the present embodiment, lithium-ion batteries). The battery 70 is constituted by the plurality of battery cells which are placed to be stacked in a substantially-rectangular parallelepiped shape and are housed in a dedicated casing.

At lower temperatures, the battery of this type tends to reduce its output, since chemical reactions are inhibited from progressing therein. The battery generates heat during operations (namely, during charging and discharging). Further, the battery tends to deteriorate progressively at high temperatures. Therefore, it is desirable that the temperature of the battery is maintained within an appropriate temperature range (equal to or higher than 15° C. but equal to or lower than 55° C., in the present embodiment) which enables sufficient utilization of the charging/discharging capacity of the battery.

The cooling-water passage 70a in the battery 70 is formed in the dedicated casing of the battery 70. The cooling-water passage 70a is a heat-medium passage for performing heat exchange between the low-temperature side heat medium and the battery 70. More specifically, the cooling-water passage 70a is a heat-medium passage for heat absorption, which is adapted to cause the low-temperature side heat medium to absorb heat of the battery 70 (namely, waste heat of the battery 70). Accordingly, the battery 70 in the low-temperature side heat-medium circuit 30 is a heating apparatus for heating the low-temperature side heat medium.

The passage configuration of the cooling-water passage 70a is such a passage configuration that a plurality of passages are connected in parallel within the dedicated casing. Thus, the cooling-water passage 70a is formed such that it can uniformly absorb heat exhausted from the battery 70 over the entire area of the battery 70. In other words, the cooling-water passage 70a is formed such that it can uniformly absorb heat of all the battery cells, thereby cooling all the battery cells.

The low-temperature side radiator 32 is an outside-air heat exchanger for performing heat exchange between outside air OA blown from the outside-air fan and the low-temperature side heat medium flowed out from a second outlet 300D in the flow passage switching valve 33.

The low-temperature side radiator 32 is placed in the front side in the driving-device room, downstream of the high-temperature side radiator 22 in the direction of outside-air flows. Accordingly, the low-temperature side radiator 32 performs heat exchange between the low-temperature side heat medium and outside air OA passed through the high-temperature side radiator 22. The low-temperature side radiator 32 may be also formed integrally with the high-temperature side radiator 22.

A low-temperature side merging portion 36b is connected, at its one flow-inlet port, to the heat-medium outlet port of the low-temperature side radiator 32, with a low-temperature side reserve tank 37 interposed therebetween.

The low-temperature side reserve tank 37 is a low-temperature side heat-medium storage portion for storing a surplus portion of the low-temperature side heat medium in the low-temperature side heat-medium circuit 30. The low-temperature side reserve tank 37 basically has the same structure as that of the high-temperature side reserve tank 27. The low-temperature side merging portion 36b is a three-way joint which is similar to the high-temperature side merging portion 26b and the like.

The low-temperature side pump 31 is connected, at its suction inlet port, to the flow-outlet port of the low-temperature side merging portion 36b. In other words, the low-temperature side pump 31 is placed in the flow passage which reaches the inlet port of the heat-medium passage 152 in the chiller 15 from the flow-outlet port of the low-temperature side merging portion 36b, in the low-temperature side heat-medium circuit 30.

An apparatus cooling passage 38 is connected to the low-temperature side heat-medium circuit 30, wherein the cooling-water passage 71a in the in-vehicle apparatus 71 is placed in the apparatus cooling passage 38. The apparatus cooling passage 38 is connected thereto, such that the low-temperature side heat medium downstream of the low-temperature side reserve tank 37 and upstream of the low-temperature side merging portion 36b is returned, again, to the inlet port of the low-temperature side radiator 32.

An apparatus pump 38a is placed in the apparatus cooling passage 38. The apparatus pump 38a pumps the low-temperature side heat medium to the cooling-water passage 71a in the in-vehicle apparatus 71. The apparatus pump 38a basically has the same structure as that of the low-temperature side pump 31.

The in-vehicle apparatus 71 is an apparatus which generates heat during operations. More specifically, the in-vehicle apparatus 71 is an electric motor, an inverter, a control device for an advanced driver-assistance system, or the like. The electric motor is an in-vehicle apparatus which outputs driving force for traveling. The inverter is an in-vehicle apparatus which supplies electric power to the electric motor. The control device for the advanced driver-assistance system is a control device for a so-called ADAS.

In order to properly operate the in-vehicle apparatus 71, it is desirable that the temperature of the in-vehicle apparatus 71 is maintained within a proper temperature range, similarly to the battery 70. Incidentally, the proper temperature range for the in-vehicle apparatus 71 is different from the proper temperature range for the battery 70. In the present embodiment, the upper limit value in the proper temperature range for the in-vehicle apparatus 71 is higher than the upper limit value in the proper temperature range for the battery 70.

Inside the casing or the housing portion which forms the outer shell of the in-vehicle apparatus 71, there is formed the cooling-water passage 71a for flowing the low-temperature side heat medium therethrough. The cooling-water passage 71a is a heat-medium passage for heat absorption, which is adapted to cause the low-temperature side heat medium to absorb heat of the in-vehicle apparatus 71 (namely, waste heat of the in-vehicle apparatus 71).

Further, an apparatus bypass passage 38b is connected to the low-temperature side heat-medium circuit 30. The apparatus bypass passage 38b is a heat-medium passage for causing the low-temperature side heat medium flowed out from the cooling-water passage 71a in the in-vehicle apparatus 71 to return to the suction inlet port of the apparatus pump 38a, again, by bypassing the low-temperature side radiator 32 and the like.

An apparatus flow-rate adjustment valve 38c is placed, upstream of a connection portion of the apparatus bypass passage 38b in the direction of the flow of the low-temperature side heat medium, in the apparatus cooling passage 38. The apparatus flow-rate adjustment valve 38c adjusts the flow rate of the low-temperature side heat medium flowing into the apparatus cooling passage 38. The apparatus flow-rate adjustment valve 38c basically has the same structure as those of the first high-temperature side flow-rate adjustment valve 24a and the like.

In the apparatus bypass passage 38b, there is placed an apparatus opening/closing valve 38d for opening and closing the apparatus bypass passage 38b. The apparatus opening/closing valve 38d is an electromagnetic valve which is controlled in opening/closing operation, by a control voltage outputted from the control device 50.

Further, a short-circuit heat-medium passage 39 is connected to the low-temperature side heat-medium circuit 30, wherein the short-circuit heat-medium passage 39 directs the low-temperature side heat medium flowed out from a third outlet 300E in the flow passage switching valve 33 to the other flow-inlet port of the low-temperature side merging portion 36b.

Next, with reference to FIGS. 2 to 6, the flow passage switching valve 33 will be described in detail, regarding the structure thereof. As illustrated in an external-appearance perspective view in FIG. 2, the flow passage switching valve 33 includes a body 301 which is made of a metal or a resin and, further, is formed to have a circular cylindrical shape with a bottom. The body 301 includes a plurality of inlets for causing the low-temperature side heat medium to flow inside, and a plurality of outlets for causing the low-temperature side heat medium to flow out from the inside.

More specifically, the body 301 according to the present embodiment includes two inlets and three outlets. Therefore, the flow passage switching valve 33 can be called a five-way valve having five inlet/outlet ports.

As the two inlets, there are provided the first inlet 300A and a second inlet 300C.

The first inlet 300A is an inlet for causing the low-temperature side heat medium pumped from the low-temperature side pump 31 and passed through the heat-medium passage 152 in the chiller 15 to flow inside. The first inlet 300A is an inlet for causing the low-temperature side heat medium pumped from the low-temperature side pump 31 through the heat-medium passage 152 in the chiller 15 to flow inside. The second inlet 300C is an inlet for causing the low-temperature side heat medium flowed out from the cooling-water passage 70a in the battery 70 to flow inside.

As the three outlets, there are provided a first outlet 300B, the second outlet 300D and the third outlet 300E.

The first outlet 300B is an outlet for causing the low-temperature side heat medium to flow out toward the inlet port of the cooling-water passage 70a in the battery 70. The cooling-water passage 70a in the battery 70 is placed in a heat-medium passage which reaches the second inlet 300C from the first outlet 300B. In other words, the cooling-water passage 70a in the battery 70 is placed in the heat-medium passage which reaches the second inlet 300C from the first outlet 300B. The second inlet 300C is an inlet for causing the low-temperature side heat medium flowed out through the first outlet 300B outside of the body 301 to flow inside, again.

The second outlet 300D is an outlet for causing the low-temperature side heat medium to flow out toward the heat-medium inlet port of the low-temperature side radiator 32. The third outlet 300E is an outlet for causing the low-temperature side heat medium to flow out toward the inlet port of the heat-medium passage 152 in the chiller 15 (namely, toward the short-circuit heat-medium passage 39).

Figure 3:
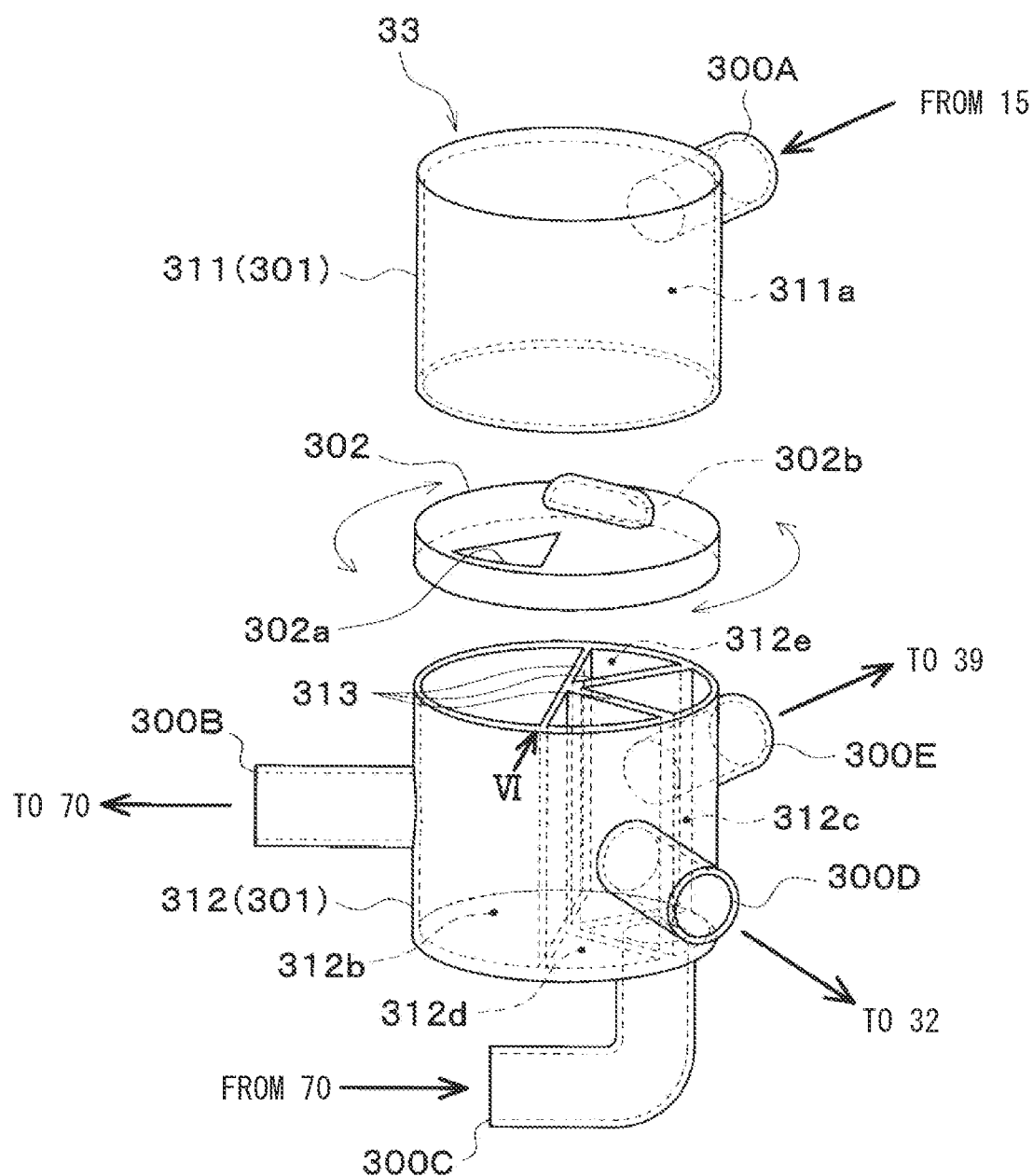
FIG. 3 is a schematic exploded perspective view illustrating an interior structure of the flow passage switching valve according to the first embodiment.

As illustrated in a perspective view schematically illustrating the internal structure in FIG. 3, the body 301 is divided into a first body 311 and a second body 312. The first body 311 and the second body 312 are both formed to have a circular cylindrical shape and are placed coaxially. The first body 311 is closed by a lid portion at its one end in the axial direction and is opened at its other end. The second body 312 is closed by a bottom portion at its other end in the axial direction and is opened at its one end.

A first inlet-side space 311a is formed inside the first body 311. The first inlet-side space 311a is a space with a substantially circular column shape which communicates with the first inlet 300A.

A first outlet-side space 312b, a second inlet-side space 312c, a second outlet-side space 312d, and a third outlet-side space 312e are formed inside the second body 312. More specifically, inside the second body 312, there are placed a plurality of partition plates 313 which spread radially from the center axis. The partition plates 313 section the internal space of the second body 312 into a plurality of spaces around the center axis.

The first outlet-side space 312b is a space which communicates with the first outlet 300B. The second inlet-side space 312c is a space which communicates with the second inlet 300C. The second outlet-side space 312d is a space which communicates with the second outlet 300D. The third outlet-side space 312e is a space which communicates with the third outlet 300E.

The first outlet-side space 312b, the second inlet-side space 312c, the second outlet-side space 312d and the third outlet-side space 312e are each formed to have a column shape having an arc-shaped cross section and extending in the axial direction. The first outlet-side space 312b, the third outlet-side space 312e, the second inlet-side space 312c and the second outlet-side space 312d are placed, in the order of the first outlet-side space 312b, the third outlet-side space 312e, the second inlet-side space 312c and the second outlet-side space 312d, in the clockwise direction, when viewed in the axial direction from the first body 311.

Namely, the second inlet-side space 312c is placed adjacent to both the second outlet-side space 312d and the third outlet-side space 312e in the circumferential direction.

A disk-shaped slide valve 302 made of a metal or a resin is placed between the first body 311 and the second body 312. The slide valve 302 is a switcher which switches the passage configuration of the fluid passage formed in the body 301, by being rotated and displaced about the axis of the body 301. The slide valve 302 is rotated and displaced by being coupled to a driving mechanism, which is not illustrated. The driving mechanism is controlled in operation by control signals outputted from the control device 50.

The slide valve 302 forms the first inlet-side space 311*a*, at its one surface closer to the first body 311, in cooperation with the first body 311. The slide valve 302 forms the first outlet-side space 312*b*, the second inlet-side space 312*c*, the second outlet-side space 312*d*, and the third outlet-side space 312*e*, at its other surface closer to the second body 312, in cooperation with the second body 312. Its other surface closer to the second body 312 serves as a sealing surface which comes into surface-to-surface contact with the plurality of partition plates 313 in the second body 312, in order to switch the passage configuration of the fluid passage.

The slide valve 302 is provided with a through hole 302*a* which penetrates the front and back of the slide valve 302. The through hole 302*a* is formed to have an arc shape, when viewed in the axial direction. The arc shape of the through hole 302*a* has a center angle which is set to be equal to or smaller than the smallest center angle, out of the center angle of the arc shape of the second inlet-side space 312*c*, the center angle of the arc shape of the second outlet-side space 312*d*, the center angle of the arc shape of the first outlet-side space 312*b*, and the center angle of the arc shape of the third outlet-side space 312*e*.

Therefore, it is possible to cause the first inlet-side space 311*a* to communicate with either one of the plurality of outlet-side spaces, through the through hole 302*a*, by rotating and displacing the slide valve 302 about the axis. In other words, it is possible to switch over to a passage configuration for causing the low-temperature side heat medium flowed in through the first inlet 300A to flow out through either one of the plurality of outlets, by rotating and displacing the slide valve 302 about the axis.

In the present embodiment, more specifically, it is possible to cause the first inlet-side space 311*a* to communicate with either one of the first outlet-side space 312*b*, the second outlet-side space 312*d* and the third outlet-side space 312*e*, by rotating and displacing the slide valve 302 about the axis. This enables switching over to either one passage configuration, out of a passage configuration for causing the low-temperature side heat medium flowed in through the first inlet 300A to flow out through the first outlet 300B, a passage configuration for causing the same low-temperature side heat medium to flow out through the second outlet 300D, and a passage configuration for causing the same low-temperature side heat medium to flow out through the third outlet 300E.

The passage configuration for causing the low-temperature side heat medium flowed in through the first inlet 300A to flow out through the first outlet 300B is adapted to cause the low-temperature side heat medium flowed into the first inlet-side space 311*a* to flow from one end side of the body 301 in the axial direction to the other end side thereof. The same applies to the passage configuration for causing the low-temperature side heat medium flowed in through the first inlet 300A to flow out through the second outlet 300D and the passage configuration for causing the low-temperature side heat medium flowed in through the first inlet 300A to flow out through the third outlet 300E.

A pressure loss is induced in the low-temperature side heat medium flowing through the through hole 302*a*. Therefore, when the slide valve 302 has been displaced in such a way as to cause the first inlet-side space 311*a* to communicate with the first outlet-side space 312*b*, the pressure of the low-temperature side heat medium in the first inlet-side space 311*a* is lower than the pressure of the low-temperature side heat medium in the first outlet-side space 312*b*. Further, due to the pressure difference, a load toward the second body 312 from the first body 311 is exerted on the slide valve 302. The load caused by the pressure difference can be adjusted through the opening area of the through hole 302*a*.

The slide valve 302 is provided, in its other surface, with a communication groove 302*b* for causing spaces adjacent to each other, out of the second inlet-side space 312*c*, the second outlet-side space 312*d*, the first outlet-side space 312*b* and the third outlet-side space 312*e*, to communicate with each other. The through hole 302*a* and the communication groove 302*b* are placed substantially symmetrically with respect to the rotational shaft of the slide valve 302. Namely, the through hole 302*a* and the communication groove 302*b* are placed in such a way as to be spaced apart from each other by an angle of about 180 degrees.

Therefore, it is possible to cause the second inlet-side space 312*c* to communicate with either one of the plurality of outlet-side spaces, through the communication groove 302*b*, by rotating and displacing the slide valve 302 about the axis. In the present embodiment, the positional relationship between the through hole 302*a* and the communication groove 302*b* is properly determined, so that the outlet-side space with which the first inlet-side space 311*a* is caused to communicate is different from the outlet-side space with which the second inlet-side space 312*c* is caused communicate.

In other words, it is possible to switch over to a passage configuration for causing the low-temperature side heat medium flowed in through the second inlet 300C to flow out through either one of the plurality of outlets, by rotating and displacing the slide valve 302 about the axis. Further, the outlet for causing the low-temperature side heat medium flowed in through the second inlet 300C to flow out is different from the outlet for causing the low-temperature side heat medium flowed in through the first inlet 300A to flow out.

In the present embodiment, more specifically, it is possible to cause the second inlet-side space 312*c* to communicate with either one of the second outlet-side space 312*d* and the third outlet-side space 312*e*, by rotating and displacing the slide valve 302 about the axis. This enables switching over to either one passage configuration, out of a passage configuration for causing the low-temperature side heat medium flowed in through the second inlet 300C to flow out through the second outlet 300D and a passage configuration for causing the same low-temperature side heat medium to flow out through the third outlet 300E.

The passage configuration for causing the low-temperature side heat medium flowed in through the second inlet 300C to flow out through the second outlet 300D is adapted to turn the low-temperature side heat medium flowed into the second inlet-side space 312*c*, regarding the direction of the flow thereof from the other-end side in the axial direction toward the one-end side, within the communication groove 302*b*. Further, the low-temperature side heat medium is flowed from the one-end side in the axial direction toward the other-end side, in the second outlet-side space 312*d*. The same applies to the passage configuration for causing the low-temperature side heat medium flowed in through the second inlet 300C to flow out through the third outlet 300E.

Figure 4:
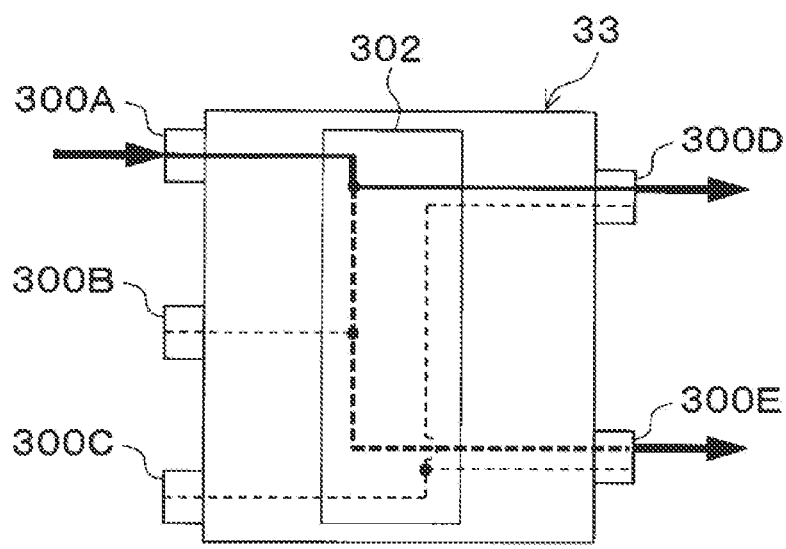
FIG. 4 is an explanation view illustrating a switchover state of a passage configuration of the flow passage switching valve according to the first embodiment.

Accordingly, as illustrated by a thick line and a thick broken line in FIG. 4, with the flow passage switching valve 33 according to the present embodiment, it is possible to switch over between the passage configuration for causing the low-temperature side heat medium flowed inside through the first inlet 300A to flow out through the second outlet 300D and the passage configuration for causing the same low-temperature side heat medium to flow out through the third outlet 300E.

Figure 5:
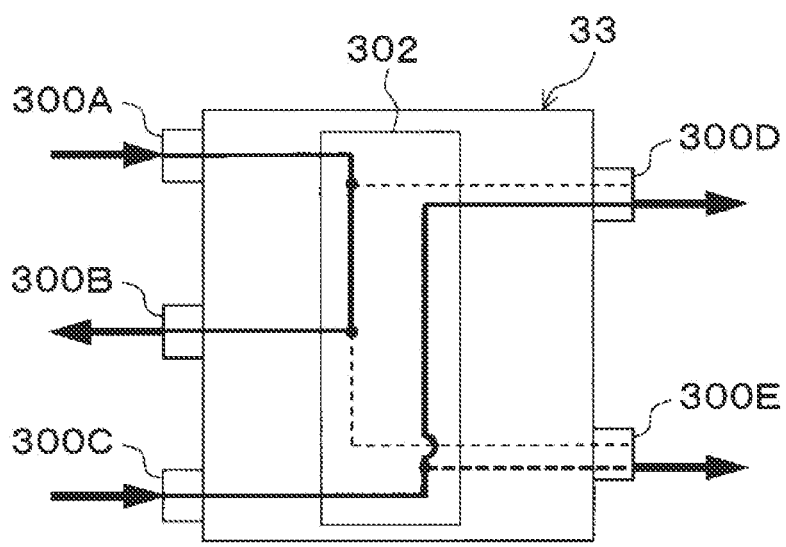
FIG. 5 is an explanation view illustrating another switchover state of the passage configuration of the flow passage switching valve according to the first embodiment.

Further, as illustrated by a thick solid line in FIG. 5, with the flow passage switching valve 33, it is possible to cause the low-temperature side heat medium flowed inside through the first inlet 300A to flow out through the first outlet 300B. In this state, as illustrated by a thick line and a thick broken line in FIG. 5, it is possible to switch over between the passage configuration for causing the low-temperature side heat medium flowed inside through the second inlet 300C to flow out through the second outlet 300D and the passage configuration for causing the same low-temperature side heat medium to flow out through the third outlet 300E.

Figure 6:
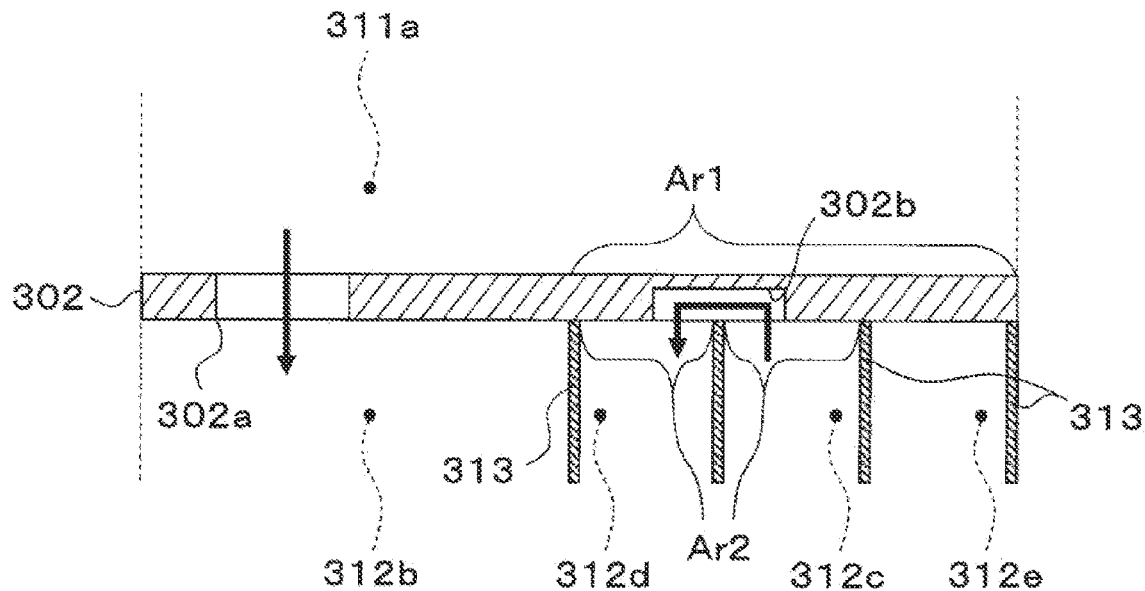
FIG. 6 is an explanation view for explaining a first area and a second area in the flow passage switching valve according to the first embodiment.

As illustrated in an explanation view in FIG. 6, the slide valve 302 according to the present embodiment is adapted such that a first area Ar1 is greater than a second area Ar2.

The first area Ar1 is the area of the portion on which the pressure of the low-temperature side heat medium flowed into the first inlet-side space 311a acts toward the second body 312, in one surface of the slide valve 302. The second area Ar2 is the area of the portion on which the pressure of the low-temperature side heat medium flowed into the second inlet-side space 312c acts toward the first body 311, in the other surface of the slide valve 302.

FIG. 6 is an explanation view illustrating the positional relationship between the slide valve 302 and the respective spaces formed in the first body 311 and the second body 312, which is developed around the axis of the body 301, in order to explain the first area Ar1 and the second area Ar2. In more detail, FIG. 6 schematically illustrates the positional relationship which can be recognized by moving the periphery of the body 301 in the clockwise direction by a single rotation (360 degrees), while viewing the center axis from the outer periphery of the body 301, as illustrated by an arrow VI in FIG. 3.

Further, FIG. 6 illustrates a state where the slide valve 302 has been displaced, such that the through hole 302a causes the first inlet-side space 311a to communicate with the first outlet-side space 312b, and the communication groove 302b causes the second inlet-side space 312c to communicate with the second outlet-side space 312d.

As described above, the cooling-water passage 70a in the battery 70 is connected, at its inlet port, to the first outlet 300B in the flow passage switching valve 33. The cooling-water passage 70a in the battery 70 is connected, at its outlet port, to the second inlet 300C. Accordingly, the pressure of the low-temperature side heat medium flowed out through the first outlet 300B is higher than the pressure of the low-temperature side heat medium flowing into the second inlet 300C, by an amount corresponding to the pressure loss induced in the low-temperature side heat medium flowing through the cooling-water passage 70a in the battery 70.

Further, the pressure of the low-temperature side heat medium flowed out through the first outlet 300B is highest, when the slide valve 302 has been displaced such that the first inlet-side space 311a communicates with the first outlet-side space 312b. Accordingly, the highest value of the pressure of the low-temperature side heat medium flowed out through the first outlet 300B is equal to that of the pressure of the low-temperature side heat medium flowing into the first inlet 300A.

In view of the aforementioned description, with the flow passage switching valve 33 according to the present embodiment, a first pressure PA of the low-temperature side heat medium flowing into the first inlet 300A has a value higher than a second pressure PB of the low-temperature side heat medium flowing into the second inlet 300C.

In other words, in the low-temperature side heat-medium circuit 30 according to the present embodiment, the first pressure PA of the low-temperature side heat medium flowing into the first inlet 300A in the flow passage switching valve 33 is set to have a value higher than that of the second pressure PB of the low-temperature side heat medium flowed into the second inlet 300C in the flow passage switching valve 33.

In the temperature adjustment device 1 according to the present embodiment, the low-temperature side heat medium is flowed through the cooling-water passage 70a in the battery 70, in order to cool the battery 70. Accordingly, the low-temperature side heat medium is raised in temperature during flowing through the cooling-water passage 70a in the battery 70. Therefore, the temperature of the low-temperature side heat medium upstream of the cooling-water passage 70a in the direction of the heat-medium flow is lower than the temperature of the low-temperature side heat medium downstream of the cooling-water passage 70a in the direction of the heat-medium flow.

Accordingly, with the flow passage switching valve 33 according to the present embodiment, a first temperature TA of the low-temperature side heat medium flowed out through the first outlet 300B has a value lower than a second temperature TB of the low-temperature side heat medium flowing into the second inlet 300C. In other words, in the low-temperature side heat-medium circuit 30 according to the present embodiment, the first temperature TA of the low-temperature side heat medium flowed out through the first outlet 300B is set to have a value lower than that of the second temperature TB of the low-temperature side heat medium flowing into the second inlet 300C.

Further, with the flow passage switching valve 33 according to the present embodiment, the length of the passage which reaches the second outlet 300D from the first inlet 300A is set to be smaller than a total length, which will be described later. In this case, the length of the passage can be defined as the length of a line connecting the-center-of-gravity points in cross sections of the fluid passage which are perpendicular to the direction of the flow, and the like. The total length is defined as the sum of the length of the passage which reaches the first outlet 300B from the first inlet 300A and the length of the passage which reaches the second outlet 300D from the second inlet 300C.

Figure 7:
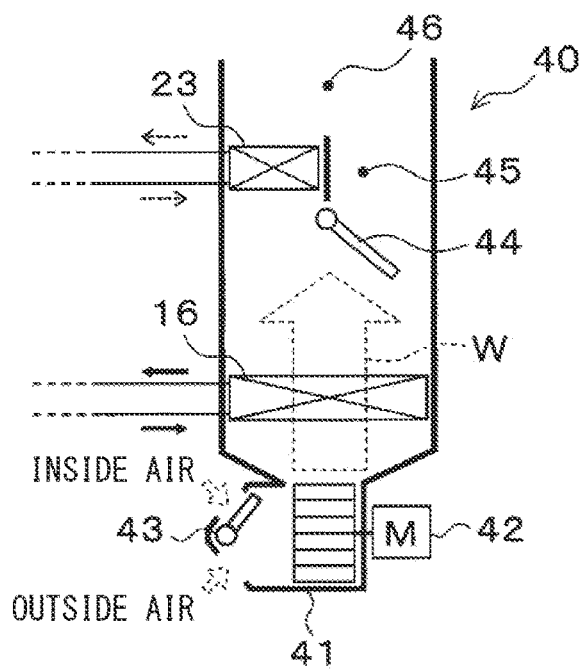
FIG. 7 is a schematic view of the structure of an air-conditioning unit according to the first embodiment.

Next, with reference to FIG. 7, the room-interior air conditioning unit 40 will be described. The room-interior air conditioning unit 40 is a unit for blowing out blowing air W having been properly adjusted in temperature, toward an appropriate position in the vehicle compartment, in the temperature adjustment device 1. The room-interior air conditioning unit 40 is placed inside an instrument panel at the frontmost portion in the vehicle compartment.

The room-interior air conditioning unit 40 includes the casing 41 which forms an air passage for blowing air W. In the air passage formed in the casing 41, there are placed a room-interior air blower 42, the room-interior evaporator 16, the heater core 23, and the like. The casing 41 is made of a resin (for example, polypropylene) having a certain degree of elasticity and excellent strength.

In the most upstream side in the casing 41 in the direction of the blowing-air flow, there is placed an inside/outside air switching device 43. The inside/outside air switching device 43 directs inside air (air inside the vehicle compartment) and outside air (air outside the vehicle compartment) into the casing 41, in such a way as to switch over therebetween. An electric actuator for driving the inside/outside air switching device 43 is controlled in operation by control signals outputted from the control device 50.

Downstream of the inside/outside air switching device 43 in the direction of the blowing-air flow, there is placed the room-interior air blower 42. The room-interior air blower 42 blows air inhaled through the inside/outside air switching device 43, toward the inside of the vehicle compartment. The room-interior air blower 42 is an electric air blower adapted to drive a centrifugal multi-blade fan through an electric motor. The room-interior air blower 42 is controlled in rotating speed (namely, air blowing ability) by a control voltage outputted from the control device 50.

Downstream of the room-interior air blower 42 in the direction of the blowing-air flow, there are placed the room-interior evaporator 16 and the heater core 23, in the mentioned order, with respect to the blowing-air flow. Namely, the room-interior evaporator 16 is placed upstream of the heater core 23 in the direction of the blowing-air flow. Within the casing 41, there is formed a cooling-air bypass passage 45 for causing the blowing air W passed through the room-interior evaporator 16 to flow downstream, by bypassing the heater core 23.

Downstream of the room-interior evaporator 16 in the direction of the blowing-air flow and upstream of the heater core 23 in the direction of the blowing-air flow, there is placed an air mixing door 44. The air mixing door 44 adjusts the air-quantity ratio, which is the ratio between the quantity of air passing through the heater core 23 and the quantity of air passing through the cooling-air bypass passage 45, out of the blowing air W passed through the room-interior evaporator 16. An electric actuator for driving the air mixing door is controlled in operation by control signals outputted from the control device 50.

Downstream of the heater core 23 in the direction of the blowing-air flow, there is placed a mixing space 46 for mixing the blowing air W heated by the heater core 23 and the blowing air W which was passed through the cooling-air bypass passage 45 and, thus, was not heated by the heater core 23. At the most downstream portion of the casing 41 in the direction of the blowing-air flow, there are placed opening holes, which are not illustrated, for blowing out the air-conditioning air flow resulted from the mixture in the mixing space 46.

Accordingly, since the air mixing door 44 adjusts the air-quantity ratio, which is the ratio between the quantity of air passing through the heater core 23 and the quantity of air passing through the cooling-air bypass passage 45, it is possible to adjust the temperature of the air-conditioning air flow resulted from the mixture in the mixing space 46. Further, it is possible to adjust the temperature of the blowing air W blown out into the vehicle compartment through the respective opening holes.

As the opening holes, there are provided a face opening hole, a foot opening hole, and a defroster opening hole (all of which are not illustrated). The face opening hole is an opening hole for blowing out air-conditioning air flows toward the upper half body of an occupant in the vehicle compartment. The foot opening hole is an opening hole for blowing out air-conditioning air flows toward the feet of the occupant. The defroster opening hole is an opening hole for blowing out air-conditioning air flows toward the inner surface of the vehicle front window glass.

Upstream of these opening holes, there is placed a blow-out mode switching door, which is not illustrated. The blow-out mode switching door is adapted to open and close the respective opening holes, in order to switch the opening hole for blowing out air-conditioning air flows therethrough. An electric actuator for the blow-out mode switching door is controlled in operation by control signals outputted from the control device 50.

Next, the general outline of an electric control portion in the temperature adjustment device 1 will be described. The control device 50 is constituted by a well-known microcomputer including a CPU, a ROM, a RAM and the like, and peripheral circuits therefor. The control device 50 executes various types of operations and processes, based on air-conditioning control programs stored in the ROM, for controlling the operations of various types of to-be-controlled apparatuses 11, 14a, 14b, 21, 24a, 24b, 25, 31, 33, 38a, 38c, 38d, 42, 43 and the like, which are connected to its output.

As illustrated in FIG. 1, sensors 51 for controlling are connected to the input of the control device 50. These sensors 51 for controlling include an inside-air temperature detection portion for detecting the temperature Tr of the inside of the vehicle compartment (the inside-air temperature), a battery temperature detection portion for detecting the temperature Tb1 of the battery 70, an in-vehicle apparatus temperature detection portion for detecting the temperature Tb2 of the in-vehicle apparatus 71, and the like.

Further, a manipulation panel 52 is connected to the input of the control device 50. The manipulation panel 52 is provided with, for example, a temperature setting portion for setting the temperature of the inside of the vehicle compartment, and the like. Detection signals from the sensors 51 and manipulation signals from the manipulation panel 52 are inputted to the control device 50.

The control device 50 is constituted by control portions which are integrated, wherein the control portions are adapted to control the respective to-be-controlled apparatuses of various types which are connected to the output of the control device 50. Namely, the control portions adapted to control the operations of the respective to-be-controlled apparatuses are constituted by structures (hardware and software) for controlling the operations of the respective to-be-controlled apparatuses. For example, a flow passage-switching-valve control portion 50a is constituted by a structure for controlling the operation of the flow passage switching valve 33, in the control device 50.

In FIG. 1, signal lines and electric-power lines which connect the control device 50 to the various types of to-be-controlled apparatuses, signal lines which connect the control device 50 to the various types of sensors, and the like are not illustrated, for clarifying the illustration.

Next, the temperature adjustment device 1 having the aforementioned structure according to the present embodiment will be described, regarding its operations. With the temperature adjustment device 1 according to the present embodiment, it is possible to switch over among respective types of running modes, in order to perform air conditioning for the inside of the vehicle compartment and adjustment of the temperature of the battery 70. More specifically, it is possible to switch over among an apparatus cooling mode, an outside-air cooling mode and an outside-air heat absorption mode. Hereinafter, the respective running modes will be described.

(a) The Apparatus Cooling Mode

The apparatus cooling mode is a running mode for performing air conditioning for the inside of the vehicle compartment through operations of the refrigeration cycle device 10 and for cooling the battery 70 through the low-temperature side heat medium cooled by the refrigeration cycle device 10.

In the apparatus cooling mode, the control device 50 controls the operation of the flow passage switching valve 33, in such a way as to cause the low-temperature side heat medium flowed therein through the first inlet 300A to flow out through the first outlet 300B and to cause the low-temperature side heat medium flowed therein through the second inlet 300C to flow out through the third outlet 300E.

Therefore, in the apparatus cooling mode, in the low-temperature side heat-medium circuit 30, the low-temperature side heat medium discharged from the low-temperature side pump 31 is circulated through the heat-medium passage 152 in the chiller 15, (the first inlet 300A to the first outlet 300B in the flow passage switching valve 33), the cooling-water passage 70a in the battery 70, (the second inlet 300C to the third outlet 300E in the flow passage switching valve 33), the short-circuit heat-medium passage 39, and the suction port of the low-temperature side pump 31, in the mentioned order.

In the apparatus cooling mode, in the refrigeration cycle device 10, when the control device 50 operates the compressor 11, the high-pressure refrigerant discharged from the compressor 11 flows into the refrigerant passage 121 in the water-refrigerant heat exchanger 12. The control device 50 adjusts the refrigerant discharging ability of the compressor 11, such that the temperature of blowing air W cooled by the room-interior evaporator 16 gets equal to a target evaporator temperature TEO.

The target evaporator temperature TEO is determined by referring to a control map stored preliminarily in the control device 50, based on detection signals from the sensors 51 connected to the control device 50. The control map for the apparatus cooling mode sets the target evaporator temperature TEO to be equal to or higher than a frost-deposition suppressing temperature (1° C. in the present embodiment), in order to suppress frost deposition in the room-interior evaporator 16.

The refrigerant flowed into the water-refrigerant heat exchanger 12 releases heat to the high-temperature side heat medium flowing through the heat-medium passage 122 after having been pumped from the high-temperature side pump 21 and, thus, the refrigerant gets to be a sub-cooled liquid refrigerant. Thus, the high-temperature side heat medium flowing through the heat-medium passage 122 is heated thereby.

The flow of the refrigerant flowed out from the water-refrigerant heat exchanger 12 diverges at the refrigerant diverging portion 13a. One refrigerant flow resulted from the divergence at the refrigerant diverging portion 13a is reduced in pressure by the first expansion valve 14a and, then, is flowed into the refrigerant passage 151 in the chiller 15. The control device 50 adjusts the throttle opening of the first expansion valve 14a, such that the temperature of the low-temperature side heat medium flowed out from the heat-medium passage 152 in the chiller 15 gets closer to a target cooling temperature TBO.

The target cooling temperature TBO is determined by referring to the control map stored preliminarily in the control device 50, based on detection signals from the sensors 51 connected to the control device 50. The control map for the apparatus cooling mode sets the target cooling temperature TBO, such that the temperature Tb1 of the battery 70 is maintained within an appropriate temperature range.

The refrigerant flowed into the refrigerant passage 151 in the chiller 15 absorbs heat from the low-temperature side heat medium flowing through the heat-medium passage 152 to be evaporated. Thus, the low-temperature side heat medium flowing through the heat-medium passage 152 is cooled thereby. The refrigerant flowed out from the chiller 15 is flowed into the refrigerant merging portion 13b.

The other refrigerant flow resulted from the divergence at the refrigerant diverging portion 13a is reduced in pressure by the second expansion valve 14b and, then, is flowed into the room-interior evaporator 16. The control device 50 adjusts the throttle opening of the second expansion valve 14b, such that the degree of superheat of the refrigerant inhaled into the compressor 11 gets closer to a predetermined reference degree of superheat KSH (5° C. in the present embodiment). Therefore, in the apparatus cooling mode, the refrigerant evaporating temperature in the room-interior evaporator 16 may get equal to the refrigerant evaporating temperature in the chiller 15, in some cases.

The refrigerant flowed into the room-interior evaporator 16 absorbs heat from blowing air W blown from the room-interior air blower 42 to be evaporated. Thus, the blowing air W is cooled thereby. The refrigerant flowed out from the room-interior evaporator 16 is flowed into the refrigerant merging portion 13b, through the evaporating-pressure adjustment valve 17. The refrigerant merging portion 13b merges the flow of the refrigerant flowed out from the room-interior evaporator 16 and the flow of the refrigerant flowed out from the chiller 15 and, further, causes them to flow out toward the suction side of the compressor 11.

In the high-temperature side heat-medium circuit 20, when the control device 50 operates the high-temperature side pump 21, the high-temperature side heat medium pumped from the high-temperature side pump 21 is flowed into the heat-medium passage 122 in the water-refrigerant heat exchanger 12. The high-temperature side heat medium flowed into the heat-medium passage 122 exchanges heat with the high-pressure refrigerant flowing through the refrigerant passage 121 and, thus, is heated thereby.

The flow of the high-temperature side heat medium flowed out from the water-refrigerant heat exchanger 12 diverges into a flow flowing into the high-temperature side radiator 22 from the high-temperature side diverging portion 26a and a flow flowing into the heater core 23 from the high-temperature side diverging portion 26a.

The control device 50 controls the operations of the first high-temperature side flow-rate adjustment valve 24a and the second high-temperature side flow-rate adjustment valve 24b, such that an outlet-side heat-medium temperature THC, which is the temperature of the high-temperature side heat medium flowed out from the heater core 23, gets closer to a predetermined reference outlet-side heat-medium temperature KTHC. Namely, the control device 50 adjusts the high-temperature side flow-rate ratio, such that the outlet-side heat-medium temperature THC gets closer to the reference outlet-side heat-medium temperature KTHC.

If the outlet-side heat-medium temperature THC does not reach the reference outlet-side heat-medium temperature KTHC even when the first high-temperature side flow-rate adjustment valve 24a is fully closed, the control device 50 causes the electric heater 25 to exert its heating ability. The heating ability of the electric heater 25 is adjusted such that the outlet-side heat-medium temperature THC gets closer to the reference outlet-side heat-medium temperature KTHC.

The high-temperature side heat medium flowed into the high-temperature side radiator 22 exchanges heat with outside air OA blown from the outside-air fan and, thus, releases heat thereto. Thus, the high-temperature side heat medium flowing through the high-temperature side radiator 22 is cooled thereby. The high-temperature side heat medium flowed out from the high-temperature side radiator 22 flows into the high-temperature side merging portion 26b.

On the other hand, the high-temperature side heat medium flowed into the heater core 23 exchanges heat with blowing air W passed through the room-interior evaporator 16 and, thus, releases heat thereto. Thus, the blowing air W cooled by the room-interior evaporator 16 is heated, again. The control device 50 adjusts the opening in the air mixing door 44, such that the blow-out temperature of blowing air W blown into the vehicle compartment gets closer to a target blow-out temperature TAO.

The high-temperature side heat medium flowed out from the heater core 23 flows into the high-temperature side merging portion 26b. The high-temperature side merging portion 26b merges the flow of the high-temperature side heat medium flowed out from the heater core 23 and the flow of the high-temperature side heat medium flowed out from the high-temperature side radiator 22 and, further, causes them to flow out toward the suction side of the high-temperature side pump 21.

In the low-temperature side heat-medium circuit 30, when the control device 50 operates the low-temperature side pump 31, the low-temperature side heat medium pumped from the low-temperature side pump 31 is flowed into the heat-medium passage 152 in the chiller 15. The low-temperature side heat medium flowed into the chiller 15 exchanges heat with the low-pressure refrigerant flowing through the refrigerant passage 151 and, thus, is cooled thereby.

The low-temperature side heat medium flowed out from the chiller 15 flows into the inside of the flow passage switching valve 33 through the first inlet 300A thereof and, then, flows out therefrom through the first outlet 300B. The low-temperature side heat medium flowed out through the first outlet 300B flows into the cooling-water passage 70a in the battery 70. The heat medium flowed into the cooling-water passage 70a in the battery 70 absorbs exhaust heat from the battery 70 during flowing through the cooling-water passage 70a. Thus, the battery 70 is cooled thereby.

The low-temperature side heat medium flowed out from the cooling-water passage 70a in the battery 70 flows into the inside of the flow passage switching valve 33 through the second inlet 300C thereof and, then, flows out therefrom through the third outlet 300E. The low-temperature side heat medium flowed out through the third outlet 300E is directed to the suction side of the low-temperature side pump 31, through the short-circuit heat-medium passage 39 and the low-temperature side merging portion 36b.

In the apparatus cooling mode, the aforementioned operations are performed, so that blowing air W cooled by the room-interior evaporator 16 can be blown out into the vehicle compartment, after being re-heated by the heater core 23. At this time, a surplus portion of heat for re-heating the blowing air W can be released to outside air in the high-temperature side radiator 22. Accordingly, blowing air W having been adjusted to an appropriate temperature can be blown into the vehicle compartment, thereby realizing a comfortable air conditioning.

Further, in the apparatus cooling mode, the low-temperature side heat medium cooled by the chiller 15 is caused to flow into the cooling-water passage 70a in the battery 70, thereby cooling the battery 70.

(b) The Outside-Air Cooling Mode

The outside-air cooling mode is a running mode for performing air conditioning for the inside of the vehicle compartment through the operation of the refrigeration cycle device 10 and for cooling the battery 70 through the low-temperature side heat medium cooled by outside air.

In the outside-air cooling mode, the control device 50 controls the operation of the flow passage switching valve 33, in such a way as to cause the low-temperature side heat medium flowed in through the first inlet 300A to flow out through the first outlet 300B and to cause the low-temperature side heat medium flowed in through the second inlet 300C to flow out through the second outlet 300D. The control device 50 fully closes the first expansion valve 14a.

Therefore, in the outside-air cooling mode, in the low-temperature side heat-medium circuit 30, the low-temperature side heat medium discharged from the low-temperature side pump 31 is circulated through the heat-medium passage 152 in the chiller 15, (the first inlet 300A to the first outlet 300B in the flow passage switching valve 33), the cooling-water passage 70a in the battery 70, (the second inlet 300C to the second outlet 300D in the flow passage switching valve 33), the low-temperature side radiator 32, and the suction port of the low-temperature side pump 31, in the mentioned order.

In the outside-air cooling mode, in the refrigeration cycle device 10, similarly to in the apparatus cooling mode, the high-pressure refrigerant discharged from the compressor 11 is cooled to be a sub-cooled liquid refrigerant in the water-refrigerant heat exchanger 12. Further, the high-temperature side heat medium flowing through the heat-medium passage 122 in the water-refrigerant heat exchanger 12 is heated.

The refrigerant flowed out from the water-refrigerant heat exchanger 12 is flowed into the refrigerant diverging portion 13a. In the outside-air cooling mode, since the first expansion valve 14a is fully closed, the refrigerant flowed into the refrigerant diverging portion 13a is reduced in pressure by the second expansion valve 14b and, then, is flowed into the room-interior evaporator 16. The control device 50 adjusts the throttle opening of the second expansion valve 14b, similarly to in the apparatus cooling mode.

The low-pressure refrigerant flowed into the room-interior evaporator 16 absorbs heat from blowing air W and, thus, is evaporated, similarly to in the apparatus cooling mode. Thus, the blowing air W is cooled thereby. The refrigerant flowed out from the room-interior evaporator 16 is inhaled by the compressor 11, through the evaporating-pressure adjustment valve 17 and the refrigerant merging portion 13b.

In the high-temperature side heat-medium circuit 20, the control device 50 controls the operations of the constituent apparatuses, similarly to in the apparatus cooling mode. Thus, the outlet-side heat-medium temperature THC of the high-temperature side heat medium gets closer to the reference outlet-side heat-medium temperature KTHC.

In the low-temperature side heat-medium circuit 30, when the control device 50 operates the low-temperature side pump 31, the low-temperature side heat medium pumped from the low-temperature side pump 31 is flowed into the heat-medium passage 152 in the chiller 15. In the outside-air cooling mode, since the first expansion valve 14a is fully closed, the low-temperature side heat medium flowed into the heat-medium passage 152 in the chiller 15 is flowed out therefrom, without exchanging heat with the low-pressure refrigerant.

The low-temperature side heat medium flowed out from the chiller 15 flows into the inside of the flow passage switching valve 33 through the first inlet 300A thereof and, then, flows out therefrom through the first outlet 300B. The low-temperature side heat medium flowed out through the first outlet 300B flows into the cooling-water passage 70a in the battery 70. The heat medium flowed into the cooling-water passage 70a in the battery 70 absorbs exhaust heat from the battery 70 during flowing through the cooling-water passage 70a. Thus, the battery 70 is cooled thereby.

The low-temperature side heat medium flowed out from the cooling-water passage 70a in the battery 70 flows into the inside of the flow passage switching valve 33 through the second inlet 300C thereof and, then, flows out therefrom through the second outlet 300D. The low-temperature side heat medium flowed out through the second outlet 300D is flowed into the low-temperature side radiator 32.

The low-temperature side heat medium flowed into the low-temperature side radiator 32 exchanges heat with outside air OA which was blown from the outside-air fan and passed through the high-temperature side radiator 22 and, thus, the low-temperature side heat medium releases heat thereto. Thus, the low-temperature side heat medium flowing through the low-temperature side radiator 32 is cooled thereby. The low-temperature side heat medium flowed out from the low-temperature side radiator 32 is directed to the suction side of the low-temperature side pump 31, through the low-temperature side merging portion 36b.

In the outside-air cooling mode, the aforementioned operations are performed, so that blowing air W cooled by the room-interior evaporator 16 can be blown out into the vehicle compartment, after being re-heated by the heater core 23. Accordingly, blowing air W having been adjusted to an appropriate temperature can be blown into the vehicle compartment, thereby realizing a comfortable air conditioning, similarly to in the apparatus cooling mode.

Further, in the outside-air cooling mode, the low-temperature side heat medium having been cooled through heat exchange with outside air in the low-temperature side radiator 32 is caused to flow into the cooling-water passage 70a in the battery 70, thereby cooling the battery 70.

In this case, in the outside-air cooling mode, if the battery 70 is not required to be cooled, the control device 50 may cause the low-temperature side heat medium flowed in through the first inlet 300A to flow out through the third outlet 300E. In this way, the low-temperature side heat medium flowed out from the heat-medium passage 152 in the chiller 15 can be returned to the suction side of the low-temperature side pump 31, through the short-circuit heat-medium passage 39 and the low-temperature side merging portion 36b.

(c) The Outside-Air Heat Absorption Mode

The outside-air heat absorption mode is a running mode for warming the inside of the vehicle compartment through operations of the refrigeration cycle device 10, without cooling the battery 70. The outside-air heat absorption mode is a running mode which is executed when the outside-air temperature is lower (for example, at 10° C. or lower).

In the outside-air heat absorption mode, the control device 50 controls the operation of the flow passage switching valve 33, in such a way as to cause the low-temperature side heat medium flowed in through the first inlet 300A to flow out through the second outlet 300D. The control device 50 fully closes the second expansion valve 14b. Further, the control device 50 adjusts the opening in the air mixing door 44, such that the cooling-air bypass passage 45 is fully closed.

Therefore, in the outside-air cooling mode, in the low-temperature side heat-medium circuit 30, the low-temperature side heat medium discharged from the low-temperature side pump 31 is circulated through the heat-medium passage 152 in the chiller 15, (the first inlet 300A to the second outlet 300D in the flow passage switching valve 33), the low-temperature side radiator 32, and the suction port of the low-temperature side pump 31, in the mentioned order.

In the outside-air cooling mode, in the refrigeration cycle device 10, similarly to in the apparatus cooling mode, the high-pressure refrigerant discharged from the compressor 11 is cooled to be a sub-cooled liquid refrigerant in the water-refrigerant heat exchanger 12. Further, the high-temperature side heat medium flowing through the heat-medium passage 122 in the water-refrigerant heat exchanger 12 is heated.

The refrigerant flowed out from the water-refrigerant heat exchanger 12 is flowed into the refrigerant diverging portion 13a. In the outside-air cooling mode, since the second expansion valve 14b is fully closed, the refrigerant flowed into the refrigerant diverging portion 13a is reduced in pressure by the first expansion valve 14a and, then, is flowed into the refrigerant passage 151 in the chiller 15. The control device 50 adjusts the throttle opening of the first expansion valve 14a, such that the refrigerant evaporating temperature in the chiller 15 is lower than the outside-air temperature.

The low-pressure refrigerant flowed into the chiller 15 absorbs heat from the low-temperature side heat medium flowing through the heat-medium passage 152 and, thus, is evaporated, similarly to in the apparatus cooling mode. Thus, the low-temperature side heat medium is cooled thereby. The refrigerant flowed out from the chiller 15 is flowed into the compressor 11, through the refrigerant merging portion 13b.

In the high-temperature side heat-medium circuit 20, the control device 50 controls the operations of the constituent apparatuses, similarly to in the apparatus cooling mode. Thus, the outlet-side heat-medium temperature THC of the high-temperature side heat medium gets closer to the reference outlet-side heat-medium temperature KTHC.

In the low-temperature side heat-medium circuit 30, when the control device 50 operates the low-temperature side pump 31, the low-temperature side heat medium pumped from the low-temperature side pump 31 is flowed into the heat-medium passage 152 in the chiller 15. The low-temperature side heat medium flowed into the chiller 15 exchanges heat with the low-pressure refrigerant flowing through the refrigerant passage 151 and, thus, is cooled to a lower temperature than the outside-air temperature.

The low-temperature side heat medium flowed out from the chiller 15 flows into the inside of the flow passage switching valve 33 through the first inlet 300A thereof and, then, flows out therefrom through the second outlet 300D. The low-temperature side heat medium flowed out through the second outlet 300D is flowed into the low-temperature side radiator 32.

The low-temperature side heat medium flowed into the low-temperature side radiator 32 exchanges heat with outside air OA which was blown from the outside-air fan and passed through the high-temperature side radiator 22 and, thus, the low-temperature side heat medium absorbs heat therefrom. Thus, the temperature of the low-temperature side heat medium flowing through the low-temperature side radiator 32 is raised to get closer to the outside-air temperature. The low-temperature side heat medium flowed out from the low-temperature side radiator 32 is directed to the suction side of the low-temperature side pump 31, through the low-temperature side merging portion 36b.

In the outside-air heat absorption mode, the aforementioned operations are performed, so that blowing air W heated by the heater core 23 can be blown out into the vehicle compartment. Accordingly, in the outside-air heat absorption mode, it is possible to warm the inside of the vehicle compartment, without cooling the battery 70.

Incidentally, the outside-air heat absorption mode is a running mode which is executed when the outside-air temperature is lower. Further, the temperature of the low-temperature side heat medium flowed out from the heat-medium passage 152 in the chiller 15 gets equal to or lower than the outside air temperature. Accordingly, a first lowest temperature Twm1 of the low-temperature side heat medium flowed out through the second outlet 300D after flowing into the inside of the flow passage switching valve 33 through the first inlet 300A gets equal to or lower than the outside air temperature.

On the other hand, in the outside-air heat absorption mode, the low-temperature side heat medium is not flowed through the flow passage which reaches the second inlet 300C from the first outlet 300B. Further, the cooling-water passage 70a in the battery 70 is placed in the flow passage which reaches the second inlet 300C from the first outlet 300B, in the low-temperature side heat-medium circuit 30. Therefore, the first lowest temperature Twm1 is lower than a second lowest temperature Twm2 in the flow passage which reaches the second inlet 300C from the first outlet 300B.

With the temperature adjustment device 1 according to the present embodiment, regardless of the aforementioned various types of running modes, the control device 50 controls the operations of the various types of to-be-controlled apparatuses, such that the temperature Tb2 of the in-vehicle apparatus 71 is maintained within an appropriate temperature range.

More specifically, the control device 50 operates the apparatus pump 38a, in such a way as to cause it to exert predetermined forcibly-transferring ability, regardless of the aforementioned various types of running modes.

If the temperature Tb2 of the in-vehicle apparatus 71 gets equal to or higher than a reference upper-limit value, the apparatus flow-rate adjustment valve 38c is caused to have an appropriate degree of opening, and the apparatus opening/closing valve 38d is closed. Thus, the low-temperature side heat medium having been cooled by the low-temperature side radiator 32 can be flowed into the cooling-water passage 71a in the in-vehicle apparatus 71. As a result thereof, the in-vehicle apparatus 71 can be cooled by the low-temperature side heat medium having been cooled by outside air.

On the other hand, if the temperature Tb2 of the in-vehicle apparatus 71 gets equal to or lower than a reference lower-limit value, the apparatus flow-rate adjustment valve 38c is fully closed, and the apparatus opening/closing valve 38d is opened. In this way, the low-temperature side heat medium flowed out from the cooling-water passage 71a can be returned, again, to the inlet port of the cooling-water passage 71a, through the apparatus bypass passage 38b. As a result thereof, the in-vehicle apparatus 71 can be warmed through self-heating of the in-vehicle apparatus 71.

As described above, with the temperature adjustment device 1 according to the present embodiment, it is possible to realize comfortable air conditioning for the inside of the vehicle compartment and, also, it is possible to adjust the temperatures of the battery 70 and the in-vehicle apparatus 71 to appropriate temperatures, through switchover among the respective running modes.

Further, since the low-temperature side heat-medium circuit 30 according to the present embodiment includes the flow passage switching valve 33, it is possible to provide excellent advantages which will be described hereinafter.

Since the flow passage switching valve 33 is not formed from a combination of a plurality of opening/closing valves, a plurality of three-way valves and the like, the flow passage switching valve 33 is inhibited from having an increased size. This can inhibit the low-temperature side heat-medium circuit 30 incorporating the flow passage switching valve 33 from having an increased size. This results in improvement of the productivity of the low-temperature side heat-medium circuit 30.

Further, with the flow passage switching valve 33 according to the present embodiment, the first pressure PA of the low-temperature side heat medium flowing into the first inlet 300A is higher than the second pressure PB of the low-temperature side heat medium flowing into the second inlet 300C. Accordingly, with the flow passage switching valve 33, it is possible to enhance the sealing characteristic of the slide valve 302, using the pressure difference between the first pressure PA and the second pressure PB.

More specifically, with the flow passage switching valve 33 according to the present embodiment, as described with reference to FIG. 6, the first area Ar1 in one surface of the slide valve 302 is larger than the second area Ar2 in the other surface thereof. Accordingly, the value of the product of the first pressure PA and the first area Ar1 is larger than the value of the product of the second pressure PB and the second area Ar2. Thus, a load toward the second body 312 from the first body 311 can be exerted on the slide valve 302.

Further, due to the load toward the second body 312 from the first body 311, the slide valve 302 can be pressed against the end portions of the partition plates 313 in the second body 312. This can enhance the sealing characteristics between the respective spaces 312b to 312e formed in the second body 312, even though the slide valve 302 is employed.

Further, with the flow passage switching valve 33 according to the present embodiment, the slide valve 302 is provided with the through hole 302a. This enables easily causing the first inlet-side space 311a formed in the first body 311 to communicate with the respective spaces 312b to 312e formed in the second body 312.

Further, with the flow passage switching valve 33 according to the present embodiment, the slide valve 302 is provided with the communication groove 302b in its other surface. This enables easily causing the spaces placed adjacent to each other in the circumferential direction, out of the respective spaces 312b to 312e formed in the second body 312, to communicate with each other.

In the present embodiment, more specifically, the second inlet-side space 312c is placed adjacent to both the second outlet-side space 312d and the third outlet-side space 312e. Accordingly, the second inlet 300C and the second outlet 300D can be easily caused to communicate with each other. Further, the second inlet 300C and the third outlet 300E can be easily caused to communicate with each other.

Further, with the flow passage switching valve 33 according to the present embodiment, the first temperature TA of the low-temperature side heat medium flowed out through the first outlet 300B is lower than the second temperature TB of the low-temperature side heat medium flowing into the second inlet 300C. This enables reducing the viscosity of the low-temperature side heat medium flowing into the second inlet 300C, by raising the temperature of the low-temperature side heat medium flowing into the second inlet 300C.

Accordingly, it is possible to reduce the pressure loss induced in the low-temperature side heat medium, while the low-temperature side heat medium flows through the fluid passage in the flow passage switching valve 33, after flowing therein through the second inlet 300C. More specifically, it is possible to reduce the pressure loss induced in the low-temperature side heat medium flowing through the fluid passage which reaches either one outlet, out of the second outlet 300D and the third outlet 300E, from the second inlet 300C.

This enables reducing the passage cross-sectional area of the fluid passage which reaches either one outlet, out of the second outlet 300D and the third outlet 300E, from the second inlet 300C, thereby reducing the size of the flow passage switching valve 33.

With the flow passage switching valve 33 according to the present embodiment, the direction of the flow of the low-temperature side heat medium is turned, in the fluid passage which reaches either one outlet, out of the second outlet 300D and the third outlet 300E, from the second inlet 300C. This tends to increase the pressure loss in the fluid passage which reaches either one of the second outlet 300D and the third outlet 300E, from the second inlet 300C.

Accordingly, it is extremely advantageous to reduce the pressure loss induced in the low-temperature side heat medium flowing through the fluid passage which reaches either one of the second outlet 300D and the third outlet 300E, from the second inlet 300C.

With the flow passage switching valve 33 according to the present embodiment, the first lowest temperature Twm1 is lower than the second lowest temperature Twm2. This may cause an increase of the viscosity of the low-temperature side heat medium, due to reduction of the temperature of the low-temperature side heat medium flowing through the passage which reaches the second outlet 300D from the first inlet 300A. This may result in an increase of the pressure loss induced in the low-temperature side heat medium flowing through the passage which reaches the second outlet 300D from the first inlet 300A.

For coping therewith, with the flow passage switching valve 33 according to the present embodiment, the length of the passage which reaches the second outlet 300D from the first inlet 300A is set to be smaller than the total length. This can suppress the increase of the pressure loss induced in the low-temperature side heat medium flowing through the fluid passage which reaches the second outlet 300D from the first inlet 300A.

This is advantageous in the outside-air heat absorption mode, which is a running mode for causing the low-temperature side heat medium flowed into the first inlet 300A to flow out through the second outlet 300D, wherein the first lowest temperature Twm1 is lowest.

With the flow passage switching valve 33 according to the present embodiment, the second inlet 300C is an inlet for causing the low-temperature side heat medium flowed outside through the first outlet 300B to flow inside, again. Further, the flow passage switching valve 33 is enabled to switch over to a passage configuration for causing the low-temperature side heat medium flowed in through the first inlet 300A to flow out through either one of the first outlet 300B and the second outlet 300D. Further, the flow passage switching valve 33 is enabled to switch over to a passage configuration for causing the low-temperature side heat medium flowed in through the second inlet 300C to flow out through either one of the second outlet 300D and the third outlet 300E.

This enables selecting the first outlet 300B or the second outlet 300D, as the outlet port for the low-temperature side heat medium flowed in through the first inlet 300A. Further, this enables selecting the second outlet 300D or the third outlet 300E, as the outlet port for the low-temperature side heat medium flowed in through the second inlet 300C.

Namely, by causing the low-temperature side heat medium flowed out through the first outlet 300B to flow in through the second inlet 300C, again, it is possible to select the third outlet 300E, as the outlet port for the low-temperature side heat medium flowed in through the first inlet 300A. Accordingly, with the flow passage switching valve 33 according to the present embodiment, it is possible to realize switchover of the passage configuration with higher versatility.

Further, in the low-temperature side heat-medium circuit 30 according to the present embodiment, the low-temperature side heat medium flowed out through the first outlet 300B in the flow passage switching valve 33 is caused to flow into the second inlet 300C. Further, the cooling-water passage 70a in the battery 70 is placed in the flow passage which reaches the second inlet 300C from the first outlet 300B.

In this way, the first pressure PA can be certainly made to have a larger value than the second pressure PB, due to the pressure loss induced in the low-temperature side heat medium flowing through the cooling-water passage 70a. Further, the first temperature TA can be certainly made to have a smaller value than the second temperature TB, since the low-temperature side heat medium absorbs exhaust heat from the battery 70, during flowing through the cooling-water passage 70a.

Further, in the low-temperature side heat-medium circuit 30 according to the present embodiment, the low-temperature side heat medium flowed out through the first outlet 300B in the flow passage switching valve 33 is caused to flow into the second inlet 300C. Further, the low-temperature side heat medium pumped from the low-temperature side pump 31 is caused to flow into the first inlet 300A, through the heat-medium passage 152 in the chiller 15.

This makes it easier to cause the first pressure PA to have a larger value than the second pressure PB, due to the effect of the dynamic pressure of the low-temperature side heat medium having been pumped from the low-temperature side pump 31.

Further, in the low-temperature side heat-medium circuit 30 according to the present embodiment, there is provided the low-temperature side pump 31, and the low-temperature side heat medium pumped from the low-temperature side pump 31 is flowed into the first inlet 300A. Further, the low-temperature side heat-medium circuit 30 has such a circuit configuration as to cause the low-temperature side heat medium flowed out through the first outlet 300B to flow into the second inlet 300C, again. This enables using a common pump, as pumps for pumping the low-temperature side heat medium to the first inlet 300A and the second inlet 300C.

Further, in the low-temperature side heat-medium circuit 30 according to the present embodiment, there is provided the low-temperature side reserve tank 37, and the low-temperature side pump 31 inhales the low-temperature side heat medium flowed out from the low-temperature side reserve tank 37. This allows the low-temperature side reserve tank 37 to have lower durability, in comparison with cases of causing the low-temperature side heat medium pumped from the low-temperature side pump 31 to directly flow into the low-temperature side reserve tank 37. This enables further reducing the size of the low-temperature side heat-medium circuit 30.

Second Embodiment

In the present embodiment, there will be described an example where a flow passage switching valve 33a is employed, as illustrated in FIGS. 8 to 10, unlike in the first embodiment. The flow passage switching valve 33a according to the present embodiment includes three opening/closing mechanisms, which are a first opening/closing mechanism 303a to a third opening/closing mechanism 303c, as a switcher for switching the passage configuration of a fluid passage formed therein. The first opening/closing mechanism 303a to the third opening/closing mechanism 303c are operated in conjunction with control signals outputted from a control device 50.

Inside the flow passage switching valve 33a, a first inlet 300A is connected to a first outlet 300B and a second outlet 300D. The first opening/closing mechanism 303a is placed in such a way as to open and close a fluid passage which reaches the second outlet 300D from the first inlet 300A.

Inside the flow passage switching valve 33a, a second inlet 300C is connected to the second outlet 300D and a third outlet 300E. The second opening/closing mechanism 303b is placed in such a way as to open and close a fluid passage which reaches the second outlet 300D from the second inlet 300C. The third opening/closing mechanism 303c is placed in such a way as to open and close a fluid passage which reaches the third outlet 300E from the second inlet 300C. The other structures of the temperature adjustment device 1 are the same as those of the first embodiment.

Next, there will be described operations of the temperature adjustment device 1 having the aforementioned structure according to the present embodiment.

The temperature adjustment device 1 according to the present embodiment basically operates similarly to in the first embodiment.

(a) The Apparatus Cooling Mode

In the apparatus cooling mode according to the present embodiment, the control device 50 closes the first opening/closing mechanism 303a, further closes the second opening/closing mechanism 303b, and opens the third opening/closing mechanism 303c. Thus, a low-temperature side heat medium flows through the flow passage switching valve 33a, as illustrated by a thick solid line in FIG. 8. Therefore, in the apparatus cooling mode, the low-temperature side heat medium is circulated through the low-temperature side heat-medium circuit 30, in exactly the same way as that in the apparatus cooling mode according to the first embodiment.

Accordingly, in the apparatus cooling mode, with the temperature adjustment device 1, it is possible to perform comfortable air conditioning for the inside of the vehicle compartment and cooling of the battery 70, similarly to in the first embodiment.

(b) The Outside-Air Cooling Mode

In the outside-air cooling mode according to the present embodiment, the control device 50 closes the first opening/closing mechanism 303a, further opens the second opening/closing mechanism 303b, and closes the third opening/closing mechanism 303c. Thus, the low-temperature side heat medium flows through the flow passage switching valve 33a, as illustrated by a thick solid line in FIG. 9. Therefore, in the outside-air cooling mode, the low-temperature side heat medium is circulated through the low-temperature side heat-medium circuit 30, in exactly the same way as that in the outside-air cooling mode according to the first embodiment.

Accordingly, in the outside-air cooling mode, with the temperature adjustment device 1, it is possible to perform comfortable air conditioning for the inside of the vehicle compartment and cooling of the battery 70, similarly to in the first embodiment.

(c) The Outside-Air Heat Absorption Mode

In the outside-air heat absorption mode according to the present embodiment, the control device 50 opens the first opening/closing mechanism 303a, further closes the second opening/closing mechanism 303b, and closes the third opening/closing mechanism 303c. Thus, the low-temperature side heat medium flows through the flow passage switching valve 33a, as illustrated by a thick solid line in FIG. 10. Therefore, in the outside-air heat absorption cooling mode, the low-temperature side heat medium is circulated through the low-temperature side heat-medium circuit 30, in exactly the same way as that in the outside-air heat absorption mode according to the first embodiment.

Accordingly, in the outside-air heat absorption mode, with the temperature adjustment device 1, it is possible to warm the inside of the vehicle compartment, without cooling the battery 70, similarly to in the first embodiment. The other operations are the same as those in the first embodiment.

The flow passage switching valve 33a according to the present embodiment is not formed from a combination of a plurality of opening/closing valves, a plurality of three-way valves and the like, similarly to that according to the first embodiment, and, therefore, the flow passage switching valve 33a is inhibited from having an increased size. This can inhibit the low-temperature side heat-medium circuit 30 incorporating the flow passage switching valve 33a from having an increased size. This results in improvement of the productivity of the low-temperature side heat-medium circuit 30.

Third Embodiment

In the present embodiment, there will be described an example where a flow passage switching valve 33b is employed, as illustrated in an entire structural view in FIG. 11, unlike in the second embodiment. In a temperature adjustment device 1 according to the present embodiment, a low-temperature side heat-medium circuit 30 has a circuit configuration which is different from that according to the second embodiment. The flow passage switching valve 33b according to the present embodiment is provided with a third inlet 300F, in addition to the flow passage switching valve 33a described in the second embodiment, as illustrated in FIGS. 12 to 14.

Inside the flow passage switching valve 33b, the third inlet 300F is connected to a third outlet 300E. The third inlet 300F and the third outlet 300E are connected to each other at a connection portion 36b1, which has the same functions as those of the low-temperature side merging portion 36b described in the first embodiment. The other structures of the temperature adjustment device 1 are the same as those of the second embodiment.

Next, there will be described operations of the temperature adjustment device 1 having the aforementioned structure according to the present embodiment. The temperature adjustment device 1 according to the present embodiment basically operates similarly to in the second embodiment.

(a) The Apparatus Cooling Mode

In the apparatus cooling mode, the control device 50 controls the operation of the flow passage switching valve 33b, similarly to in the second embodiment. Thus, a low-temperature side heat medium is flowed through the flow passage switching valve 33b, as illustrated by a thick solid line in FIG. 12.

Therefore, in the apparatus cooling mode, in the low-temperature side heat-medium circuit 30, the low-temperature side heat medium discharged from a low-temperature side pump 31 is circulated through a heat-medium passage 152 in a chiller 15, (a first inlet 300A to a first outlet 300B in the flow passage switching valve 33b), a cooling-water passage 70a in a battery 70, (a second inlet 300C to the third outlet 300E in the flow passage switching valve 33b), and the suction port of the low-temperature side pump 31, in the mentioned order.

Accordingly, in the apparatus cooling mode, with the temperature adjustment device 1, it is possible to perform comfortable air conditioning for the inside of the vehicle compartment and cooling of the battery 70, similarly to in the second embodiment.

(b) The Outside-Air Cooling Mode

In the outside-air cooling mode, the control device 50 controls the operation of the flow passage switching valve 33b, similarly to in the second embodiment. Thus, the low-temperature side heat medium is flowed through the flow passage switching valve 33b, as illustrated by a thick solid line in FIG. 13.

Therefore, in the outside-air cooling mode, in the low-temperature side heat-medium circuit 30, the low-temperature side heat medium discharged from the low-temperature side pump 31 is circulated through the heat-medium passage 152 in the chiller 15, (the first inlet 300A to the first outlet 300B in the flow passage switching valve 33b), the cooling-water passage 70a in the battery 70, (the second inlet 300C to a second outlet 300D in the flow passage switching valve 33b), a low-temperature side radiator 32, (the third inlet 300F to the third outlet 300E in the flow passage switching valve 33b), and the suction port of the low-temperature side pump 31, in the mentioned order.

Accordingly, in the outside-air cooling mode, with the temperature adjustment device 1, it is possible to perform comfortable air conditioning for the inside of the vehicle compartment and cooling of the battery 70, substantially, similarly to in the second embodiment.

(c) The Outside-Air Heat Absorption Mode

In the outside-air heat absorption mode, the control device 50 controls the operation of the flow passage switching valve 33b, similarly to in the second embodiment. Thus, the low-temperature side heat medium is flowed through the flow passage switching valve 33b, as illustrated by a thick solid line in FIG. 14.

Therefore, in the outside-air heat absorption mode, in the low-temperature side heat-medium circuit 30, the low-temperature side heat medium discharged from the low-temperature side pump 31 is circulated through the heat-medium passage 152 in the chiller 15, (the first inlet 300A to the second outlet 300D in the flow passage switching valve 33b), the low-temperature side radiator 32, (the third inlet 300F to the third outlet 300E in the flow passage switching valve 33b), and the suction port of the low-temperature side pump 31, in the mentioned order.

Accordingly, in the outside-air heat absorption mode, with the temperature adjustment device 1, it is possible to warm the inside of the vehicle compartment, without cooling the battery 70, substantially similarly to in the second embodiment. The other operations are the same as those in the first embodiment.

The flow passage switching valve 33b according to the present embodiment is not formed from a combination of a plurality of opening/closing valves, a plurality of three-way valves and the like, similarly to in the first embodiment, and, therefore, the flow passage switching valve 33b is inhibited from having an increased size. This can inhibit the low-temperature side heat-medium circuit 30 incorporating the flow passage switching valve 33a from having an increased size. This results in improvement of the productivity of the low-temperature side heat-medium circuit 30.

Fourth Embodiment

In the present embodiment, there will be described an example where a flow passage switching valve 33c illustrated in FIGS. 15 to 17 is employed, unlike in the second embodiment. The flow passage switching valve 33c according to the present embodiment is provided with a fourth outlet 300G, in addition to the flow passage switching valve 33a described in the second embodiment.

Inside the flow passage switching valve 33a, a first inlet 300A is connected to a first outlet 300B and a second outlet 300D. The first opening/closing mechanism 303a is placed in such a way as to open and close a fluid passage which reaches the second outlet 300D from the first inlet 300A.

Inside the flow passage switching valve 33a, a second inlet 300C is connected to a third outlet 300E and the fourth outlet 300G. A second opening/closing mechanism 303b is placed in such a way as to open and close a fluid passage which reaches the fourth outlet 300G from the second inlet 300C. The third opening/closing mechanism 303c is placed in such a way as to open and close a fluid passage which reaches the third outlet 300E from the second inlet 300C.

The second outlet 300D and the fourth outlet 300G are connected to a heat-medium inlet port of a low-temperature side radiator 32, through a radiator-side merging portion 36c. The other structures and operations of the temperature adjustment device 1 are the same as those of the second embodiment.

Accordingly, with the flow passage switching valve 33c and a low-temperature side heat-medium circuit 30 according to the present embodiment, it is possible to provide exactly the same advantages as those of the second embodiment.

With the flow passage switching valve 33c according to the present embodiment, the outlets for causing the low-temperature side heat medium flowed in through the first inlet 300A to flow out therefrom are completely different from the outlets for causing the low-temperature side heat medium flowed in through the second inlet 300C to flow out therefrom. In other words, there exists nothing common to both the outlets for causing the low-temperature side heat medium flowed in through the first inlet 300A to flow out therethrough and the outlets for causing the low-temperature side heat medium flowed in through the second inlet 300C to flow out therethrough. Therefore, with the flow passage switching valve 33c, it is possible to realize switchover of the passage configuration with further higher versatility.

Fifth Embodiment

Figure 18:
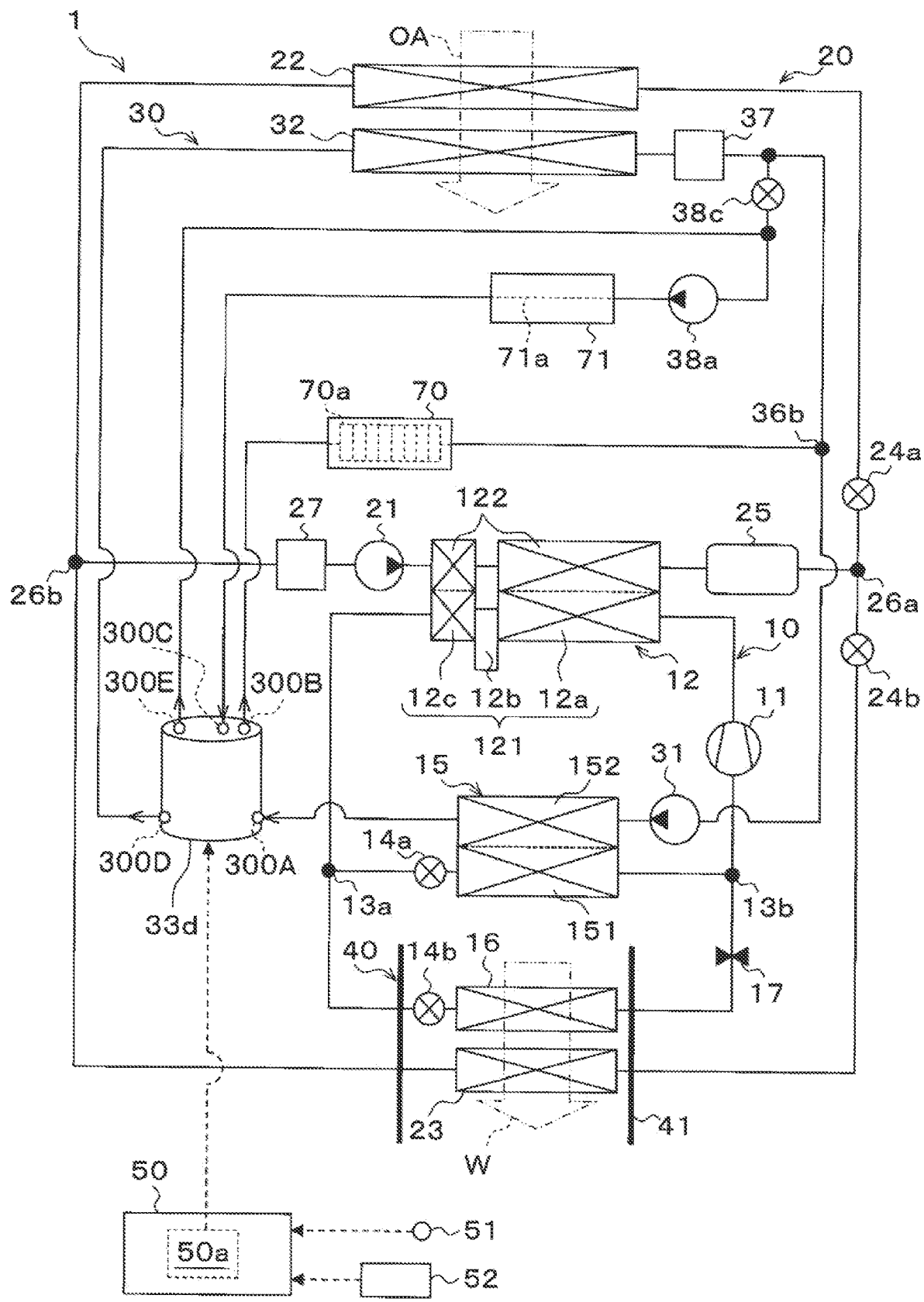
FIG. 18 is a view of the entire structure of a temperature adjustment device according to a fifth embodiment.

In the present embodiment, there will be described an example where a flow passage switching valve 33d is employed, as illustrated in an entire structural view in FIG. 18, unlike in the first embodiment. In a temperature adjustment device 1 according to the present embodiment, a low-temperature side heat-medium circuit 30 has a circuit configuration different from that in the first embodiment.

More specifically, in the low-temperature side heat-medium circuit 30 according to the present embodiment, a low-temperature side merging portion 36b is connected, at its other flow-inlet port, to the outlet port of a cooling-water passage 70a in a battery 70. The third outlet 300E in the flow passage switching valve 33d is connected to the outlet port of an apparatus flow-rate adjustment valve 38c and to the suction port of an apparatus pump 38a. The second inlet 300C in the flow passage switching valve 33d is connected to the outlet port of a cooling-water passage 71a in an in-vehicle apparatus 71.

Next, with reference to FIGS. 19 to 25, the flow passage switching valve 33d will be described in detail, regarding the structure thereof. The flow passage switching valve 33d basically has the same structure as that of the flow passage switching valve 33 described in the first embodiment. The flow passage switching valve 33d includes a body 301, a slide valve 302, a driver 303, a shaft 304, a gear mechanism 305, and the like.

The body 301 is formed from a tubular member with a bottom, which is made of a metal or a resin. The body 301 according to the present embodiment has an internal space which is sectioned into a plurality of inlet/outlet-side spaces which communicate with respective inlet/outlet ports, and a housing space which houses at least portions of the slide valve 302, the shaft 304, the gear mechanism 305 and the like.

Figure 19:
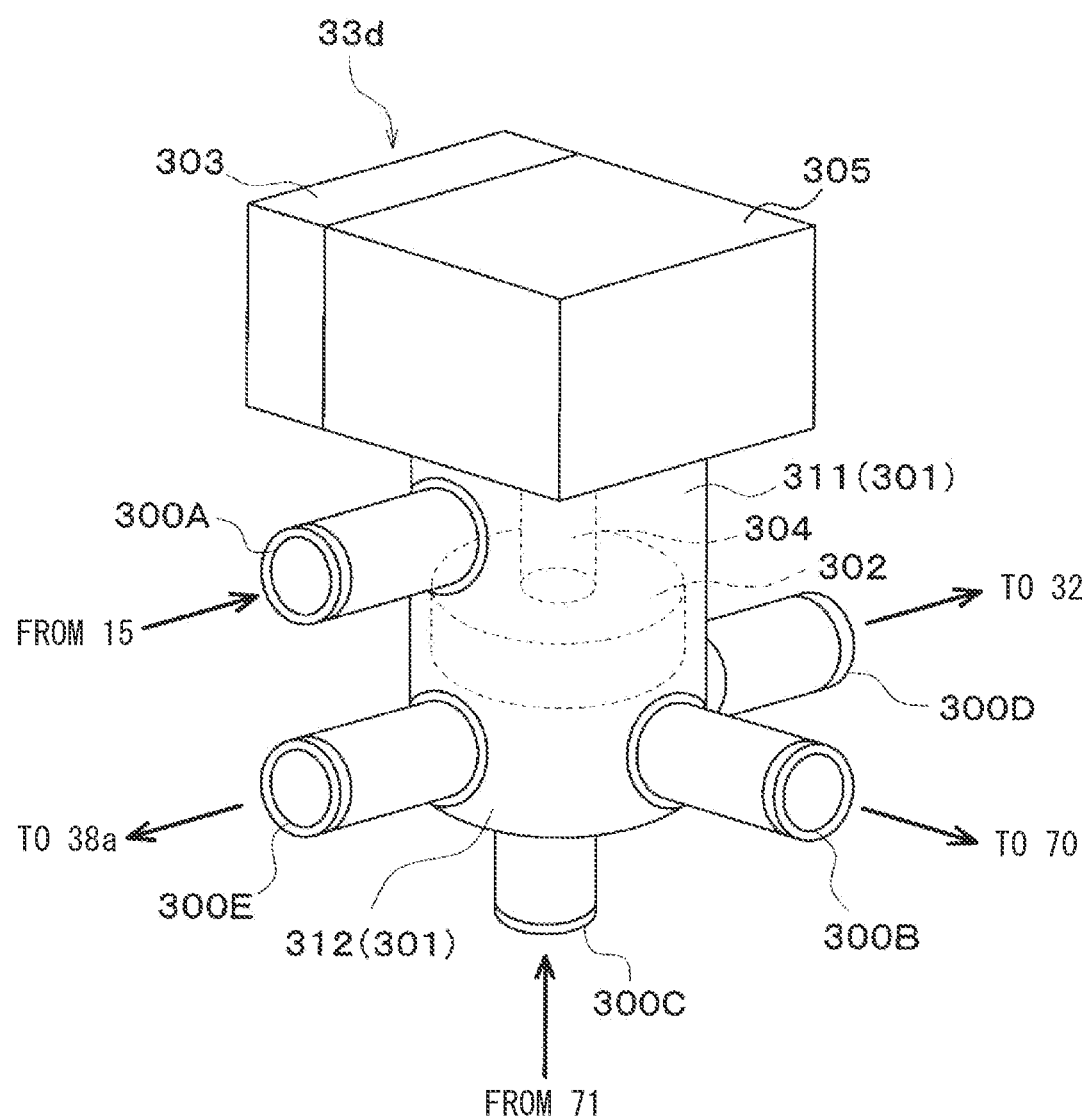
FIG. 19 is a perspective view of the external appearance of a flow passage switching valve according to the fifth embodiment.

The body 301 according to the present embodiment is provided with a first inlet 300A, a second inlet 300C, a first outlet 300B, a second outlet 300D and a third outlet 300E, which are similar to those in the first embodiment, as illustrated in FIG. 19.

The first inlet 300A, the first outlet 300B, the second outlet 300D, and the third outlet 300E are each formed from a tubular member extending in the radial direction of the body 301. The center axis of the tubular member which forms the first outlet 300B, the center axis of the tubular member which forms the second outlet 300D, and the center axis of the tubular member which forms the third outlet 300E are placed on the same plane.

The second inlet 300C is formed in the bottom surface of the body 301. The second inlet 300C is formed from a tubular member extending in the axial direction. Accordingly, the center axis of the tubular member which forms the second inlet 300C extends in the direction normal to the center axis of the tubular member which forms the first outlet 300B, the center axis of the tubular member which forms the second outlet 300D, and the center axis of the tubular member which forms the third outlet 300E.

The first inlet 300A is placed in one side in the direction of the center axis of the body 301, with respect to the first outlet 300B, the second outlet 300D, the third outlet 300E and the slide valve 302 (in the side closer to the driver 303, in the present embodiment). The second inlet 300C is placed in the other side in the direction of the center axis of the body 301, with respect to the first outlet 300B, the second outlet 300D and the third outlet 300E (in the opposite side from the driver 303, in the present embodiment).

Therefore, in the present embodiment, the portion of the body 301 which is closer to the driver 303 than the slide valve 302 forms a first body 311, while the portion thereof which is opposite from the driver 303 with respect to the slide valve 302 forms a second body 312. Namely, the first body 311 and the second body 312 are not limited to bodies separated from each other and may be also integrated with each other as in the present embodiment.

The driver 303 outputs driving force for rotating and displacing the slide valve 302. In the present embodiment, more specifically, a stepping motor is employed as the driver 303. The stepping motor is controlled in operation by control signals (more specifically, control pulses) outputted from the control device 50.

The shaft 304 is a rotational shaft for transmitting the driving force outputted from the driver 303, to the slide valve 302. The shaft 304 is formed from a metal member with a circular cylindrical shape which extends in the direction of the center axis of the body 301. The center axis of the shaft 304 is placed coaxially with the center axis of the body 301 and the center axis of the disk-shaped slide valve 302. The slide valve 302 is provided with a through hole 302a and a communication groove 302b, as described in the first embodiment.

The gear mechanism 305 couples the driver 303 and the slide valve 302 to each other, through the rotational shaft 304, in such a way as to transmit the driving force outputted from the driver 303. In the present embodiment, the gear mechanism 305 is constituted by a so-called worm-and-wheel type gear mechanism including a worm gear 305a, and a wheel gear 305b, as illustrated in schematic cross-sectional views in FIGS. 20 and 21.

The worm gear 305a is a screw gear constituted by a circular-cylindrical member having a spirally-grooved side surface. The worm gear 305a is secured to the rotational shaft of the stepping motor which forms the driver 303.

The wheel gear 305b is a helical gear constituted by a disk-shaped member having a side surface provided with helical teeth, which are engaged with the teeth in the worm gear 305a. The shaft 304 is secured, at its one end portion, to the center portion of the wheel gear 305b. The center axis of the wheel gear 305b is placed coaxially with the center axis of the shaft 304.

Accordingly, with the gear mechanism 305, if the driver 303 rotates the worm gear 305a, this causes the wheel gear 305b to rotate along with the rotation of the worm gear 305a. Further, along with the rotation of the wheel gear 305b, the shaft 304 can be rotated about the center axis of the body 301.

Figure 20:
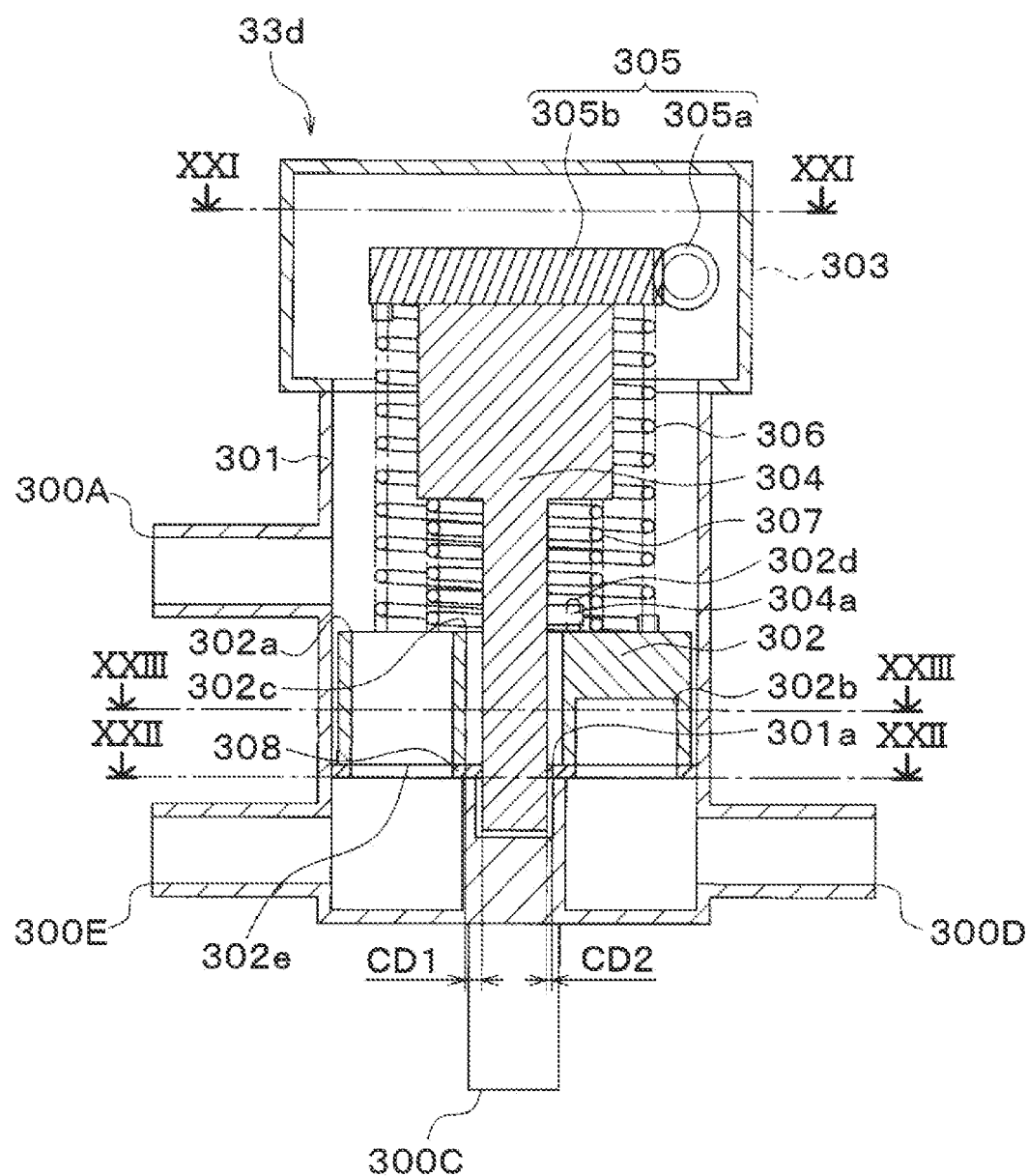
FIG. 20 is a schematic axial cross-sectional view of the flow passage switching valve according to the fifth embodiment.
Figure 21:
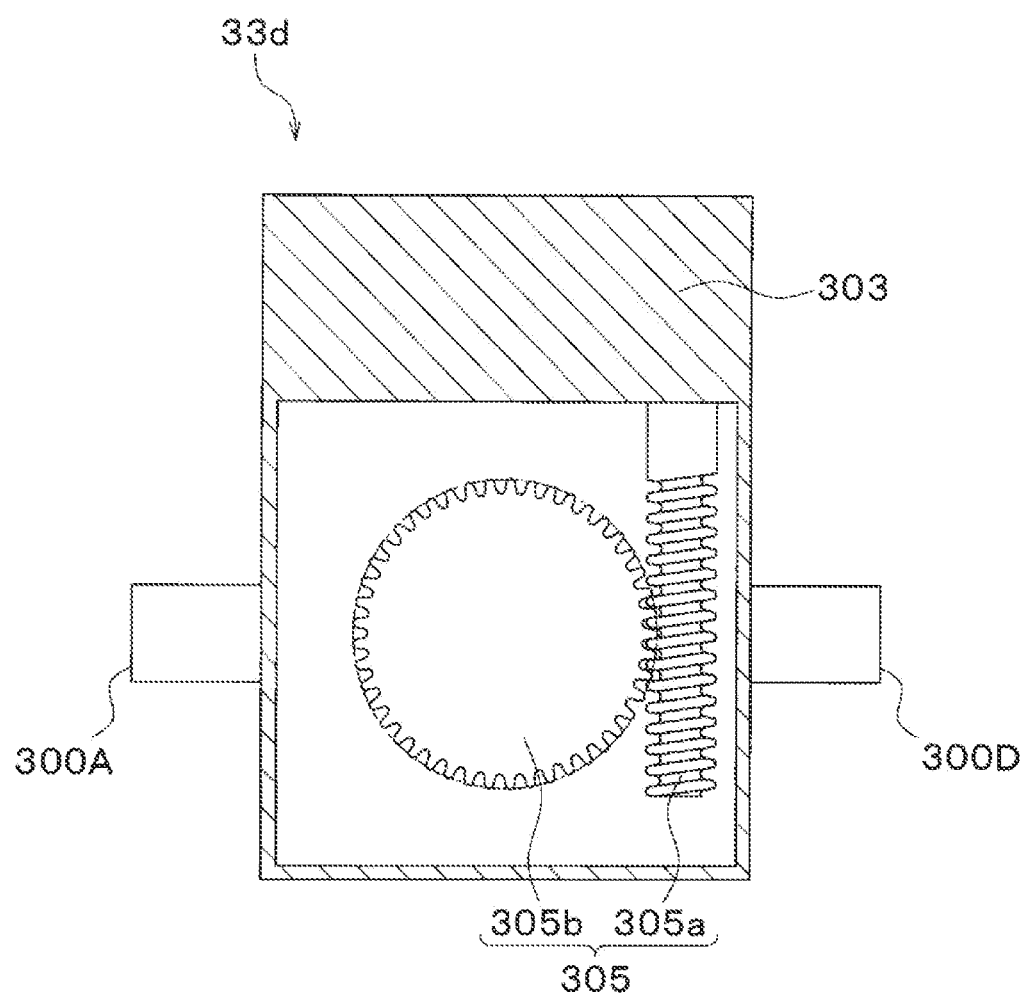
FIG. 21 is a cross-sectional view taken along XXI-XXI in FIG. 20.

The portion of the shaft 304 in the other side (in the opposite side from the driver 303, in the present embodiment) is inserted in an insertion hole 302c formed at the center portion of the slide valve 302, as illustrated in FIG. 20. The insertion hole 302c is formed in such a way as to penetrate the front and back of the slide valve 302.

The insertion hole 302c is formed to have an inner diameter which is larger than the outer diameter of the shaft 304. Therefore, a gap is formed between the inner peripheral surface of the insertion hole 302c and the outer peripheral surface of the shaft 304. A first gap interval CD1 between the inner peripheral surface of the insertion hole 302c and the outer peripheral surface of the shaft 304 can be defined as the value resulted from the subtraction of the radius of the shaft 304 from the radius of the insertion hole 302c.

The shaft 304 is provided with a flange portion 304a protruding in the radial direction. The flange portion 304a comes in contact with a pin portion 302d protruding from the surface of the slide valve 302 which is closer to the driver 303. Accordingly, if the driver 303 rotates the shaft 304 in such a direction as to cause the flange portion 304a to push the pin portion 302d, the slide valve 302 can be rotated together with the shaft 304.

In the following description, the direction of rotation which causes the flange portion 304a to push the pin portion 302d (more specifically, the direction which causes the slide valve 302 to rotate in the counterclockwise direction, when it is viewed from the driver 303) will be referred to as the direction of normal rotation. The direction of rotation which causes the flange portion 304a to separate from the pin portion 302d (more specifically, the direction which causes the slide valve 302 to rotate in the clockwise direction, when it is viewed from the driver 303) will be referred to as the direction of reverse rotation.

The other end portion of the shaft 304 is inserted in a bearing hole 301a formed in the body 301, as illustrated in FIG. 20. The bearing hole 301a rotatably supports the end portion of the shaft 304.

The bearing hole 301a is formed to have an inner diameter which is larger than the outer diameter of the shaft 304. Therefore, a gap is formed between the inner peripheral surface of the bearing hole 301a and the outer peripheral surface of the shaft 304. A second gap interval CD2 between the inner peripheral surface of the bearing hole 301a and the outer peripheral surface of the shaft 304 can be defined as the value resulted from the subtraction of the radius of the shaft 304 from the radius of the bearing hole 301a.

In the flow passage switching valve 33d, the first gap interval CD1 between the inner peripheral surface of the insertion hole 302c and the outer peripheral surface of the shaft 304 is set to have a value larger than that of the second gap interval CD2 between the inner peripheral surface of the bearing hole 301a and the outer peripheral surface of the shaft 304.

A first coil spring 306 and a second coil spring 307 are placed in the housing space of the body 301, as illustrated in FIG. 20. In this case, the term "coil spring" is the generic name of a spring constituted by a linear steel member which is wound in a rotational-body shape, such as a circular tubular shape, a circular conical shape, or a barrel shape. In the present embodiment, circular tubular coil springs which are each formed to have a circular tubular shape are employed as the first coil spring 306 and the second coil spring 307.

As illustrated in FIG. 20, the coil inner diameter of the first coil spring 306 is larger than the coil outer diameter of the second coil spring 307. The second coil spring 307 has a larger number of windings than the number of windings in the first coil spring 306. The center axis of the first coil spring 306, the center axis of the second coil spring 307 and the center axis of the shaft 304 are placed coaxially. Accordingly, the center axis of the shaft 304 is placed radially inward of the first coil spring 306 and the second coil spring 307.

The first coil spring 306 is supported by the slide valve 302 in the direction of rotation, at its end portion closer to the slide valve 302. The first coil spring 306 is supported by the wheel gear 305b in the direction of rotation, at its end portion closer to the gear mechanism 305. The first coil spring 306 is set to have an initial load, in such a way as to exert a load on both the slide valve 302 and the wheel gear 305b, during normal operations of the flow passage switching valve 33d.

More specifically, the first coil spring 306 constantly exerts a load in the direction of reverse rotation, on the slide valve 302, during normal operations of the flow passage switching valve 33d. Further, the first coil spring 306 constantly exerts a load in the direction which displaces the slide valve 302 in the direction of reverse rotation, on the wheel gear 305b, during normal operations of the flow passage switching valve 33d. Accordingly, if the driver 303 causes the shaft 304 to rotate in the direction of reverse rotation, this can cause the slide valve 302 to rotate in the direction of reverse rotation, due to the load from the first coil spring 306.

Incidentally, "a coil spring is supported by a predetermined member at its end portion" is not limited to the meaning of "a coil spring is completely secured to a predetermined member at its end portion". Provided that an end portion of a coil spring comes in contact with a predetermined member so that the entire coil spring is inhibited from being deformed or displaced, this state is included in "a coil spring is supported by a predetermined member at its end portion".

The load which the first coil spring 306 exerts on the wheel gear 305b forms a load in the direction which presses the tooth surfaces of the wheel gear 305b against the tooth surfaces of the worm gear 305a. Accordingly, the first coil spring 306 is a gear biasing member for generating a load in the direction which brings the respective tooth surfaces of the plurality of gears (the worm gear 305a and the wheel gear 305b in the present embodiment) included in the gear mechanism 305 into contact with each other.

The second coil spring 307 comes in contact with the slide valve 302, at its end portion in the axial direction which is closer to the slide valve 302. The second coil spring 307 comes in contact with a step portion of the shaft 304, at its end portion in the axial direction which is closer to the gear mechanism 305. Therefore, the second coil spring 307 is placed rotatably together with the shaft 304.

The second coil spring 307 is set to have an initial load, in such a way as to exert a load in the axial direction on the slide valve 302, during normal operations of the flow passage switching valve 33d. More specifically, the second coil spring 307 constantly exerts a load in the axial direction which presses the sealing surface 302e of the slide valve 302 toward the body 301, on the slide valve 302, during normal operations of the flow passage switching valve 33d. Accordingly, the second coil spring 307 is a switcher biasing member.

The internal space of the body 301 in the bottom side (in the opposite side from the driver 303 mounted thereto, in the present embodiment) is sectioned by a plurality of partition plates 313, similarly to the second body 312 in the first embodiment. More specifically the internal space of the body 301 in the bottom side is sectioned into a first outlet-side space 312b, a second inlet-side space 312c, a second outlet-side space 312d, and a third outlet-side space 312e, as illustrated in FIG. 22.

Accordingly, the second coil spring 307 exerts, on the slide valve 302, a load in the axial direction which presses the sealing surface 302e against the plurality of partition plates 313 in the body 301. A gasket 308 is placed between the sealing surface 302e of the slide valve 302 and the plurality of partition plates 313 in the body 301. The gasket 308 is a sealing member for suppressing leakage of the low-temperature side heat medium through the gap between the sealing surface 302e and the plurality of partition plates 313.

Figure 22:
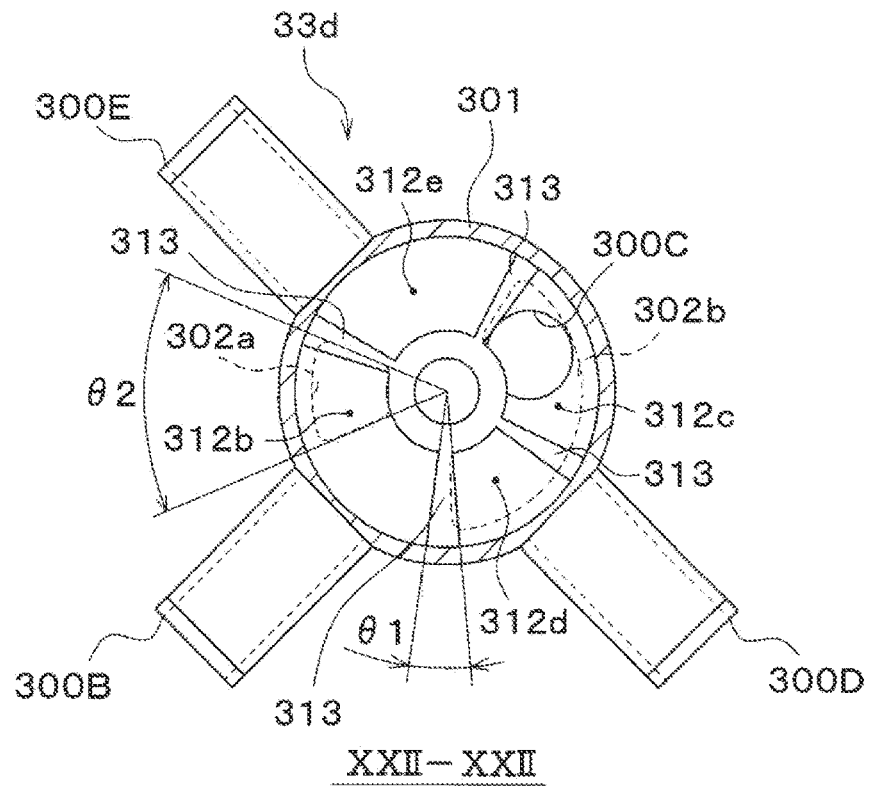
FIG. 22 is a cross-sectional view taken along XXII-XXII in FIG. 20.

As illustrated in FIG. 22, the partition plates 313 according to the present embodiment are each formed to have an arc shape, when viewed in the direction of the center axis. The value of the largest center angle, out of the center angles of the plurality of partition plates 313, is defined as a center angle $\theta 1$. The center angle $\theta 1$ is set to be smaller than the center angle $\theta 2$ of the through hole 302a formed in the slide valve 302.

Thus, with the flow passage switching valve 33d, regardless of which position the slide valve 302 is rotated and displaced to, the first inlet 300A can be caused to communicate with at least one of the first outlet 300B, the second outlet 300D and the third outlet 300E.

In this case, if the center angle $\theta 1$ of a partition plate 313 is larger than the center angle $\theta 2$ of the through hole 302a, this partition plate 313 may close the through hole 302a. Accordingly, the partition plates 313 do not include any portion having a center angle $\theta 1$ larger than the center angle θ2, even if such a portion is provided for sectioning the internal space of the body 301.

Next, with reference to FIGS. 23 to 25, there will be described states of communications between the respective inlets and the respective outlets, when the slide valve 302 has been rotated and displaced about the axis, in the flow passage switching valve 33d. Namely, there will be described passage configurations which can be realized with the flow passage switching valve 33d.

Figure 23:
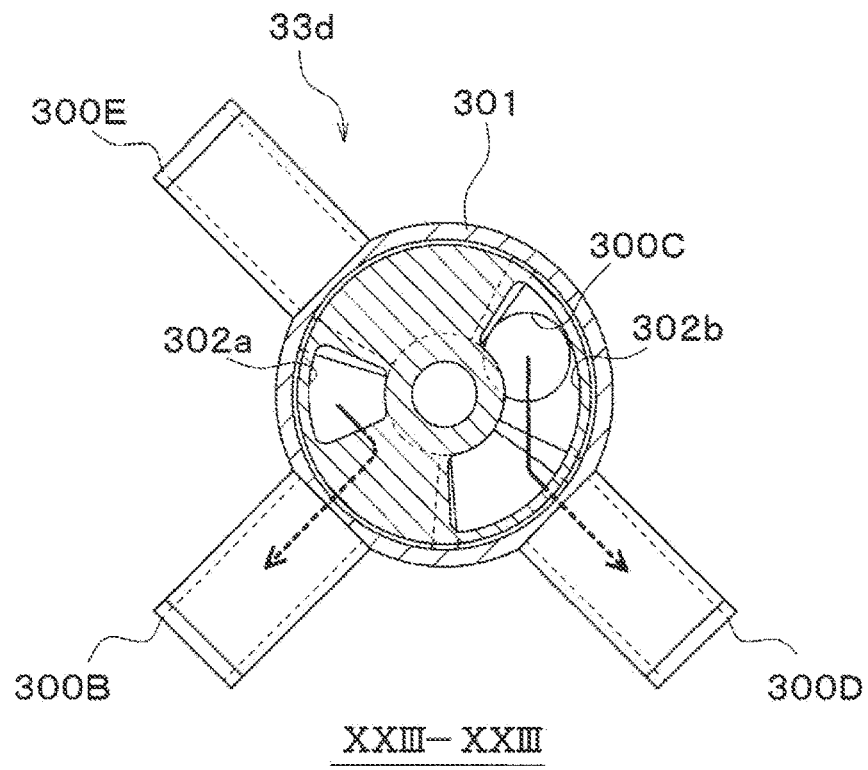
FIG. 23 is a cross-sectional view taken along XXIII-XXIII in FIG. 20, which is a cross-sectional view of when a slide valve has been displaced to a predetermined position.
Figure 24:
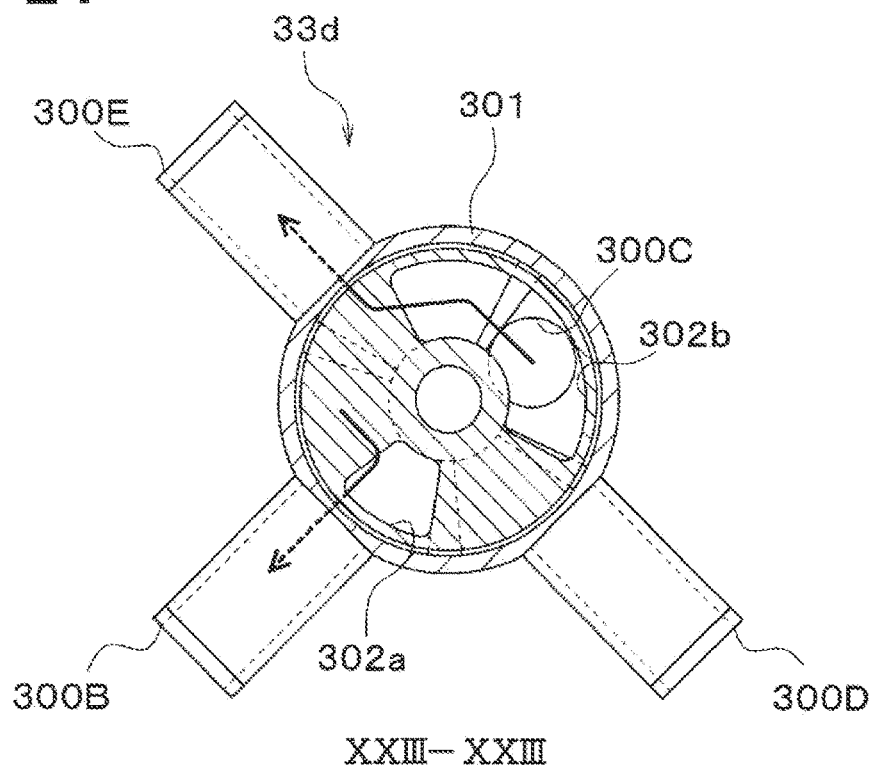
FIG. 24 is a cross-sectional view taken along XXIII-XXIII in FIG. 20, which is a cross-sectional view of when the slide valve has been displaced to another position.

At first, as illustrated in FIGS. 23 and 24, with the flow passage switching valve 33d, by rotating and displacing the slide valve 302, it is possible to switch the outlet which communicates with the second inlet 300C, in a state where the first inlet 300A is made to communicate with one of the plurality of outlets.

More specifically, in FIG. 23, in a state where the first inlet 300A and the first outlet 300B are made to communicate with each other, through the through hole 302a, the second inlet 300C and the second outlet 300D are caused to communicate with each other through the communication groove 302b. Further, in FIG. 24, in a state where the first inlet 300A and the first outlet 300B are made to communicate with each other through the through hole 302a, the second inlet 300C and the third outlet 300E are caused to communicate with each other through the communication groove 302b.

By defining the positional relationship between the body 301 and the slide valve 302 illustrated in FIG. 23 as a reference position, there is illustrated, in FIG. 24, the state where the slide valve 302 has been rotated by α° in the direction of normal rotation from the reference position.

During the process for transition from FIG. 23 to FIG. 24, namely during the process for rotating and displacing the slide valve 302 in the direction of normal rotation, from the reference position, to the position where it has been rotated by α° therefrom, the opening area of the through hole 302a which causes the first inlet 300A to communicate with the first outlet 300B is not changed.

On the other hand, as the rotational angle of the slide valve 302 is increased, it is possible to reduce the opening area of the communication passage which causes the second inlet 300C to communicate with one outlet (the second outlet 300D in FIGS. 23 and 24). At the same time, as the rotational angle of the slide valve 302 is increased, it is possible to increase the opening area of the communication passage which causes the second inlet 300C to communicate with the other outlet (the third outlet 300E in FIGS. 23 and 24).

Figure 25:
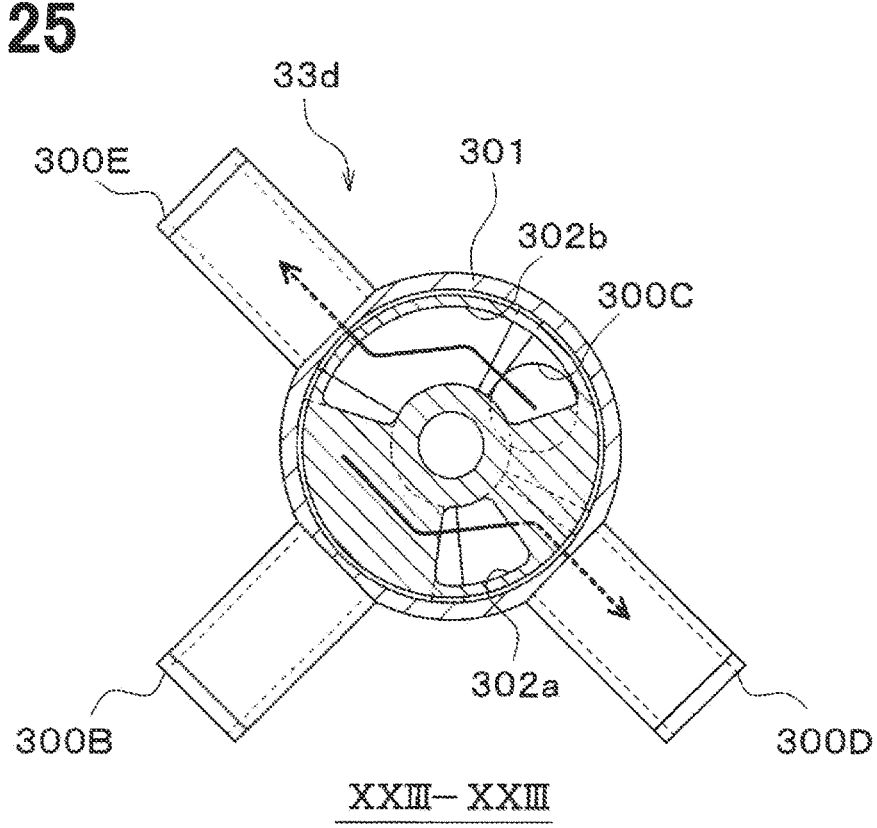
FIG. 25 is a cross-sectional view taken along XXIII-XXIII in FIG. 20, which is a cross-sectional view of when the slide valve has been displaced to yet another position.

Further, with the flow passage switching valve 33d, as illustrated in FIGS. 24 and 25, in a state where the second inlet 300C is made to communicate with one of the plurality of outlets, it is possible to switch the outlet which communicates with the first inlet 300A, by rotating and displacing the slide valve 302. FIG. 25 illustrates a state where the slide valve 302 has been rotated by β° in the direction of normal rotation, from the reference position.

More specifically, in FIG. 24, in a state where the second inlet 300C and the third outlet 300E are made to communicate with each other through the communication groove 302b, the first inlet 300A and the first outlet 300B are caused to communicate with each other, through the through hole 302a. In FIG. 25, in a state where the second inlet 300C and the third outlet 300E are made to communicate with each other through the communication groove 302b, the first inlet 300A and the second outlet 300D are caused to communicate with each other.

During the process for transition from FIG. 24 to FIG. 25, namely during the process for displacing the slide valve 302, from the position where it has been rotated by α°, to the position where it has been rotated by β°, it is possible to change the opening area of the communication passage which causes the second inlet 300C to communicate with the outlet. More specifically, it is possible to reduce the opening area of the communication passage which causes the second inlet 300C to communicate with the third outlet 300E.

With the flow passage switching valve 33d, regardless of which position the slide valve 302 is rotated and displaced to, the first inlet 300A can be caused to communicate with at least one of the first outlet 300B, the second outlet 300D and the third outlet 300E. Further, regardless of which position the slide valve 302 is rotated and displaced to, the second inlet 300C can be caused to communicate with at least one of the first outlet 300B, the second outlet 300D and the third outlet 300E.

With the flow passage switching valve 33d, when the slide valve 302 has been rotated and displaced to a predetermined position, it is possible to cause all of the first inlet 300A, the second inlet 300C, the first outlet 300B, the second outlet 300D and the third outlet 300E to communicate with each other. The other structures of the temperature adjustment device 1 are the same as those of the first embodiment.

Next, there will be described operations of the temperature adjustment device 1 having the aforementioned structure according to the present embodiment. The temperature adjustment device 1 according to the present embodiment can execute (d) a battery cooling mode, in addition to (a) the apparatus cooling mode and (c) the outside-air heat absorption mode, which have been described in the first embodiment.

(a) The Apparatus Cooling Mode

In the apparatus cooling mode, a control device 50 controls the operation of the flow passage switching valve 33d, in such a way as to cause a low-temperature side heat medium flowed in through the first inlet 300A to flow out through the first outlet 300B and to cause the low-temperature side heat medium flowed in through the second inlet 300C to flow out through the second outlet 300D. Namely, the slide valve 302 is displaced as illustrated in FIG. 23. The control device 50 fully closes an apparatus flow-rate adjustment valve 38c.

Therefore, in the apparatus cooling mode, in a low-temperature side heat-medium circuit 30, the low-temperature side heat medium discharged from a low-temperature side pump 31 is circulated through a heat-medium passage 152 in a chiller 15, (the first inlet 300A to the first outlet 300B in the flow passage switching valve 33d), a cooling-water passage 70a in a battery 70, and the suction port of the low-temperature side pump 31, in the mentioned order. At the same time, the low-temperature side heat medium discharged from an apparatus pump 38a is circulated through a cooling-water passage 71a in an in-vehicle apparatus 71, (the second inlet 300C to the second outlet 300D in the flow passage switching valve 33d), a low-temperature side radiator 32, and the suction port of the apparatus pump 38a, in the mentioned order.

The other operations are the same as those in the apparatus cooling mode according to the first embodiment. Accordingly, in the apparatus cooling mode according to the present embodiment, blowing air W cooled by a room-interior evaporator 16 can be blown out into the vehicle compartment, after being re-heated by a heater core 23, similarly to in the first embodiment. This can realize comfortable air conditioning for the inside of the vehicle compartment. Further, the low-temperature side heat medium cooled by the chiller 15 can be flowed into the cooling-water passage 70a in the battery 70. Thus, the battery 70 can be cooled thereby.

In addition thereto, in the apparatus cooling mode according to the present embodiment, the low-temperature side heat medium cooled by the low-temperature side radiator 32 can be flowed into the cooling-water passage 71a in the in-vehicle apparatus 71. Thus, the in-vehicle apparatus 71 can be cooled thereby.

(c) The Outside-Air Heat Absorption Mode

In the outside-air heat absorption mode, the control device 50 controls the operation of the flow passage switching valve 33d, in such a way as to cause the low-temperature side heat medium flowed in through the first inlet 300A to flow out through the second outlet 300D and to cause the low-temperature side heat medium flowed in through the second inlet 300C to flow out through the third outlet 300E. Namely, the slide valve 302 is displaced as illustrated in FIG. 25. The control device 50 fully closes the apparatus flow-rate adjustment valve 38c.

Therefore, in the outside-air heat absorption mode, in the low-temperature side heat-medium circuit 30, the low-temperature side heat medium discharged from the low-temperature side pump 31 is circulated through the heat-medium passage 152 in the chiller 15, (the first inlet 300A to the second outlet 300D in the flow passage switching valve 33d), the low-temperature side radiator 32, and the suction port of the low-temperature side pump 31, in the mentioned order. At the same time, the low-temperature side heat medium discharged from the apparatus pump 38a is circulated through the cooling-water passage 71a in an in-vehicle apparatus 71, (the second inlet 300C to the third outlet 300E in the flow passage switching valve 33d), and the suction port of the apparatus pump 38a, in the mentioned order.

The other operations are the same as those in the outside-air heat absorption mode according to the first embodiment. Accordingly, in the outside-air heat absorption mode according to the present embodiment, blowing air W heated by the heater core 23 can be blown out into the vehicle compartment, similarly to in the first embodiment. This can realize comfortable warming of the inside of the vehicle compartment.

In the outside-air heat absorption mode according to the present embodiment, there is formed a circuit for causing the low-temperature side heat medium discharged from the apparatus pump 38a to flow through the cooling-water passage 71a in the in-vehicle apparatus 71. In this way, the low-temperature side heat medium can be heated by heat generated from the in-vehicle apparatus 71. In other words, heat generated from the in-vehicle apparatus 71 can be accumulated in the low-temperature side heat medium.

As described above, the outside-air heat absorption mode is a running mode which is executed when the outside-air temperature is lower. Accordingly, by accumulating heat generated from the in-vehicle apparatus 71 in the low-temperature side heat medium, it is possible to effectively utilize heat generated from the in-vehicle apparatus 71.

(d) The Battery Cooling Mode

The battery cooling mode is a running mode for cooling the battery 70 through the low-temperature side heat medium cooled by the refrigeration cycle device 10, without performing air conditioning for the inside of the vehicle compartment, when the battery 70 generates a larger amount of heat, such as when the battery 70 is rapidly charged.

In the battery cooling mode, the control device 50 controls the operation of the flow passage switching valve 33d, in such a way as to cause the low-temperature side heat medium flowed in through the first inlet 300A to flow out through the first outlet 300B and to cause the low-temperature side heat medium flowed in through the second inlet 300C to flow out through the third outlet 300E. Namely, the slide valve 302 is displaced as illustrated in FIG. 24. The control device 50 fully closes the apparatus flow-rate adjustment valve 38c.

Therefore, in the apparatus cooling mode, in the low-temperature side heat-medium circuit 30, the low-temperature side heat medium discharged from the low-temperature side pump 31 is circulated through the heat-medium passage 152 in the chiller 15, (the first inlet 300A to the first outlet 300B in the flow passage switching valve 33d), the cooling-water passage 70a in the battery 70, and the suction port of the low-temperature side pump 31, in the mentioned order. At the same time, the low-temperature side heat medium discharged from the apparatus pump 38a is circulated through the cooling-water passage 71a in an in-vehicle apparatus 71, (the second inlet 300C to the third outlet 300E in the flow passage switching valve 33d), and the suction port of the apparatus pump 38a, in the mentioned order.

In the battery cooling mode, in the refrigeration cycle device 10, similarly to in the apparatus cooling mode, the high-pressure refrigerant discharged from a compressor 11 is cooled to be a sub-cooled liquid refrigerant by a water-refrigerant heat exchanger 12. Further, the high-temperature side heat medium flowing through the heat-medium passage 122 in the water-refrigerant heat exchanger 12 is heated.

The refrigerant flowed out from the water-refrigerant heat exchanger 12 is flowed into the refrigerant diverging portion 13a. In the outside-air cooling mode, since the second expansion valve 14b is fully closed, the refrigerant flowed into the refrigerant diverging portion 13a is reduced in pressure by the first expansion valve 14a and, then, is flowed into the refrigerant passage 151 in the chiller 15. The control device 50 adjusts the throttle opening of the first expansion valve 14a, similarly to in the apparatus cooling mode.

The low-pressure refrigerant flowed into the refrigerant passage 151 in the chiller 15 absorbs heat from the low-temperature side heat medium flowing through the heat-medium passage 152 and, thus, is evaporated, similarly to in the apparatus cooling mode. Thus, the low-temperature side heat medium flowing through the heat-medium passage 152 is cooled thereby. The refrigerant flowed out from the chiller 15 is flowed into the compressor 11, through the refrigerant merging portion 13b.

In the high-temperature side heat-medium circuit 20, the control device 50 controls the operations of the constituent apparatuses, similarly to in the apparatus cooling mode.

In the low-temperature side heat-medium circuit 30, similarly to in the apparatus cooling mode, the low-temperature side heat medium pumped from the low-temperature side pump 31 is flowed into the heat-medium passage 152 in the chiller 15 and, thus, is cooled therein. The low-temperature side heat medium cooled in the chiller 15 is flowed into the cooling-water passage 70a in the battery 70. The heat medium flowed into the cooling-water passage 70a in the battery 70 absorbs exhaust heat from the battery 70 during flowing through the cooling-water passage 70a. Thus, the battery 70 can be cooled thereby.

Further, similarly to in the outside-air heat absorption mode, the low-temperature side heat medium pumped from the apparatus pump 38a can be circulated. In this way, heat generated from the in-vehicle apparatus 71 can be accumulated in the low-temperature side heat medium.

In the battery cooling mode, air conditioning for the inside of the vehicle compartment is not performed and, therefore, a first high-temperature side flow-rate adjustment valve 24a may be fully opened, while a second high-temperature side flow-rate adjustment valve 24b may be fully closed. Further, when there is no need for accumulating heat generated from the in-vehicle apparatus 71 in the low-temperature side heat medium, such as when the outside air temperature is relatively higher, the apparatus pump 38a may be stopped.

As described above, with the temperature adjustment device 1 according to the present embodiment, it is possible to realize comfortable air conditioning for the inside of the vehicle compartment and, also, it is possible to adjust the temperatures of the battery 70 and the in-vehicle apparatus 71 to appropriate temperatures, through switchover among the respective running modes.

Further, since the low-temperature side heat-medium circuit 30 according to the present embodiment includes the flow passage switching valve 33d, it is possible to provide excellent advantages which will be described hereinafter.

Since the flow passage switching valve 33d according to the present embodiment is not formed from a combination of a plurality of opening/closing valves, a plurality of three-way valves and the like, the flow passage switching valve 33d is inhibited from having an increased size. This can inhibit the low-temperature side heat-medium circuit 30 incorporating the flow passage switching valve 33d from having an increased size. This results in improvement of the productivity of the low-temperature side heat-medium circuit 30.

Since the flow passage switching valve 33d according to the present embodiment includes the first coil spring 306 as a gear biasing member, it is possible to suppress rattling and the like of the gear mechanism 305 due to backlash between the worm gear 305a and the wheel gear 305b. This can improve the positional accuracy in displacing the slide valve 302. In this way, it is possible to reduce the number of operations of the flow passage switching valve 33d, thereby reducing the electric power consumption.

With the flow passage switching valve 33d according to the present embodiment, the first coil spring 306, which is an elastic member, is employed as the gear biasing member. The slide valve 302 supports one end portion of the first coil spring 306 in the direction of rotation, while the wheel gear 305b in the gear mechanism 305 supports the other end portion of the second coil spring 306 in the direction of rotation.

In this way, it is possible to easily realize a structure for constantly exerting a load in the direction of reverse rotation, on the slide valve 302, during normal operations of the flow passage switching valve 33d. Namely, by employing a coil spring as the gear biasing member, it is possible to easily realize the gear biasing member for generating a load in such a direction as to bring the respective tooth surfaces of the plurality of gears included in the gear mechanism 305 into contact with each other.

With the flow passage switching valve 33 according to the present embodiment, a worm-and-wheel type gear mechanism is employed, as the gear mechanism 305. In this way, it is possible to constitute the gear mechanism by the two gears. Accordingly, it is possible to easily adjust the high reduction ratio, which is the ratio of the rotating speed of the output-side gear to the rotating speed of the input-side gear, with a smaller number of members. Due to the smaller number of members, it is possible to easily increase the surface pressures on the respective tooth surfaces of the plurality of gears.

The flow passage switching valve 33d according to the present embodiment includes the second coil spring 307 as a switcher biasing member, which enables pressing the sealing surface 302e of the slide valve 302 against the plurality of partition plates 313 in the body 301. This can suppress leakage of the low-temperature side heat medium through the gap between the slide valve 302 and the body 301, when the slide valve 302 is displaced for switching the passage configuration.

In the flow passage switching valve 33d, the gasket 308 is placed between the slide valve 302 and the body 301. This can enhance the sealing characteristics between the slide valve 302 and the body 301. Namely, it is possible to suppress leakage of the low-temperature side heat medium through the gap between the slide valve 302 and the body 301, more effectively, when the slide valve 302 is displaced for switching the passage configuration.

With the flow passage switching valve 33d according to the present embodiment, the second coil spring 307, which is an elastic member, is employed as a switcher biasing member. In this way, it is possible to easily realize a switcher biasing member for exerting, on the slide valve 302, a load in such a direction as to press the slide valve 302 toward the body.

With the flow passage switching valve 33d according to the present embodiment, the center axis of the shaft 304 is placed radially inward of the second coil spring 307. In this way, it is possible to easily exert the load generated from the second coil spring 307, uniformly on the entire slide valve 302, which can enhance the sealing characteristics between the slide valve 302 and the body 301.

With the flow passage switching valve 33d according to the present embodiment, the coil inner diameter of the first coil spring 306 is set to be larger than the coil outer diameter of the second coil spring 307, and the center axis of the first coil spring 306 and the center axis of the second coil spring 307 are placed coaxially. In this way, the second coil spring 307 can be accommodated radially inward of the first coil spring 306. This enables reduction of the size of the entire flow passage switching valve 33d.

With the flow passage switching valve 33d according to the present embodiment, the second coil spring 307 is set to have a larger number of windings than the number of windings of the first coil spring 306. In this way, it is possible to easily stabilize the load which the second coil spring 307 exerts on the slide valve 302. Namely, it is possible to stabilize the load for pressing the slide valve 302 toward the body 301, thereby suppressing the increase of the sliding friction during displacement of the slide valve 302.

More specifically, for a common coil spring, it is possible to reduce the amount of change of the spring load P, with respect to the change of the amount of deflection δ of the spring, by increasing the number of windings N, as expressed by a basic formula for a spring.

The basic formula for a spring is expressed by the following numerical formula F1.

$$P = (Gd^4)/(8ND^3) \times \delta \tag{F1}$$

Here, P is the spring load. G is the elastic coefficient. d is the diameter of the material (the steel member). N is the number of windings. D is the coil diameter of the coil spring (namely, the average value of the coil inner diameter and the coil outer diameter). δ is the amount of deflection of the spring.

With the flow passage switching valve 33d according to the present embodiment, the second coil spring 307 is placed rotatably together with the shaft 304. In this way, it is possible to suppress the occurrence of torsional forces in the direction of rotation, in the second coil spring 307. Further, it is possible to suppress wear of the second coil spring 307 and the shaft 304 at their portions which come in contact with each other.

Figure 26:
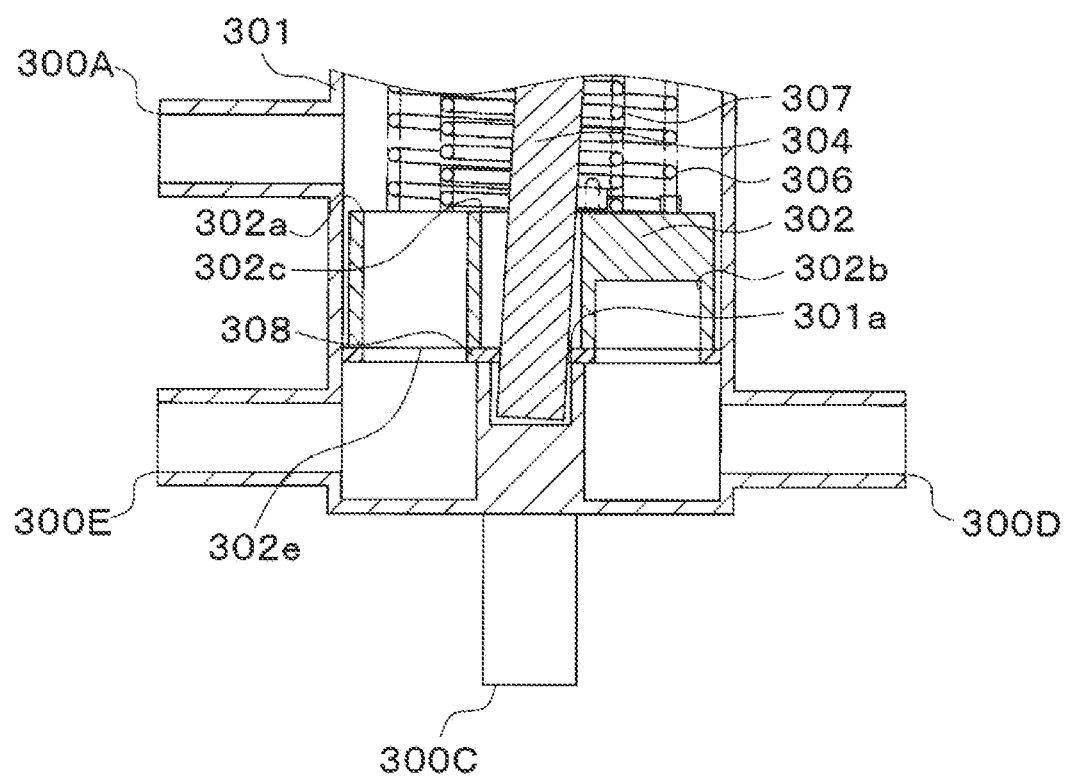
FIG. 26 is an explanation view illustrating a state where a shaft is inclined, in the flow passage switching valve according to the fifth embodiment.

With the flow passage switching valve 33d according to the present embodiment, the first gap interval CD1 is set to have a larger value than that of the second gap interval CD2. In this way, the bearing hole 301a can inhibit the shaft 304 from being inclined, as illustrated in FIG. 26.

Further, even if the shaft 304 is inclined, the shaft 304 can be inhibited from coming into contact with the insertion hole 302c, and the sealing surface 302e of the slide valve 302 can be pressed toward the body 301 in such a way as to come into surface-to-surface contact therewith. This can effectively suppress degradation of the sealing characteristics between the slide valve 302 and the body 301.

Sixth Embodiment

Figure 27:
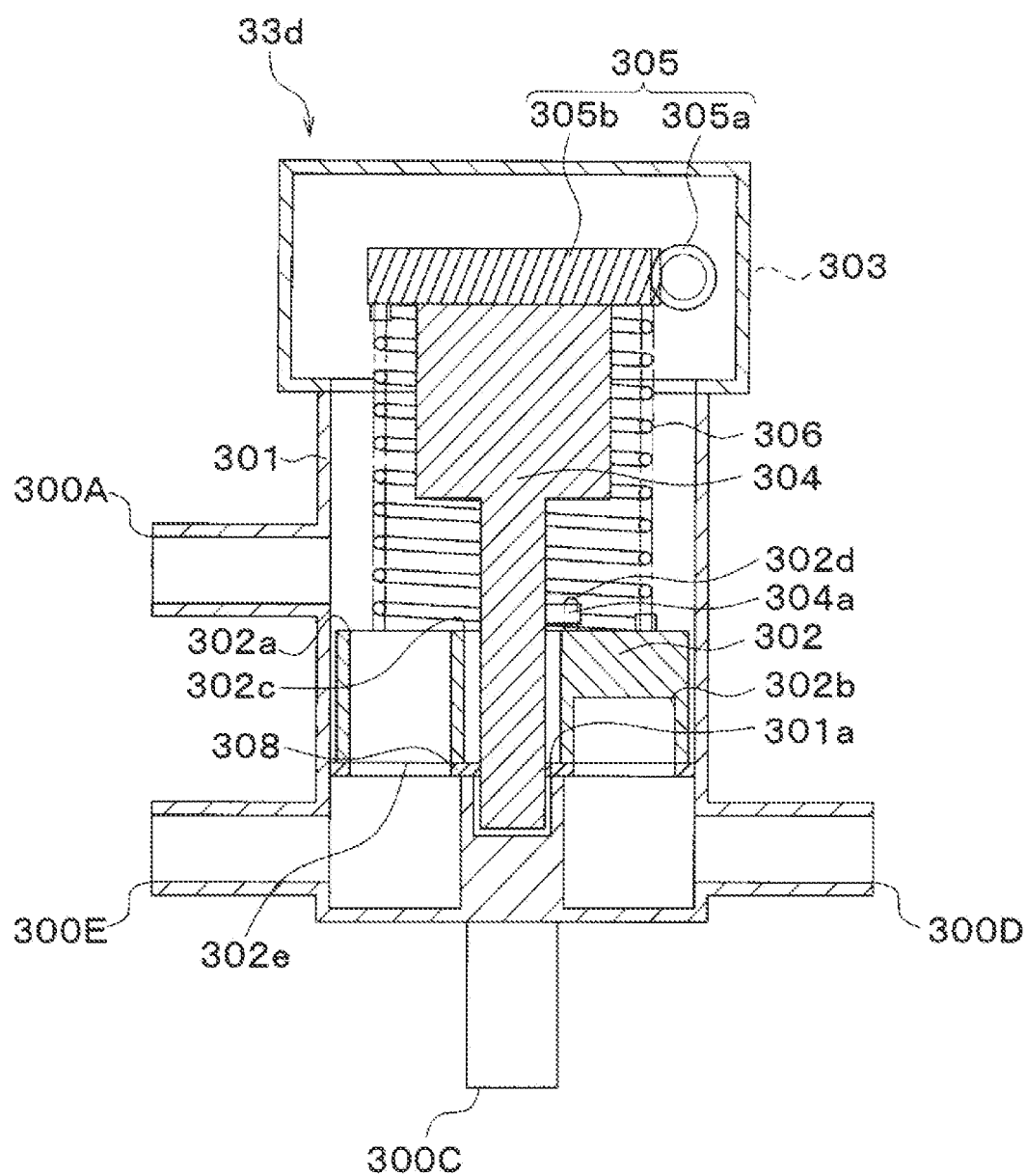
FIG. 27 is a schematic axial cross-sectional view of a flow passage switching valve according to a sixth embodiment.

In the present embodiment, there will be described an example where a flow passage switching valve 33d is changed in structure, from that in the fifth embodiment, as illustrated in FIG. 27.

More specifically, the second coil spring 307 is eliminated, in the flow passage switching valve 33d according to the present embodiment. A first coil spring 306 according to the present embodiment is adapted to constantly exert, on a slide valve 302, a load in the axial direction which presses the slide valve 302 against a plurality of partition plates 313 in a body 301, as well as constantly exerting a load in the direction of reverse rotation thereon, during normal operations of the flow passage switching valve 33d.

Namely, the first coil spring 306 according to the present embodiment has the functions of both a gear biasing member and a switcher biasing member. In other words, in the present embodiment, the first coil spring 306 as a switcher biasing member is adapted to generate a load in such a direction as to bring the respective tooth surfaces of a plurality of gears included in a gear mechanism 305 into contact with each other. This means the same as "the coil spring as a gear biasing member is adapted to exert, on the slide valve 302, a load in the axial direction which presses the slide valve 302 against the plurality of partition plates 313 in the body 301.

The other structures are the same as those of the fifth embodiment. Accordingly, with the temperature adjustment device 1 and the flow passage switching valve 33d according to the present embodiment, it is possible to provide the same advantages as those of the fifth embodiment. With the flow passage switching valve 33d according to the present embodiment, since the first coil spring 306 has the functions of both a gear biasing member and a switcher biasing member, it is possible to reduce the number of members therein. This results in further improvement of the productivity of the low-temperature side heat-medium circuit 30.

Seventh Embodiment

Figure 28:
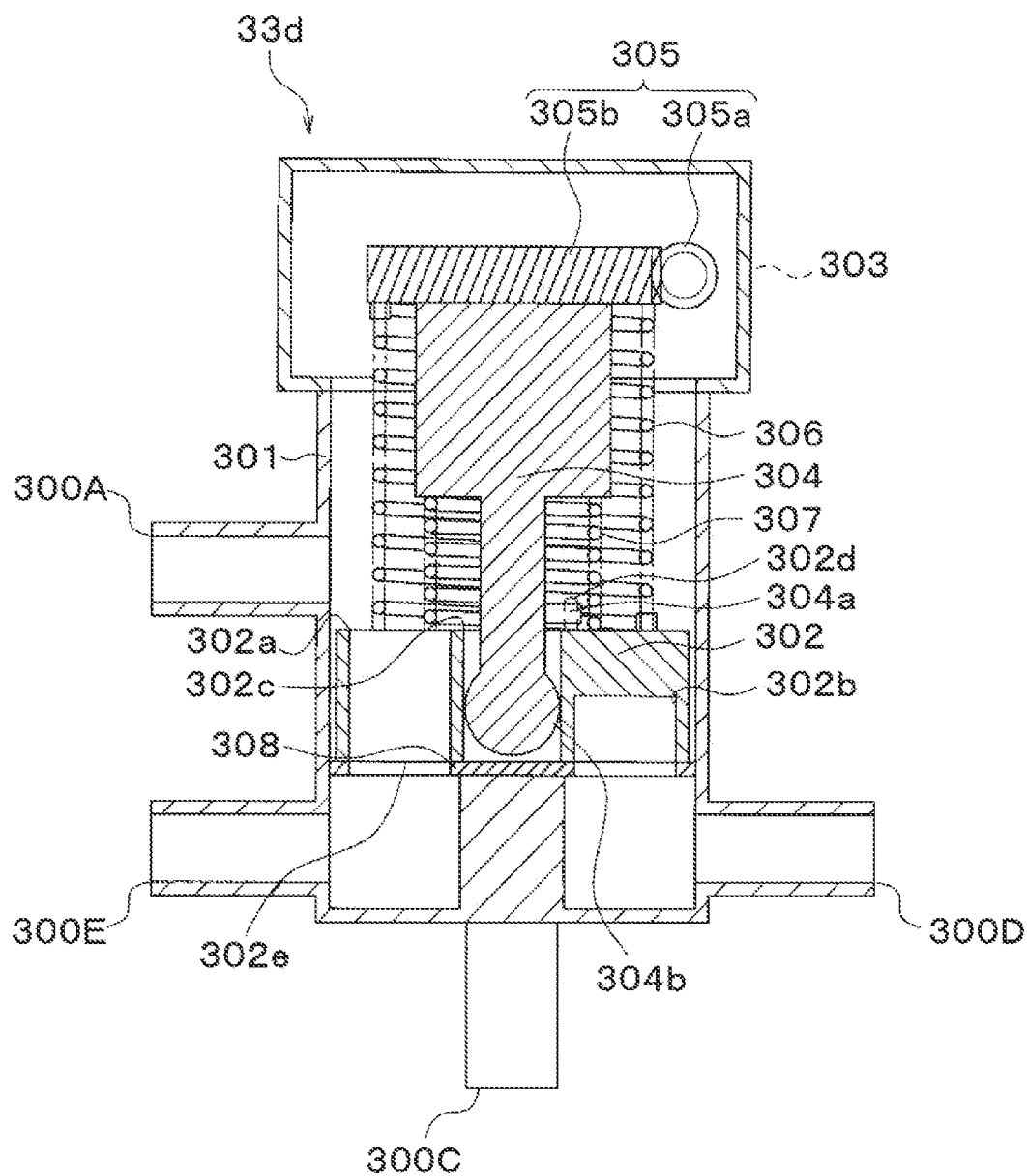
FIG. 28 is a schematic axial cross-sectional view of a flow passage switching valve according to a seventh embodiment.

In the present embodiment, there will be described an example where a flow passage switching valve 33d is changed in structure, from that in the fifth embodiment, as illustrated in FIG. 28. More specifically, in the flow passage switching valve 33d according to the present embodiment, a shaft 304 is provided with a spherical portion 304b at its other end portion, and the spherical portion 304b is inserted in an insertion hole 302c in a slide valve 302. The bearing hole 301a in the body 301 is eliminated.

The spherical portion 304b has an outer diameter which is slightly smaller than the inner diameter of the insertion hole 302c. Namely, there is a clearance-fit size relationship between the outer diameter of the spherical portion 304b and the inner diameter of the insertion hole 302c. This enables coupling the spherical portion 304b of the shaft 304 and the insertion hole 302c in the slide valve 302 to each other, like a ball joint, which is a universal joint of one type. This enables orienting the center axis of the shaft 304 and the center axis of the slide valve 302 in different directions.

The other structures are the same as those of the fifth embodiment. Accordingly, with the temperature adjustment device 1 and the flow passage switching valve 33d according to the present embodiment, it is possible to provide the same advantages as those of the fifth embodiment.

With the flow passage switching valve 33d according to the present embodiment, the shaft 304 and the slide valve 302 are coupled to each other, through the spherical portion 304b of the shaft 304 and the insertion hole 302c in the slide valve 302. Accordingly, even if the shaft 304 is inclined, the sealing surface 302e of the slide valve 302 can be certainly pressed toward the body 301 in such a way as to come into surface-to-surface contact therewith. This can certainly suppress degradation of the sealing characteristics between the slide valve 302 and the body 301.

The means for coupling the shaft 304 and the slide valve 302 to each other in such a way as to allow the center axis of the shaft 304 and the center axis of the slide valve 302 to orient in different directions is not limited to the aforementioned combination of the spherical portion 304b and the insertion hole 302c. It is also possible to employ a ball joint including a spherical concave portion provided in the slide valve 302, with which the spherical portion 304b of the shaft 304 is engaged.

Figure 29:
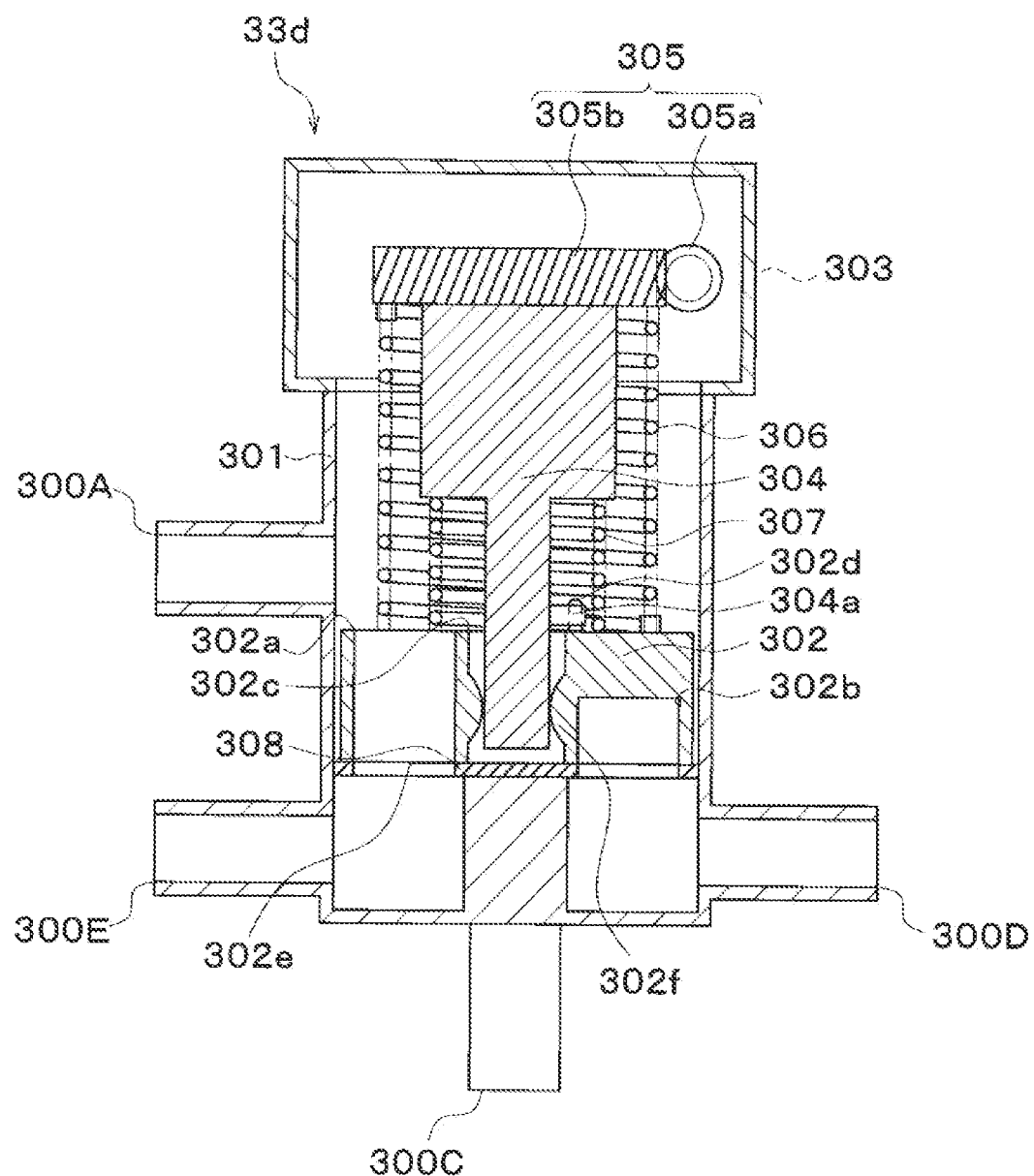
FIG. 29 is a schematic axial cross-sectional view of a flow passage switching valve in a modification example according to the seventh embodiment.

It is also possible to employ a so-called Cardan joint including a cross-shaped shaft which is orthogonal in the direction normal to the center axis of the shaft 304. Also, as illustrated in FIG. 29, the shaft 304 may be made to have a circular cylindrical shape at its other end portion, and the insertion hole 302c in the slide valve 302 may be interiorly provided with a protruding portion 302f with an arc-shaped cross section which is convex on its inner periphery.

The present disclosure is not limited to the aforementioned embodiments, and various changes can be made thereto as will be described hereinafter, without departing from the spirits of the present disclosure.

While, in the aforementioned embodiments, there have been described examples where the temperature adjustment device 1 is applied to a vehicle air-conditioning device having an in-vehicle-apparatus temperature adjustment function, the application of the temperature adjustment device 1 is not limited thereto. The temperature adjustment device 1 is not limited to be intended for vehicles and may be also applied to stationary type air-conditioning devices and the like. For example, the temperature adjustment device 1 may be also applied to an air-conditioning device having a server-temperature adjustment function for performing air-conditioning for the inside of a room which houses servers, while properly adjusting the temperatures of computers which function as the servers.

While, in the aforementioned embodiments, the apparatus cooling mode, the outside-air cooling mode, the outside-air heat absorption mode and the battery cooling mode have been described as running modes of the temperature adjustment device 1, the running modes of the temperature adjustment device 1 are not limited thereto. For example, while there has been described an example where the first expansion valve 14a is fully closed in the aforementioned outside-air cooling mode, the first expansion valve 14a may be also brought into a throttled state. In this way, the low-temperature side heat medium cooled by outside air can be further cooled by the chiller 15 and, then, can be used for cooling the battery 70.

The respective structures of the refrigeration cycle device 10 are not limited to those disclosed in the aforementioned embodiments.

For example, while, in the aforementioned embodiments, there have been described examples where a sub-cool type heat exchanger is employed as the water-refrigerant heat exchanger 12, the water-refrigerant heat exchanger 12 is not limited thereto. It is also possible to employ, thereas, a common water-refrigerant heat exchanger 12 which includes a refrigerant passage 121 constituted by only a condensing portion 12a.

While, in the aforementioned embodiments, there have been described examples where R1234yf is employed as a refrigerant, the refrigerant is not limited thereto. For example, it is also possible to employ, thereas, R134a, R600a, R410A, R404A, R32, R407C and the like. Also, it is possible to employ, thereas, mixed refrigerants formed from mixture of two or more refrigerants, out of them, and the like.

The respective structures of the high-temperature side heat-medium circuit 20 are not limited to those disclosed in the aforementioned embodiments.

While, in the aforementioned embodiments, there have been described examples where a PTC heater is employed as the electric heater 25, the electric heater 25 is not limited thereto. It is also possible to employ, thereas, a nichrome wire or the like, provided that it forms a heating device capable of generating heat by being supplied with electric power.

While, in the aforementioned embodiments, there have been described examples where the high-temperature side diverging portion 26a, the first high-temperature side flow-rate adjustment valve 24a, and the second high-temperature side flow-rate adjustment valve 24b are employed as a high-temperature side flow-rate ratio adjustment portion, the high-temperature side flow-rate ratio adjustment portion is not limited thereto. It is also possible to employ, thereas, a three-way type flow-rate adjustment valve formed by integrating the high-temperature side diverging portion 26a, the first high-temperature side flow-rate adjustment valve 24a, and the second high-temperature side flow-rate adjustment valve 24b.

While, in the aforementioned embodiments, there have been described examples where ethylene glycol aqueous solutions are employed as the high-temperature side heat medium, and the low-temperature side heat medium, the heat mediums are not limited thereto. For example, it is also possible to employ, thereas, solutions containing dimethylpolysiloxane, nano fluids and the like, antifreezing solutions, water-based liquid refrigerants containing alcohols and the like, liquid mediums containing oils, and the like.

The respective structures of the low-temperature side heat-medium circuit 30 are not limited to those disclosed in the aforementioned embodiments.

In the aforementioned embodiments, there have been described examples where the single low-temperature side pump 31 is employed as a pump. Further, in the aforementioned embodiments, there have been described examples where the low-temperature side pump 31 is placed in the flow passage which reaches the inlet port of the heat-medium passage 152 in the chiller 15 from the flow-outlet port of the low-temperature side merging portion 36b, as preferable placement of the low-temperature side pump 31, the placement of the low-temperature side pump 31 is not limited thereto.

Provided that the first pressure PA of the low-temperature side heat medium flowing into the first inlet 300A may be made higher than the second pressure PB of the low-temperature side heat medium flowing into the second inlet 300C, the low-temperature side pump 31 may be also placed in the flow passage which reaches the first inlet 300A from the inlet port of the heat-medium passage 152 in the chiller 15, for example.

Figure 30:
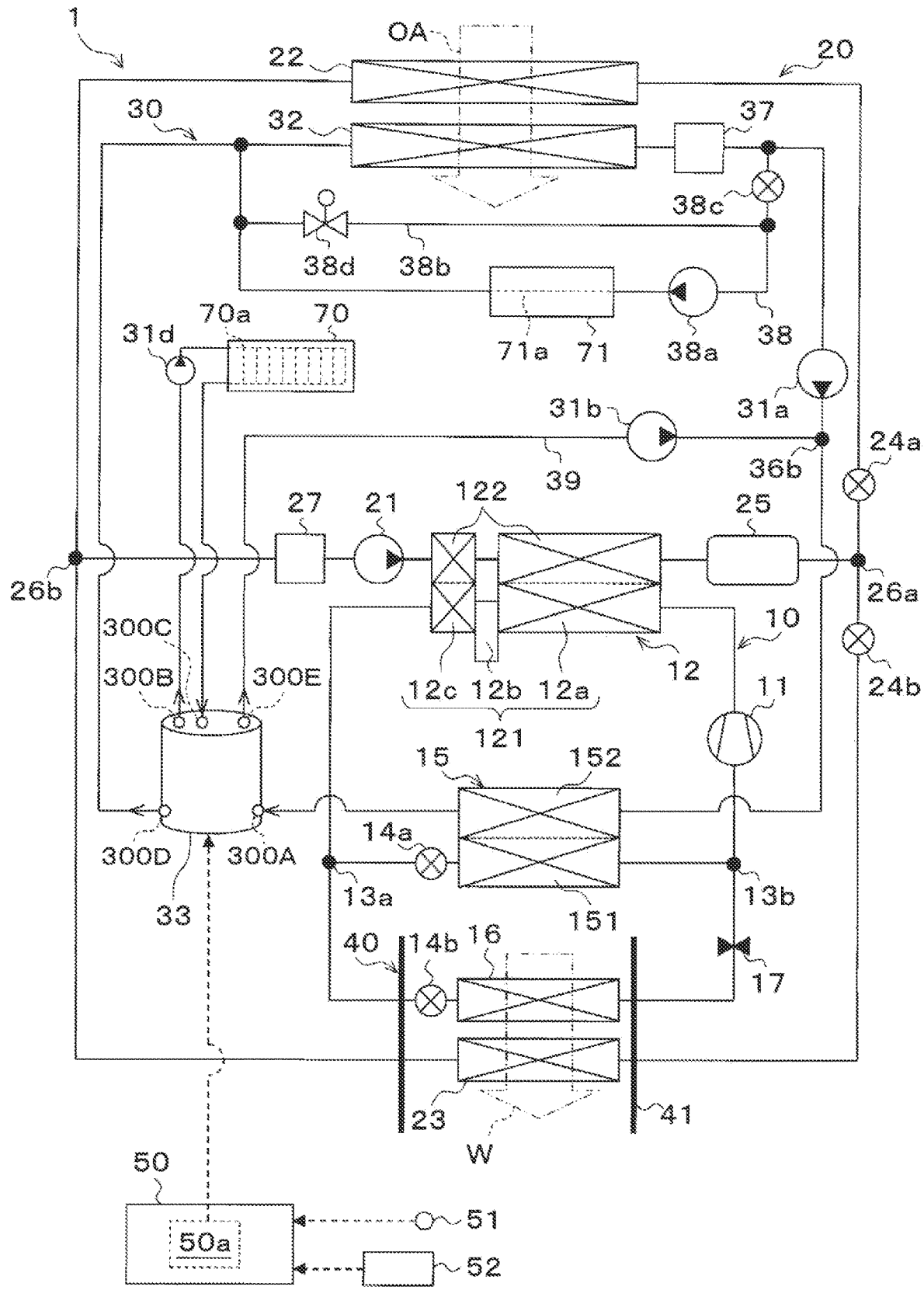
FIG. 30 is a view of the entire structure of a temperature adjustment device according to another embodiment.

Further, for example, in the low-temperature side heat-medium circuit 30 described in the first and second embodiments, a first low-temperature side pump 31a and a second low-temperature side pump 31b may be placed as the pump, as illustrated in FIG. 30. The first low-temperature side pump 31a inhales the low-temperature side heat medium flowed out from the low-temperature side reserve tank 37 and, then, pumps it to one flow-inlet port of the low-temperature side merging portion 36b. The second low-temperature side pump 31b is placed in the short-circuit heat-medium passage 39 and inhales the low-temperature side heat medium flowed out from the third outlet 300E and, then, pumps it to the other flow-inlet port of the low-temperature side merging portion 36b.

In the example illustrated in FIG. 30, the control device 50 may cause the second low-temperature side pump 31b to operate in the apparatus cooling mode, while the control device 50 may cause the first low-temperature side pump 31a to operate in the outside-air cooling mode and in the outside-air heat absorption mode. As a matter of course, the first low-temperature side pump 31a may be also placed in such a way as to inhale the low-temperature side heat medium flowed out through the second outlet 300D and to pump it to the heat-medium inlet port of the low-temperature side radiator 32.

Figure 31:
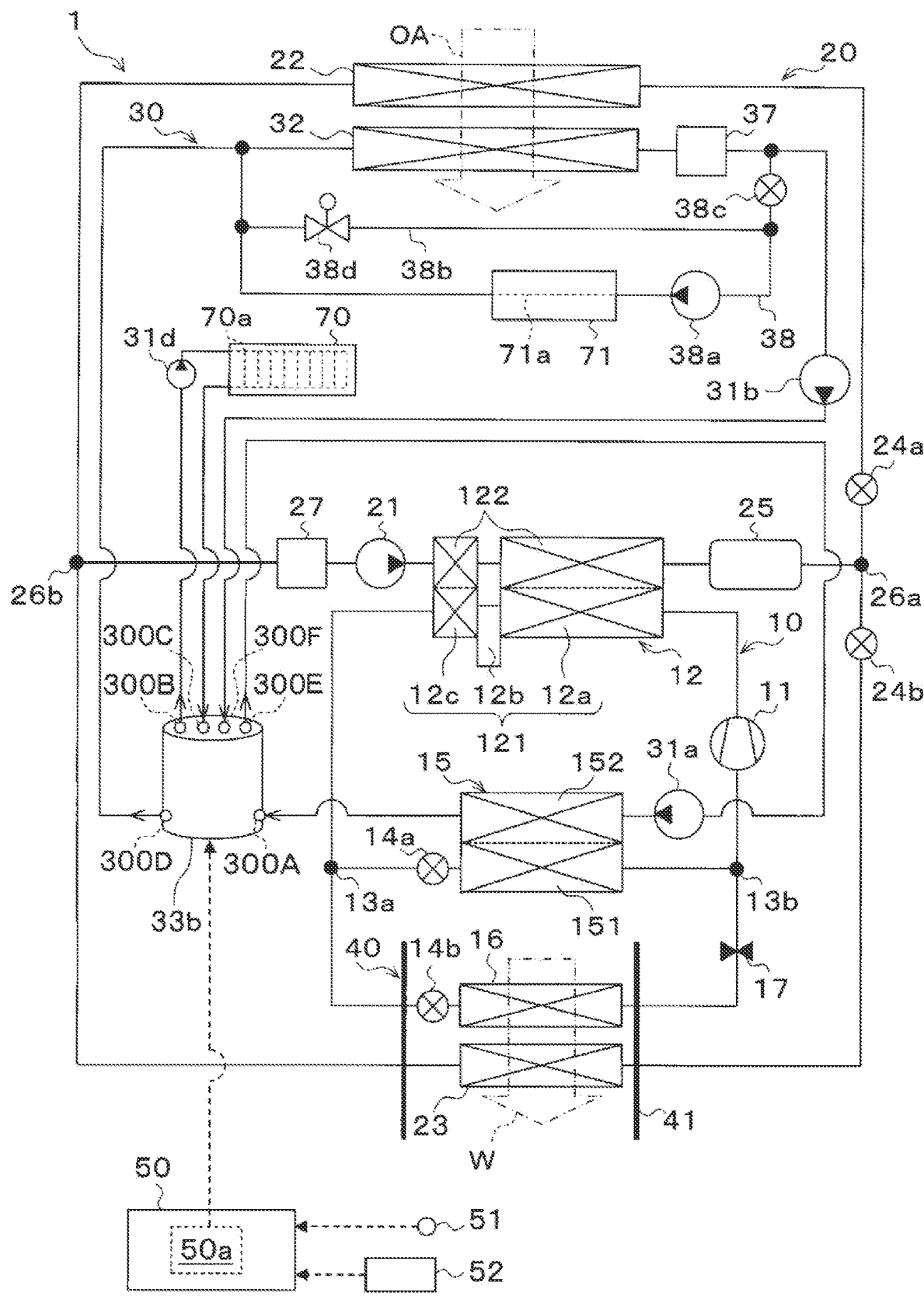
FIG. 31 is a view of the entire structure of another temperature adjustment device according to another embodiment.

For example, in the low-temperature side heat-medium circuit 30 described in the third embodiment, a first low-temperature side pump 31a and a second low-temperature side pump 31b may be placed as the pump, as illustrated in FIG. 31. The first low-temperature side pump 31a inhales the low-temperature side heat medium flowed out through the third outlet 300E and, then, pumps it to the inlet port of the heat-medium passage 152 in the chiller 15, similarly to the low-temperature side pump 31. The second low-temperature side pump 31b inhales the low-temperature side heat medium flowed out from the low-temperature side reserve tank 37 and, then, pumps it to the third inlet 300F.

In the example illustrated in FIG. 31, the control device 50 may cause the first low-temperature side pump 31a to operate in the apparatus cooling mode, while the control device 50 may cause the second low-temperature side pump 31b to operate in the outside-air cooling mode and in the outside-air heat absorption mode. As a matter of course, the second low-temperature side pump 31b may be also placed in such a way as to inhale the low-temperature side heat medium flowed out through the second outlet 300D and to pump it to the heat-medium inlet port of the low-temperature side radiator 32.

As illustrated in FIGS. 30 and 31, a battery-side pump 31d may be added. The battery-side pump 31d inhales the low-temperature side heat medium flowed out through the first outlet 300B and, then, pumps it to the inlet port of the cooling-water passage 70a in the battery 70.

The control device 50 may control the operation of the battery-side pump 31d, such that the first pressure PA is higher than the second pressure PB. This makes it easier to adjust the second pressure PB, which enables setting the first pressure PA to be higher than the second pressure PB, more certainly. As a matter of course, the battery-side pump 31d may be also placed in such a way as to inhale the low-temperature side heat medium flowed out from the cooling-water passage 70a in the battery 70 and to pump it to the second inlet 300C.

Figure 11:
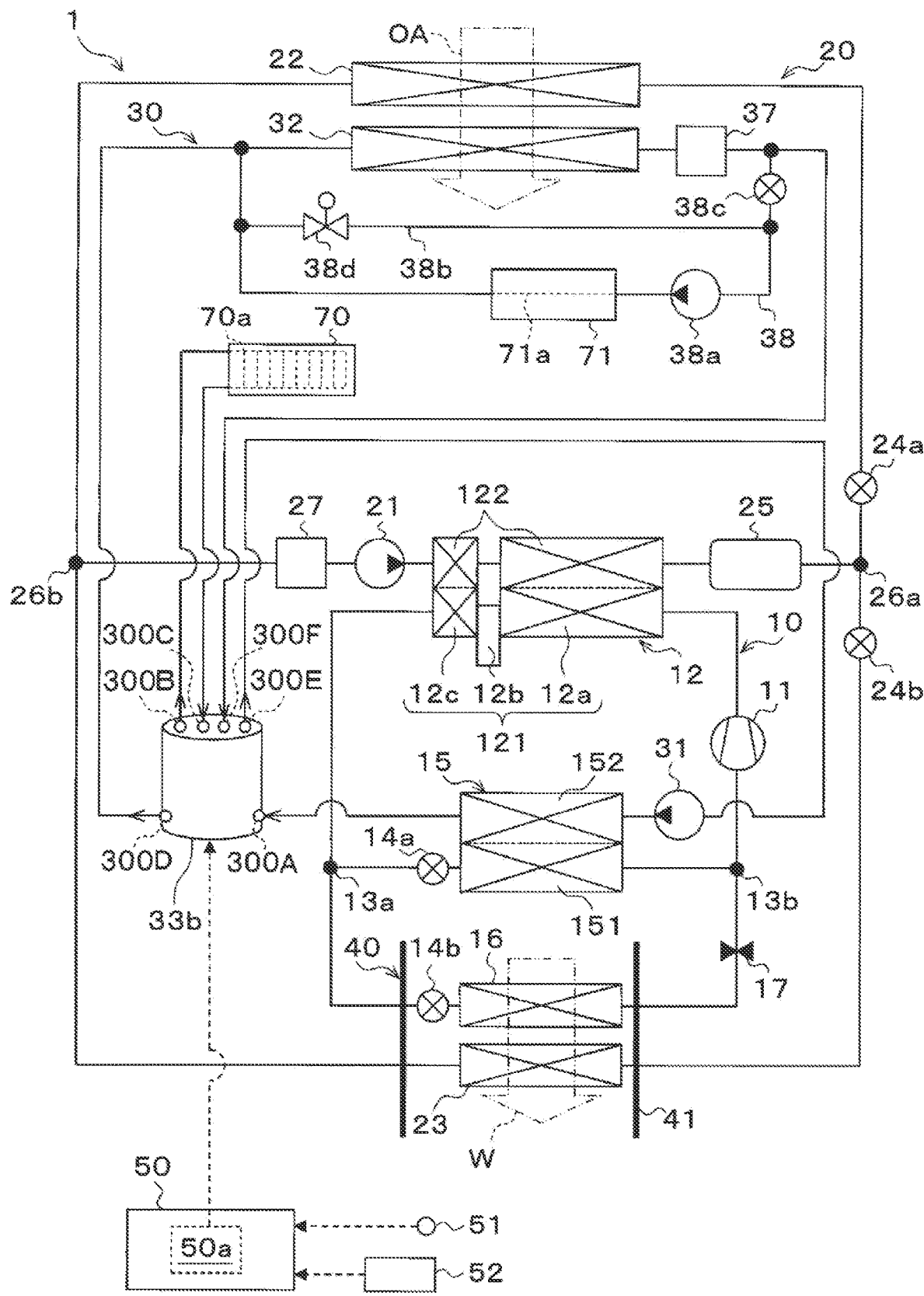
FIG. 11 is a view of the entire structure of a temperature adjustment device according to a third embodiment.

While, in the aforementioned embodiments, there have been described examples where the single in-vehicle apparatus 71 is placed in the apparatus cooling passage 38, for clarifying FIGS. 1 and 11, the in-vehicle apparatus 71 is not limited thereto. For example, a plurality of in-vehicle apparatuses including cooling-water passages connected to each other in series or in parallel may be placed, as the in-vehicle apparatus 71, in the apparatus cooling passage 38.

While, in the aforementioned embodiments, there have been described examples where the chiller 15 is employed as a cooling apparatus included in the low-temperature side heat-medium circuit 30, and the battery 70 is employed as a heating apparatus, the cooling apparatus and the heating apparatus are not limited thereto.

For example, a Peltier element or the like may be employed as the cooling apparatus. A to-be-cooled object may be employed as the heating apparatus. Such a to-be-cooled object is an object to be cooled by the low-temperature side heat medium having been cooled by the cooling apparatus.

Also, an electric heater or the like may be employed as the heating apparatus. A to-be-heated object may be employed as the cooling apparatus. Such a to-be-heated object is an object to be heated by the low-temperature side heat medium having been heated by the heating apparatus.

The applications of the flow passage switching valves 33 to 33d are not limited to the low-temperature side heat-medium circuits 30 as fluid circulation circuits, which have been disclosed in the aforementioned embodiments. As described above, they may be also applied to a fluid circulation circuit which employs an electric heater or the like as the heating apparatus and employs a to-be-heated object as the cooling apparatus.

The structure of the flow passage switching valves 33 is not limited to that disclosed in the aforementioned embodiments. For example, while, in the aforementioned embodiments, there have been described examples where the slide valve 302 employed therein includes the through hole 302a and the communication groove 302b which are placed substantially symmetrically with respect to the rotational shaft, the positional relationship between the through hole 302a and the communication groove 302b may be changed. Also, the respective spaces with arc-shaped cross sections which are formed in the second body 312 may be changed in center angle.

By doing this, it is possible to realize a passage configuration for causing the low-temperature side heat medium flowed in through the first inlet 300A to flow out through the first outlet 300B, while prohibiting the low-temperature side heat medium from flowing into the second inlet 300C, for example.

For example, it is possible to realize a passage configuration for causing the low-temperature side heat medium flowed in through the first inlet 300A to flow out through the second outlet 300D and, at the same time, causing the low-temperature side heat medium flowed in through the second inlet 300C to flow out through the third outlet 300E.

For example, it is possible to realize a passage configuration for causing the low-temperature side heat medium flowed in through the first inlet 300A to flow out through the third outlet 300E and, at the same time, causing the low-temperature side heat medium flowed in through the second inlet 300C to flow out through the second outlet 300D.

Further, closure plates for closing the through hole 302a may be placed at predetermined portions of the first body 311 and the second body 312. This enables realizing a passage configuration for causing the low-temperature side heat medium flowed in through the second inlet 300C to flow out through either one of the second outlet 300D and the third outlet 300E, without causing the low-temperature side heat medium to flow out through the second outlet 300B, for example.

Further, the body 301 may be provided with another heat-medium passage, in such a way as to cause the low-temperature side heat medium flowed out through either one of the second outlet 300D and the third outlet 300E to merge with the low-temperature side heat medium flowed out through the other one of them, again.

The structure of the flow passage switching valve 33d is not limited to those disclosed in the aforementioned embodiments. For example, while, in the aforementioned fifth embodiment, the driver 303 and the gear mechanism 305 which are structured separately from each other are employed, as illustrated in FIGS. 19 and 20, the driver 303 and the gear mechanism 305 may be also formed integrally. More specifically, a worm gear may be formed integrally with the rotational shaft of the driver 303, by forming a spiral groove directly in the rotational shaft of the driver 303.

The driver 303 in the flow passage switching valve 33d is not limited to a stepping motor. As the driver, it is also possible to employ an AC motor, a DC motor, a brushless motor or the like. In cases of employing, thereas, a driver which is hard to control in rotational angle, it is possible to employ an angle sensor for detecting the rotational angle of the shaft 304 or the slide valve 302. Further, the control device 50 may be adapted to control the operation of the driver, using a feedback control method or the like, such that the detection value from the angle sensor gets closer to a target value.

The gear mechanism 305 in the flow passage switching valve 33d is not limited to the worm-and-wheel type gear mechanism disclosed in the fifth embodiment. For example, the gear mechanism may be also constituted by three or more gears, by interposing a helical gear between the worm gear 305a and the wheel gear 305b. For example, it is also possible to employ a gear mechanism including a plurality of wheel gears.

For example, it is also possible to employ a rachet gear including a tooth locking for permitting the slide valve 302 to rotate only in the direction of normal rotation. In cases of employing such a rachet gear, it is also possible to permit the slide valve 302 to rotate in the direction of reverse rotation, by releasing the tooth locking. Also, it is possible to employ a planetary gear mechanism.

Figure 32:
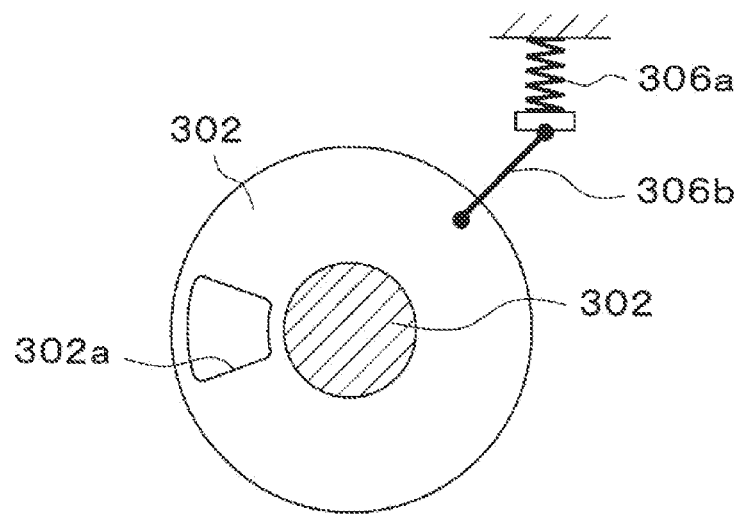
FIG. 32 is a schematic explanation view illustrating a modification example of a gear biasing member according to another embodiment.

The gear biasing member in the flow passage switching valve 33d is not limited to the first coil spring 306. For example, as illustrated in a schematic axial vertical cross-sectional view in FIG. 32, the gear biasing member may be formed from a coil spring 306a and a link mechanism 306b. More specifically, the coil spring 306a may be secured to the body 301 at its one end portion and may be placed such that its center axis extends in a tangential direction of the slide valve 302.

Figure 33:
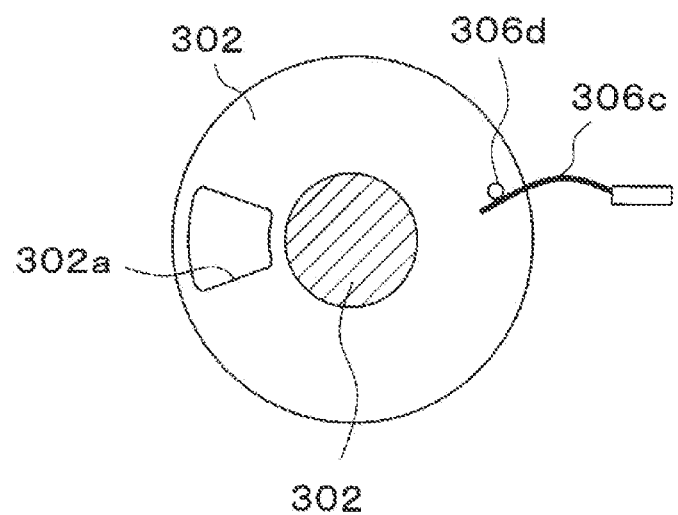
FIG. 33 is a schematic explanation view illustrating another modification example of the gear biasing member according to another embodiment.

For example, as illustrated in a schematic axial cross-sectional view in FIG. 33, the gear biasing member may be formed from a plate spring 306c and a pin 306d which comes in contact with the plate spring 306c. More specifically, the plate spring 306c may be secured to the body 301, and the pin 306d may be secured to the slide valve 302.

The gear biasing member is not limited to an elastic member, such as a coil spring or a plate spring. The gear biasing member may be also formed from a cylinder portion adapted to exert a load on the slide valve 302 through the water pressure of a liquid, such as a low-temperature side heat medium.

The switcher biasing member in the flow passage switching valve 33d is not limited to the second coil spring 307. For example, the switcher biasing member may be also formed from an elastic member, such as a tubular-shaped rubber member.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A flow passage switching valve for a fluid circulation circuit that is for a fluid circulating, the flow passage switching valve comprising:
   a body forming therein a fluid passage for the fluid flowing therethrough; and
   a switcher configured to switch a passage configuration of the fluid passage, wherein
   the body includes a first inlet for the fluid flowing into the body, a second inlet for the fluid flowing into the body, and outlets for the fluid having flowed into the body and flowing out of the body,
   the outlets include a first outlet for the fluid having flowed in from the first inlet and flowing out of the body,
   the switcher is configured such that the passage configuration is switchable to a state in which the fluid having flowed in from the first inlet flows out of either one of the outlets,
   the switcher is configured such that the passage configuration is switchable to a state in which the fluid having flowed in from the second inlet flows out of either one of the outlets, and
   the fluid circulation circuit is configured such that a first pressure of the fluid flowing into the first inlet is higher than a second pressure of the fluid flowing into the second inlet.

2. The flow passage switching valve according to claim 1, wherein
   the second inlet is an inlet for the fluid having flowed out of the body from the first outlet and flowing into the body again.

3. The flow passage switching valve according to claim 1, wherein
   the outlets include:
      a second outlet for either one of two fluids: the fluid having flowed into the body from the first inlet and flowing out of the body; and the fluid having flowed into the body from the second inlet and flowing out of the body; and
      a third outlet for the fluid having flowed into the body from the second inlet and flowing out of the body,
   the switcher is configured such that the passage configuration is switchable to a state in which the fluid that has flowed in from the first inlet flows out of either one of two outlets: the first outlet and the second outlet, and
   the switcher is configured such that the passage configuration is switchable to a state in which the fluid that has flowed in from the second inlet flows out of either one of two outlets: the second outlet and the third outlet.

4. The flow passage switching valve according to claim 3, wherein
   the body includes a first body forming a first inlet-side space communicating with the first inlet, and a second body forming at least a second inlet-side space communicating with the second inlet and a first outlet-side space communicating with the first outlet,
   the switcher includes a slide valve placed between the first body and the second body and provided with a through hole passing through the slide valve,
   one surface of the slide valve and the first body define the first inlet-side space,
   another surface of the slide valve and the second body define the second inlet-side space and the first outlet-side space,
   the one surface of the slide valve has a portion having a first area on which a pressure of the fluid that has flowed into the first inlet-side space acts,
   the other surface of the slide valve has a portion having a second area on which a pressure of the fluid that has flowed into the second inlet-side space acts, and
   the first area is set to be larger than the second area.

5. The flow passage switching valve according to claim 4, wherein
   the second body further forms a second outlet-side space communicating with the second outlet, and a third outlet-side space communicating with the third outlet,
   the other surface of the slide valve and the second body defines the second outlet-side space and the third outlet-side space, and
   the other surface of the slide valve is provided with a communication groove through which the second inlet-side space communicates with either one of two outlet-side spaces: the second outlet-side space and the third outlet-side space.

6. The flow passage switching valve according to claim 5, wherein
   the second inlet-side space is placed next to both the second outlet-side space and the third outlet-side space.

7. A flow passage switching valve for a fluid circulation circuit that is for a fluid circulating, the flow passage switching valve comprising:
   a body forming therein a fluid passage for the fluid flowing therethrough; and
   a switcher configured to switch a passage configuration of the fluid passage, wherein
   the body includes a first inlet for the fluid flowing into the body, a second inlet for the fluid flowing into the body, and outlets for the fluid having flowed into the body and flowing out of the body,
   the outlets include a first outlet for the fluid having flowed in from the first inlet and flowing out of the body,
   the switcher is configured such that the passage configuration is switchable to a state in which the fluid that has flowed in from the first inlet flows out of either one of the outlets, the switcher is configured such that the passage configuration is switchable to a state in which the fluid that has flowed in from the second inlet flows out of either one of the outlets, and the fluid circulation circuit is configured such that a first temperature of the fluid flowing out of the first outlet is lower than a second temperature of the fluid flowing into the second inlet.

8. A flow passage switching valve for a fluid circulation circuit that is for a fluid circulating, the flow passage switching valve comprising:

a body forming therein a fluid passage for the fluid flowing therethrough;

a switcher configured to switch a passage configuration of the fluid passage;

a driver configured to output driving force for moving the switcher; and a gear mechanism coupling the driver and the switcher to each other such that the driving force is transmitted therebetween, wherein the body includes a first inlet for the fluid flowing into the body, a second inlet the fluid flowing into the body, and outlets for the fluid having flowed into the body and flowing out of the body, the outlets include a first outlet for the fluid having flowed in from the first inlet and flowing out of the body, the switcher is configured such that the passage configuration is switchable to a state in which the fluid that has flowed in from the first inlet flows out of either one of the outlets, the switcher is configured such that the passage configuration is switchable to a state in which the fluid that has flowed in from the second inlet flows out of either one of the outlets, and the flow passage switching valve further comprising a gear biasing member configured to generate a load in a direction where tooth surfaces of gears of the gear mechanism come into contact with each other.

9. The flow passage switching valve according to claim 8, wherein one end portion of the gear biasing member is supported by the switcher.

10. The flow passage switching valve according to claim 8, wherein the body includes a first body forming a first inlet-side space communicating with the first inlet, and a second body forming at least a second inlet-side space communicating with the second inlet and a first outlet-side space communicating with the first outlet, the outlets include:

a second outlet for either one of two fluids: the fluid having flowed into the body from the first inlet and flowing out of the body; and the fluid having flowed into the body from the second inlet and flowing out of the body; and a third outlet for the fluid having flowed into the body from the second inlet and flowing out of the body, the second body forms a second outlet-side space communicating with the second outlet, and a third outlet-side space communicating with the third outlet, the switcher includes a slide valve placed between the first body and the second body and provided with a through hole passing through the slide valve, one surface of the slide valve and the first body define the first inlet-side space, another surface of the slide valve and the second body define the second inlet-side space, the first outlet-side space, the second outlet-side space and the third outlet-side space, and the other surface of the slide valve is provided with a communication groove through which the second inlet-side space communicates with either one of two outlet-side spaces: the second outlet-side space and the third outlet-side space.

11. A flow passage switching valve for a fluid circulation circuit that is for a fluid circulating, the flow passage switching valve comprising:

a body forming therein a fluid passage for the fluid flowing therethrough; and a switcher configured to switch a passage configuration of the fluid passage, wherein the body includes a first inlet for the fluid flowing into the body, a second inlet for the fluid flowing into the body, and outlets for the fluid having flowed into the body and flowing out of the body, the outlets include a first outlet for the fluid having flowed in from the first inlet and flows out of the body, the switcher is configured such that the passage configuration is switchable to a state in which the fluid that has flowed in from the first inlet flows out of either one of the outlets, the switcher is configured such that the passage configuration is switchable to a state in which the fluid that has flowed in from the second inlet flows out of either one of the outlets, the switcher has a sealing surface coming into surface-to-surface contact with the body, and the flow passage switching valve further comprising a switcher biasing member configured to exert a load on the switcher in a direction where the sealing surface is pressed against the body.

12. The flow passage switching valve according to claim 11, comprising:

a driver configured to output driving force for moving the switcher; and a rotational shaft configured to transmit the driving force to the switcher, wherein the switcher biasing member includes a coil spring, and a center axis of the rotational shaft is placed radially inward of the switcher biasing member.

13. The flow passage switching valve according to claim 12, comprising:

a gear mechanism coupling the driver and the switcher to each other such that the driving force is transmitted therebetween; and a gear biasing member configured to generate a load in a direction where tooth surfaces of gears of the gear mechanism come into contact with each other, wherein the gear biasing member includes a coil spring.

14. The flow passage switching valve according to claim 13, wherein a center axis of the switcher biasing member and a center axis of the gear biasing member are placed coaxially.

15. The flow passage switching valve according to claim 12, wherein the switcher biasing member is rotatable together with the rotational shaft.

16. The flow passage switching valve according to claim 11, comprising:

a driver configured to output driving force for moving the switcher; and a gear mechanism coupling the driver and the switcher to each other such that the driving force is transmitted therebetween, wherein
the switcher biasing member is configured to generate a load in a direction such that tooth surfaces of gears of the gear mechanism come into contact with each other.

17. The flow passage switching valve according to claim 11, comprising:
a driver configured to output driving force for moving the switcher; and
a rotational shaft configured to transmit the driving force to the switcher, wherein
the switcher is provided with an insertion hole in which the rotational shaft is inserted, and
a gap is formed between the insertion hole and the rotational shaft.

18. The flow passage switching valve according to claim 17, wherein
the body includes a bearing hole rotatably supporting one end portion of the rotational shaft,
a gap is formed between the bearing hole and the rotational shaft, and
a first gap interval between the insertion hole and the rotational shaft is set to be larger than a second gap interval between the bearing hole and the rotational shaft.

19. A fluid circulation circuit for a fluid circulating, the fluid circulation circuit comprising:
apparatuses for the fluid flowing therethrough; and
a flow passage switching valve configured to switch a circuit configuration of a circuit that is for the fluid circulating, wherein
the flow passage switching valve includes a body forming therein a fluid passage for the fluid flowing therethrough, and a switcher configured to switch a passage configuration of the fluid passage,
the body includes a first inlet for the fluid flowing into the body, a second inlet for the fluid flowing into the body, and outlets for the fluid having flowed into the boy and flowing out of the body,
the outlets include a first outlet for the fluid having flowed in from the first inlet and flows out of the body,
the switcher is configured such that the passage configuration is switchable to a state in which the fluid that has flowed in from the first inlet flows out of either one of the outlets,
the switcher is configured such that the passage configuration is switchable to a state in which the fluid that has flowed in from the second inlet flows out of either one of the outlets, and
a first pressure of the fluid flowing into the first inlet is set to be higher than a second pressure of the fluid flowing into the second inlet.

20. The fluid circulation circuit according to claim 19, wherein
the second inlet is an inlet for the fluid having flowed out of the body from the first outlet and flowing into the body again.

21. The fluid circulation circuit according to claim 19, wherein
the outlets include:
a second outlet for either one of two fluids: the fluid having flowed into the body from the first inlet and flowing out of the body; and the fluid having flowed into the body through the second inlet and flowing out of the body; and
a third outlet for the fluid having flowed into the body from the second inlet and flowing out of the body,
the switcher is configured such that the passage configuration is switchable to a state in which the fluid that has flowed in from the first inlet flows out of either one of two outlets: the first outlet and the second outlet, and
the switcher is configured such that the passage configuration is switchable to a state in which the fluid that has flowed in from the second inlet flows out of either one of two outlets: the second outlet and the third outlet.

22. The fluid circulation circuit according to claim 21, wherein
the apparatuses include a cooling apparatus configured to cool the fluid, and an outside-air heat exchanger configured to perform heat exchange between the fluid and outside air,
the first inlet is connected to an outlet port of a cooling fluid passage in the cooling apparatus, and
an inlet port of the outside-air heat exchanger is connected to the second outlet.

23. The fluid circulation circuit according to claim 19, wherein
the apparatuses include a heating apparatus configured to heat the fluid, and
the heating apparatus is placed in a flow passage leading from the first outlet to the second inlet.

24. The fluid circulation circuit according to claim 19, comprising
a pump configured to pump the fluid, wherein
the fluid pumped from the pump flows into the first inlet.

25. The fluid circulation circuit according to claim 24, wherein
the apparatuses include a cooling apparatus configured to cool the fluid, and an outside-air heat exchanger configured to perform heat exchange between the fluid and outside air,
the cooling apparatus includes an evaporating portion of a vapor-compression refrigeration cycle device in which a refrigerant evaporates,
the evaporating portion is configured to perform heat exchange between the refrigerant and the fluid flowing out of the outside-air heat exchanger, and
the refrigeration cycle device is configured to utilize heat that the refrigerant absorbs in the evaporating portion as a heat source for heating a fluid to be temperature-adjusted.

26. A fluid circulation circuit for a fluid circulating, the fluid circulation circuit comprising:
apparatuses for the fluid flowing therethrough; and
a flow passage switching valve configured to switch a circuit configuration of a circuit that is for the fluid circulating, wherein
the flow passage switching valve includes a body forming therein a fluid passage for the fluid flowing therethrough, and a switcher configured to switch a passage configuration of the fluid passage,
the body includes a first inlet for the fluid flowing into the body, a second inlet for the fluid flowing into the body, and outlets for the fluid having flowed into the body and flowing out of the body,
the outlets include a first outlet for the fluid having flowed in from the first inlet and flowing out of the body,
the switcher is configured such that the passage configuration is switchable to a state in which the fluid that has flowed in from the first inlet flows out of either one of the outlets, the switcher is configured such that the passage configuration is switchable to a state in which the fluid that has flowed in from the second inlet flows out of either one of the outlets, and a first temperature of the fluid flowing out through the first outlet is set to be lower than a second temperature of the fluid flowing into the second inlet.

27. A flow passage switching valve for a fluid circulation circuit that is for a fluid circulating, the flow passage switching valve comprising:

a body forming therein a fluid passage for the fluid flowing therethrough; and a switcher configured to switch a passage configuration of the fluid passage; wherein the body includes a first inlet for the fluid flowing into the body, a second inlet for the fluid flowing into the body, and outlets for the fluid having flowed into the body and flowing out of the body, the outlets include a first outlet for the fluid having flowed in from the first inlet and flowing out of the body, a second outlet for the fluid having flowed into the body and flowing out of the body, and a third outlet for the fluid having flowed into the body and flowing out of the body, the second inlet is an inlet for the fluid having flowed out of the body from the first outlet and flowing into the body again, the switcher is configured such that the passage configuration is switchable to a state in which the fluid that has flowed in from the first inlet flows out of either one of two outlets: the first outlet and the second outlet, the switcher is configured such that the passage configuration is switchable to a state in which the fluid that has flowed in from the second inlet flows out of either one of two outlets: the second outlet and the third outlet, a length of a passage leading from the first inlet to the second outlet is smaller than a total length of a length of a passage leading from the first inlet to the first outlet and a length of a passage leading from the second inlet to the second outlet, and the fluid circulation circuit is configured such that a first lowest temperature of the fluid flowing through the fluid passage leading from the first inlet to the second outlet is lower than a second lowest temperature of the fluid in a flow passage leading from the first outlet to the second inlet.

28. A fluid circulation circuit for a fluid circulating, comprising:

apparatuses through which the fluid flows; and a flow passage switching valve configured to switch a circuit configuration of a circuit that is for the fluid circulating, wherein the flow passage switching valve includes a body forming therein a fluid passage for the fluid flowing therethrough, and a switcher configured to switch a passage configuration of the fluid passage, the body includes a first inlet for the fluid flowing into the body, a second inlet for the fluid flowing into the body, and outlets for the fluid having flowed into the body and flowing out of the body, the outlets include a first outlet for the fluid having flowed into the body from the first inlet and flowing out of the body, a second outlet for the fluid having flowed into the body and flowing out of the body, and a third outlet for the fluid having flowed into the body and flowing out of the body, the second inlet is an inlet for the fluid having flowed out of the body from the first outlet and flows into the body again, the switcher is configured such that the passage configuration is switchable to a state in which the fluid that has flowed in from the first inlet flows out of either one of two outlets: the first outlet and the second outlet, the switcher is configured such that the passage configuration is switchable to a state in which the fluid that has flowed in from the second inlet flows out of either one of two outlets: the second outlet and the third outlet, a length of a passage leading from the first inlet to the second outlet is smaller than a total length of a length of a passage leading from the first inlet to the first outlet and a length of a passage leading from the second inlet to the second outlet, and a first lowest temperature of the fluid flowing through the fluid passage in the flow passage switching valve leading from the first inlet to the second outlet is set to be lower than a second lowest temperature of the fluid in a flow passage leading from the first outlet to the second inlet.

* * * * *